United States Patent [19]

Harper et al.

[11] Patent Number: 5,595,717
[45] Date of Patent: *Jan. 21, 1997

[54] CONTROLLED PRECIPITATION OF AMORPHOUS SILICA FROM GEOTHERMAL FLUIDS OR OTHER AQUEOUS MEDIA CONTAINING SILICIC ACID

[75] Inventors: Ross T. Harper; James H. Johnston, both of Wellington; Nicholas Wiseman, Okene Falls, all of New Zealand

[73] Assignees: Tasman Pulp & Paper Co., Limited, Auckland; Geochemistry Research Limited, Wellington, both of New Zealand

[*] Notice: The term of this patent shall not extend beyond the expiration date of Pat. No. 5,200,165.

[21] Appl. No.: 35,477

[22] Filed: Mar. 24, 1993

Related U.S. Application Data

[63] Continuation-in-part of Ser. No. 495,976, Feb. 20, 1990, Pat. No. 5,200,165.

[30]  Foreign Application Priority Data

| Mar. 23, 1989 | [NZ] | New Zealand | 228472 |
| Jan. 19, 1990 | [NZ] | New Zealand | 232170 |
| Feb. 1, 1993 | [NZ] | New Zealand | 245823 |

[51] Int. Cl.$^6$ ................................................ C01B 33/18
[52] U.S. Cl. .......................... 423/339; 423/335; 424/49
[58] Field of Search .................................. 423/339, 335;
424/49; 60/641.2, 641.5; 210/197, 170, 714, 747

[56] References Cited

U.S. PATENT DOCUMENTS

| 3,757,516 | 9/1973 | McCabe | 60/26 |
| 4,043,129 | 8/1977 | McCabe et al. | 60/641 |
| 4,302,328 | 11/1981 | Van Note | 210/714 |
| 4,304,666 | 12/1981 | Van Note | 210/197 |
| 4,370,858 | 2/1983 | Awerbuch et al. | 60/641 |
| 4,389,385 | 6/1983 | Ramsay | 423/338 |
| 4,429,535 | 2/1984 | Featherstone | 60/641 |
| 4,665,705 | 5/1987 | Bonham, Jr. | 60/641 |
| 5,200,165 | 4/1993 | Harper et al. | 423/339 |

FOREIGN PATENT DOCUMENTS

| 0194116 | 2/1986 | European Pat. Off. |
| 61-186216 | 8/1986 | Japan |
| 168417 | 10/1972 | New Zealand |
| 240953 | 3/1989 | New Zealand |
| 227753 | 3/1989 | New Zealand |
| 0396242 | 7/1990 | New Zealand |
| 237831 | 4/1991 | New Zealand |
| 228472 | 1/1993 | New Zealand |

OTHER PUBLICATIONS

Abstract of published Japanese patent application 62–158, 111, Nippon Steel Corp., Jul. 14, 1987.
United Nations Symposium on the Development and Use of Geothermal Resources (2nd:1975:San Francisco) "Removal of Silica and Arsenci from Geothermal Discharge Waters by Precipitation of Useful Calcium Silicates"; pp. 1417–1425.
Geothermal Resources Council Bulletin, "Geothermal Scale Control and Mineral Recovery Using a Flash–Crystallizer–Separator Process", Sep./Oct. 1983, pp. 7–13.
Geothermics, vol. 10, No. 344, "Chemistry of Silica in Cerro Prieto Brines", pp. 255–276, 1981.
Geothermics, vol. 11, No. 1, "Pilot Scale Solids/ Liquid Separation in Hot Geothermal Discharge Waters Using Dissolved Air Floatation", pp. 43–58, 1982.
U.S. Dept. of Energy Report, Contract No. W–7405–ENG–48, "Studies of Brine Chemcistry, Precipitation of Solids andScale Formation at The Salton Sea Geothermal Field", Jan. 8, 1979.
U.S. Dept. of Energy Report, Contract No. W–7405–ENG–48, "Kinetics of Silica Polymerization", May 1980.
Chemistry in New Zealand, "Silica–In Theory and Geothermal Practice", pp. 179–182, Oct. 1980.
Geothermics, vol. 8, "Effect of Silica Polymerization and pH on Geothermal Scaling", pp. 1–20, 1979.
Geothermics, vol. 10, No. 344, "Theoretical Studies of Cerro Prieto Brines' Chemical Equilibria", pp. 239–244, 1981.
The Occurrence, Dissolution, and Deposition of Silica, Removal and Deposition of Silica, Removal and Deposition of Silica From Water, pp. 78–89 (no date).
Energy Research and Development Administration Report, Contract No. W–7405–ENG–26, "Precipitation and Scaling in Dynamic Geothermal Systems", Oct., 1976.
Brine Classification at Svartsengi, Iceland: Part I Effect of pH and Temperature on tthe Precipitaiton of Silica and its Properties, by H. Thordarson and Th. Tomasson. The Science Institute, Reykjavik, Iceland and Icelandic Technological Institute, Reykjavik, Iceland. This reference has been published in Geothermics vol. 18, No. ½, pp. 187–294 (no date).

*Primary Examiner*—Karl Group
*Attorney, Agent, or Firm*—Nikaido, Marmelstein, Murray & Oram LLP

[57]  ABSTRACT

A more efficient utilization of geothermal energy by allowing flashing of the produced water to a lower temperature. This is accomplished by causing additional quantities of silica to precipitate out of the geothermal water as particles rather than as scale on process equipment. These particles are tertiary aggregate amorphous silica of Type I, II or III, which have high surface areas, good oil absorption and high reflectivity. They are useful as additives and opacifiers for paper, paints, rubbers, and plastics; as thixotropic thickening agents; and as absorbents. The improved energy recovery is accomplished by utilizing the addition (including recycle) of previously produced particles of amorphous tertiary aggregate silica of a selected Type I, II or III, as a heterogeneous precipitation agent, alone or in combination with other more conventional precipitation agents.

23 Claims, 32 Drawing Sheets

10 nm 50 nm 50 nm

50nm 50 nm

10nm

50nm 100 nm 100 nm

| DESCRIPTION | SEPARATED GEOTHERMAL WATER | COOLED FEEDSTOCK | FLASHED VAPOUR | COOLING WATER | CONDENSER UNDERFLOW | AGED FLUID |
|---|---|---|---|---|---|---|
| STREAM NO. | 1 | 2 | 3 | 4 | 5 | 6 |
| FLOWRATE (kg/s) | 10 | 9.12 | 0.88 | 15.23 | 16.11 | 9.12 |
| TEMPERATURE (°C) | 100 | 50 | 50 | 20 | 50 | 50 |
| ANALYSIS | | | | | | |
| $SiO_2$ | 837ppm | 918ppm | 0 | 0 | 0 | 918ppm |
| $CaCl_2$ | — | — | — | — | — | 200ppm |
| FLOCCULANT | — | — | — | — | — | — |
| SURFACTANT | — | — | — | — | — | — |
| HCl | — | — | — | — | — | — |
| MASS FLOW (kg/hr) | | | | | | |
| $SiO_2$ | 30.1 | 30.1 | 0 | 0 | 0 | 30.1 |
| $CaCl_2$ | — | — | — | — | — | 6.6 |
| FLOCCULANT | — | — | — | — | — | — |
| SURFACTANT | — | — | — | — | — | — |
| HCl | — | — | — | — | — | — |

| DAF TANK FEEDSTOCK | PRODUCT SLURRY | HCl DOSING | FLOCCULANT DOSING | CaCl2 DOSING | SURFACTANT DOSING | DAF EFFLUENT | DAF RECYCLE |
|---|---|---|---|---|---|---|---|
| 7 | 8 | 9 | 10 | 11 | 12 | 13 | 14 |
| 9.12 | 0.39 | 0 | 3.284 Kg/hr | 65.6 Kg/hr | — | 8.73 | 4.3 |
| 50 | 50 | 20 | 20 | 20 | 20 | 50 | 50 |
| 918ppm | SOLID/SOLUTION 15kg/m3/200ppm | — | — | — | — | SOLID/SOLUTION 75ppm/200ppm | SOLID/SOLUTION 75ppm/200ppm |
| 200ppm | 200ppm | — | — | 1% | — | 200ppm | 200ppm |
| 5ppm | 5ppm | — | 0.05% | — | — | 5pp | — |
| — | — | — | — | — | — | — | — |
| 30.1 | 21.1/0.28 | — | — | — | — | 2.36/6.29 | 1.16/3.1 |
| 6.6 | 0.28 | — | — | 6.56 | — | 6.29 | 3.1 |
| 0.164 | 0.007 | — | 0.164 | — | — | 0.157 | 0.077 |
| — | — | — | — | — | — | — | — |

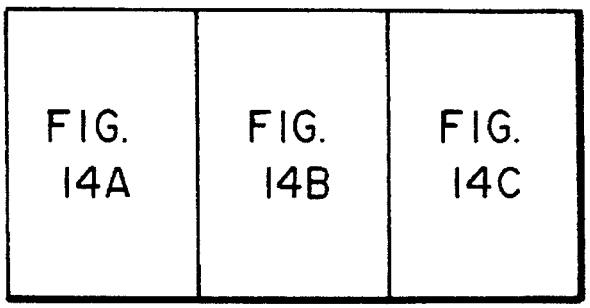
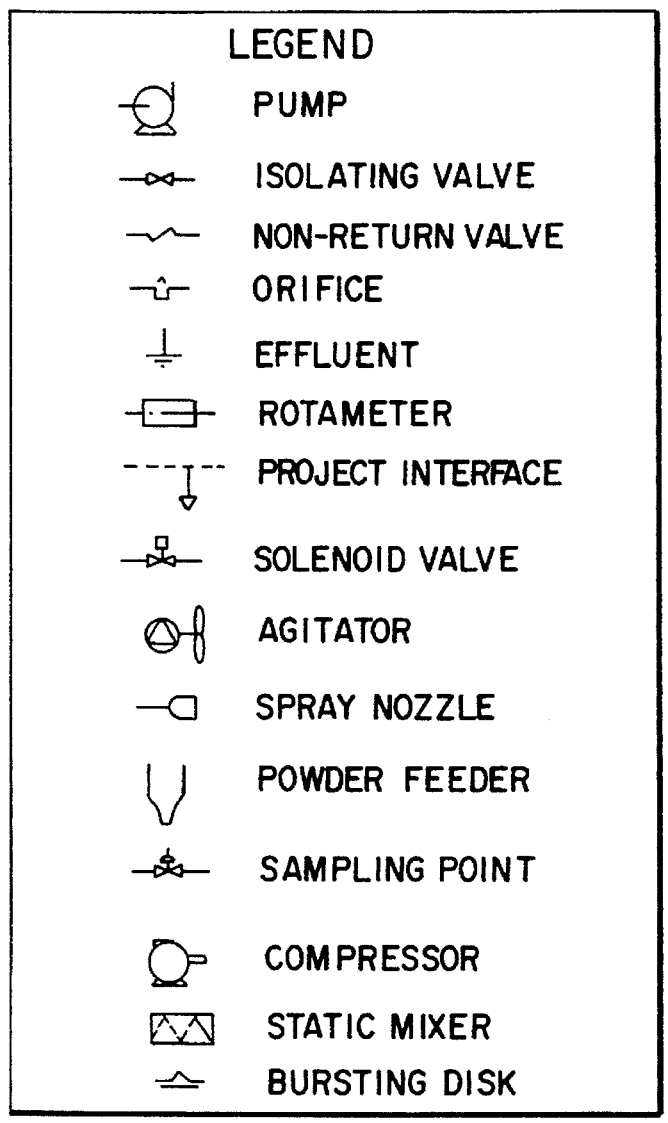
FIG. 14C

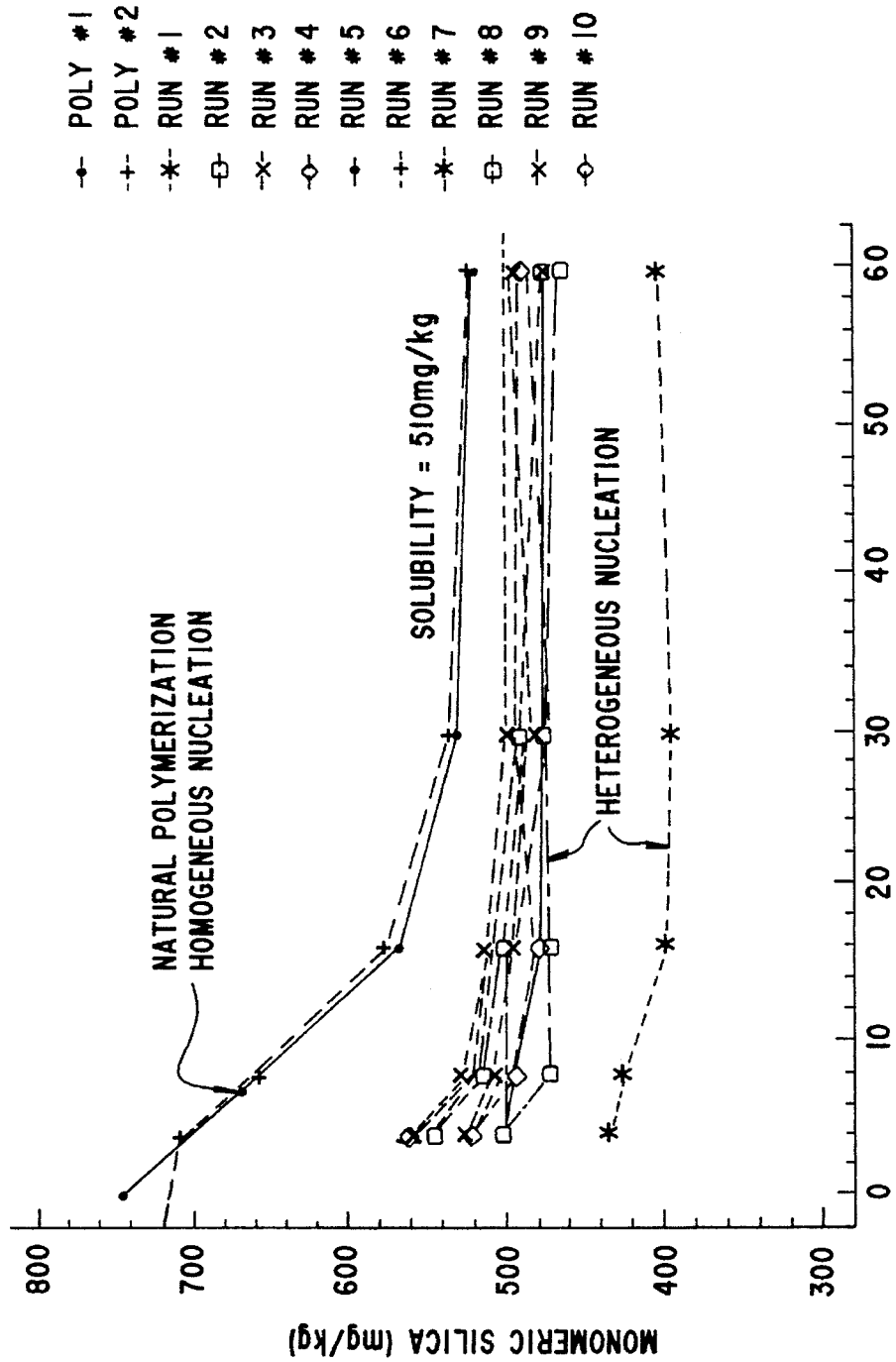

FIG.24

LEGEND:
1. POLY #1 AND #2 ARE POLYMERIZATION CURVES FOR KAWERAU GEOTHERMAL WATER. POLYMERIZATION HAS PROCEEDED NATURALLY UPON AGING AT CONSTANT TEMPERATURE AND pH.
2. IN RUNS #1 - #10, FRESHLY SUPERSATURATED GEOTHERMAL WATER IS MIXED WITH TYPE I SILICA. WITHIN 4 MINUTES, THE MONOMER SILICA CONCENTRATION DECREASED TO CLOSE TO THAT AT EQUILIBRIUM. A REDUCED EQUILIBRIUM SOLUBILITY IS ESTABLISHED AT 60 MINUTES.

50 nm

50nm 50 nm

50nm 50 nm

CONTROLLED PRECIPITATION OF AMORPHOUS SILICA FROM GEOTHERMAL FLUIDS OR OTHER AQUEOUS MEDIA CONTAINING SILICIC ACID

This application is a continuation in part of application Ser. No. 495,976, filed Feb. 20, 1990, now U.S. Pat. No. 5,200,165, the entire contents of which is incorporated herein by reference.

This invention is directed to a novel means of recovering amorphous silica from geothermal waters containing silicic acid and/or other siliceous values dissolved and/or dispersed therein. It also relates to the novel solid amorphous silica products produced by this novel recovery process. It further relates to several unique uses for these novel products.

BACKGROUND OF THE INVENTION

Moderate concentrations of silicic acid are present in hot, pressurized, aqueous, geothermal fluid as a result of the dissolution of silica containing minerals from the rock material in contact with the geothermally heated water while it is still underground. This fluid may be discharged from normal surface manifestations or may be produced artificially, from wells drilled into suitable formations, which increase mass withdrawal, for whatever purpose. Usually, the purpose of drilling geothermal wells and producing the hot geothermal fluid is to provide an energy source for the production of electric power.

If silicic acid concentration in the water produced at the surface is sufficiently high, when the temperature or the pressure of the water is reduced, polymerization, with spontaneous homogeneous nucleation, of the siliceous values in the produced water results in the formation of critical size nuclei, which rapidly grow to form primary particles of silica. Spontaneous nucleation of the parent monomeric silicic acid species, and subsequent growth thereof by polymerization, forms polymeric primary silica particles which attain a physical dimension of about 1.5 nm.

Under slightly acidic to neutral conditions, this is best represented by the condensation reaction:

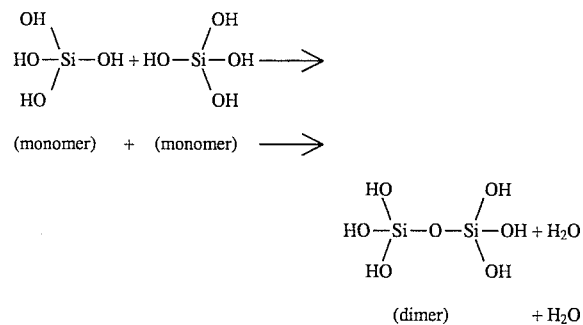

Under more alkaline conditions, e.g. pH<7, dissociation of silicic acid to silicate ion becomes significant, according to the equation:

Polymerization under these conditions is considered to favor the following reaction:

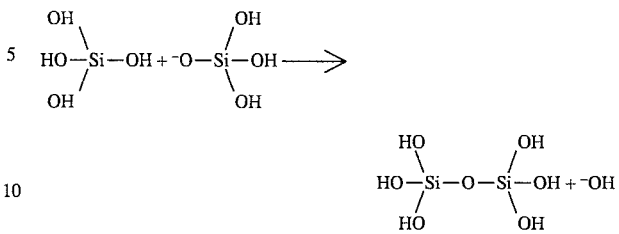

Primary particles resulting from this Type of reaction can be observed under a high power transmission electron microscope, as shown in the attached drawing, for example FIG. 1.

In this invention, the tertiary aggregate amorphous silica products are differentiated by structure into three (3) classifications, namely: Types I, II and III. Type I silica, as that term is used and defined herein, is unique, but may be considered to be somewhat similar in microstructure to the silica which is commonly prepared commercially by acid treatment of sodium silicate solutions. Such sodium silicate solutions are commonly prepared by digestion of quartz sand with sodium hydroxide. Type II silicas, as the term is used and defined herein, is also unique, but may be considered to be somewhat similar in microstructure to a class of commercial silicas which are conventionally prepared by the so-called "arc" process, that is by the oxidation of silicon monoxide under anhydrous conditions at very high temperatures. Type III silicas are somewhat of a cross between Types I and II, as will hereinafter be more fully explained.

Reference is made to FIG. 8 hereof. This figure shows a transmission electron photomicrograph of a naturally occurring geothermal silica deposit. The silica shown in this figure is to be contrasted to the silicas shown in FIGS. 1–7 which are Type I, II and III silicas, as indicated on the figures, made according to the practice of this invention.

All of these novel types of tertiary aggregate amorphous silicas are recoverable from geothermal water by the practice of this invention by controlling the conditions of polymerization of the silicic values contained therein, the conditions of the growth of the primary particles of polymerized silica, and the conditions of precipitation of the polymerized silicas. The controls which are required will be detailed hereinafter.

Geothermal waters vary from location to location. However, such waters can be generically characterized as having a neutral to slightly alkaline pH. In addition to the dissolved siliceous values, mainly silicic acid, these waters often have significant concentrations of other ions, such as, for example: sodium, potassium, lithium, magnesium, rubidium, cesium, boron, chlorine, and arsenic. These waters also often contain dissolved gaseous species, such as, for example: $H_2S$, $CO_2$, and $NH_3$. Table 1 below shows typical chemical analyses of representative geothermal waters from several wells in the same field.

Chemical Composition: Kawerau Production Wells

Table 1 shows the chemical composition of atmospherically separated water from several Kawerau production wells. Examination of arsenic concentrations in the geothermal water versus that which was adsorbed on to precipitated silica obtained from the same water, the composition of which is shown later in tables 2–8, demonstrates the preferential enrichment which can occur for the solid phase, if precipitation conditions are not optimized.

TABLE 1

CHEMICAL COMPOSITION; KAWERAU PRODUCTION WELLS (ATMOSPHERICALLY SEPARATED WATER)

| Date/Source | pH | Li | Na | K | Ca | Fe | Cl | F | $SO_4$ | $HCO_3$ | B | $NH_3$ | $SiO_2$ | As |
|---|---|---|---|---|---|---|---|---|---|---|---|---|---|---|
| d/m/y | 25° C. | | | | | | | mg/kg | | | | | | |
| 31/8/89 KA21 | 8.94 | 7.42 | 840 | 142 | 1.58 | 0.22 | 1292 | 2.55 | 16 | 146 | 57.7 | 1.22 | 980 | 2.02 |
| 30/5/89 KA19 | 9.22 | 5.28 | 657 | 99.6 | 0.90 | 0.10 | 991 | 2.94 | 20 | 126 | 43.0 | 0.97 | 821 | 2.26 |
| 30/5/89 KA35 | 9.08 | 5.43 | 667 | 104 | 1.52 | <.05 | 1017 | 2.54 | 18 | 139 | 55.2 | 0.99 | 804 | 1.98 |
| 18/5/89 KA21/27 MIXED | 9.09 | 6.99 | 790 | 124 | 0.61 | <.05 | 1163 | 2.64 | 20 | 225 | 47.2 | 1.03 | 923 | 1.91 |

It has been conventional to use these high temperature geothermal waters as an energy source. That is, the heat in the water is converted to other power embodiments, such as steam and/or electricity. Of course, as the heat in the geothermal water is converted to a more useful form, the temperature and pressure of the water becomes reduced, and most salts contained therein become less soluble. The dissolved salts often precipitate in an uncontrolled manner fouling the tanks and equipment with which they are in contact. The siliceous values in the cooled geothermal water often precipitate out as silicates, sometimes iron silicate, which is not a particularly valuable material. Often, the most problemsome material which forms upon cooling is derived from the available siliceous values. This small amount of siliceous material deposits as a hard, dense, vitreous amorphous silica scale which has a structure which is similar to that shown in FIG. 8.

Further, since the spent waters, after recovering their energy values are often reinjected into the formation, these cooled, lower pressure waters have a higher effective content of dissolved and suspended materials. When this water is reinjected, it is sometimes detrimental to the field in that some of the less soluble salts tend to precipitate out, or to deposit out as scale, such as in the form of amorphous silica, calcite, and/or barium sulfate. Such mineral deposits contribute to the clogging of reinjection pipes, wells and underground formations about the reinjection area.

Arsenic is generally present in geothermal waters. This is an inconvenient and often detrimental component of the geothermal water because it can be toxic to certain environments. The uncontrolled precipitation of the dissolved ions in the geothermal water is also accompanied by the coprecipitation of arsenic values along with the various salts. Even where efforts are made to control the precipitation conditions and to thereby make a desirable silica product, unless special precautions are taken, the arsenic tends to coprecipitate along with, and be adsorbed on the surface of, the silica. This arsenic contamination of the precipitated silica can be a substantial problem, depending on the use to which the silica is to be put. Thus, at least for some end uses, procedures must be adopted to reduce or eliminate the arsenic contamination of the silica product. For example, when the silica product of this invention is to be used in paper coating or impregnation applications, the arsenic content of the precipitated silica should be maintained at a level such that, in the final paper product, the arsenic concentration is below about 2 mg/kg of paper.

SUMMARY OF THE INVENTION

It is an object of this invention to provide means for treating geothermal, or other comparable water, in a manner such that amorphous silica is precipitated therefrom in a controlled manner.

It is another object of this invention to recover special forms of amorphous silica from geothermal water as part of an energy recovery operation.

It is still another object of this invention to substantially prevent, or at least retard the formation of uncontrolled precipitates of silicas, or other salts, onto process equipment while accomplishing the other objectives of this invention.

It is still another object of this invention to provide novel forms of particulate amorphous silicas.

It is a further object of this invention to provide uses for the novel solid particulate silicas made and recovered from dissolved siliceous species in geothermal water.

Other and additional objects of this invention will become apparent from a consideration of this entire specification, including the various figures of the drawings hereof and the claims appended hereto.

In accord with and fulfilling these objects, one aspect of this invention is a process for the formation and recovery of special amorphous silicas from geothermal waters, or the like. According to this aspect of this invention, amorphous silica having a tertiary aggregate structure, selected from at least one member of the group consisting of Type-I, Type-II and Type-III, as will be hereinafter defined, is suitably made by a process including:

providing a source fluid containing siliceous materials and an amount of a coagulation or precipitation agent for siliceous materials, selected from the group consisting of at least one cation, at least one cationic polymer, at least one cationic flocculent, at least one non-ionic flocculent, and previously produced amorphous silica of the type sought to be produced, which is insufficient to cause substantial quantities of said siliceous materials to come out of solution in said source fluid;

adjusting the pH of the fluid to up to, but not substantially more than, about 9.5, and maintaining such in this pH range during the following steps;

causing said source fluid to become supersaturated with respect to amorphous silica and initiating polymerization of said siliceous materials therein into polymeric material comprising primary particles of polymeric amorphous silica, without causing substantial quantities of said siliceous materials to be precipitated, to thereby form a silica sol, particularly a substantially stable silica sol;

aging said silica sol, by holding such for a time sufficient to continue the polymerization of said siliceous materials in said sol into said polymeric material, including polymeric silicas of larger size than the primary particles made in the supersaturation step set forth above, without causing substantial quantities of said polymeric material to be precipitated at that time; and then adding to said silica sol a sufficient quantity of at least one of said precipitation and/or coagulation agents to provide a sufficient concentration thereof, in relation to said polymeric material, to convert said polymeric material into silica particles having a tertiary aggregate structure of said Type-I, Type-II or Type-III and to cause rapid precipitation thereof from said silica sol.

In accord with and fulfilling the objects of this invention, another aspect of this invention comprises the amorphous silicas produced by this process. Silicas which are substantially the same as those produced by this process, but produced by different processes, or by variants in the instant described process, are also considered to be included within this aspect of this invention. These Type I, II or III amorphous silicas have a distinct microstructure which is discernable from electron photomicrographs thereof. In this regard, reference is made to FIGS. 1, 2 and 3, which are transmission electron photomicrographs of Type I amorphous silicas; FIGS. 4 and 5 which are transmission electron photomicrographs of Type II amorphous silicas; and FIGS. 6 and 7 which are transmission electron photomicrographs of Type III amorphous silicas.

The precipitated amorphous silicas of this invention are classified according to the structure they possess, as noted above. These different amorphous silicas are characterized as:

Type I: Precipitated silica possessing primary, secondary and tertiary aggregate structure.

The primary silica particles are about 1.5 nm in size. The secondary amorphous silica particles are discernible in the transmission electron photomicrographs of the drawing hereof as having some overlapping boundaries and some random shapes approximately described in geometric terms as elongate ellipsoids.

Type I precipitated silica results from coagulation of silica from geothermal water in which dissolved silica species have been allowed to polymerize in the presence of a precipitation agent at a concentration lower than the "critical coagulant concentration". This concentration includes zero. The precipitation agents being referred to herein are those which reduce the electrostatic repulsive forces between particles of silica. For example, a primary coagulant cation can be $Ca^{2+}$. The "critical coagulant concentration" as this term is used in this specification, is the concentration of coagulant at which rapid coagulation of the silica particles results in precipitation of these coagulated particles. According to this invention, the polymerization of the dissolved silica species is allowed to proceed until the concentration of molybdate reactive silica is substantially reduced. The time needed to effect this extent of polymerization is dependent on pH, temperature, initial silicic acid concentration, and yield required.

The tertiary aggregate structure of this Type I precipitated amorphous silica comprises accretions of the secondary particles described above. The tertiary aggregate structure is characterized as being made up of secondary particles and "bridging silica", which comprises primary silica particles. This bridging silica serves to provide in-fill silica which completes the tertiary aggregate structure. It should be noted that there is substantial uniformity with respect to the size of the secondary silica particles and the bridging silica in this structure. The tertiary aggregate amorphous silica particles of Type I made according to this aspect of this invention have a chain-like structure.

Type I precipitated silica satisfies the IUPAC classification for mesoporous material. Although this Type I silica is structurally unique, it is also structurally consistent, as defined by transmission electron microscopy, with G-type silica gels and pyrogenic "fume" silicas produced from steam hydrolysis of silicon tetrachloride. Commercial materials, which are sold under the tradename: Aerosils, are generically similar in structure, as observed through transmission electron microscopy, to the Type I silicas of this invention, but are specifically distinct therefrom.

Type II: Precipitated silica possessing primary, secondary and tertiary aggregate structure.

The primary particles of this structure silica are also about 1.5 nm in size. The secondary particles are formed of aggregated primary particles and have a substantially spherical shape. The effective diameter of these secondary spherical particles is very variable.

The tertiary aggregate structure of these Type II silica particles comprises aggregated secondary particles and is characterized by the random packing of the secondary particles in discrete form and variable size. The tertiary aggregate particles of Type II silica lack the chain-like structure of tertiary aggregate particles of Type I silica. It is apparent, from a consideration of the transmission electron photomicrographs of FIGS. 4 and 5, that the presence of secondary inter-particulate bridging silica is less evident in Type II silica particles than it is in Type I silica particles.

Although the particles of Type II precipitated tertiary aggregate amorphous silica made according to this invention have unique microstructure, which gives them unique physical properties and attributes, this material is morphologically consistent, as seen by transmission electron microscopy, with pyrogenic silicas made under anhydrous conditions, e.g. arc or plasma silicas.

Type II precipitated silica results from coagulation of silica from geothermal water to which a precipitation or coagulation agent, which is capable of reducing the electrostatic forces of the negatively charged primary silica particles once formed, has been added prior to the occurrence of spontaneous nucleation. Spontaneous nucleation results in the formation of critical size primary particles. The point of addition of coagulant depends on the degree of supersaturation of the process stream with respect to amorphous silica solubility as spontaneous nucleation cannot occur until this is exceeded. The concentration of coagulant which is added should be sufficient to exceed the critical coagulant concentration by an amount sufficient to effect progressive coagulation, growth, and precipitation of the tertiary aggregate silica.

Type III: Precipitated silica possessing primary, secondary and tertiary aggregate structure.

The size of the primary particles of the Type III amorphous silica made according to this invention is also about 1.5 nm. Secondary particles of this Type III silica comprise aggregates of these primary particles. These secondary particles are variable in both size and shape. The transmission electron photomicrographs of the drawing hereof show that secondary particles of Type I and Type II amorphous silica are also present in addition to the Type III material.

The tertiary aggregate structure of Type III amorphous silica combines many of the characteristics of both Type I and Type II amorphous silicas, respectively and is best characterized as diverse. This type of structure lacks uniformity of secondary particle size and shape, but does have silica bridging the secondary particles. FIGS. 6 and 7 show that the tertiary aggregate Type III precipitated amorphous silica of this invention contains secondary particles of silica and bridging silica material which has cross-sectional (equivalent circular) diameters significantly larger than tertiary aggregate particles of Type I precipitated silica.

Type III precipitated silica results from coagulation of silica from geothermal water to which an agent capable of reducing the electrostatic repulsive forces of the negatively charged silica particles once formed has been added during spontaneous nucleation and polymerization. The characteristics of the precipitated silica depend on the exact timing of coagulant addition relative to the rate of polymerization. The existence of a significant induction period for the silica polymerization of this invention, at low initial silicic acid concentrations, enables addition of coagulant just prior to and during subsequent polymerization. The induction period, in this context, refers to the time required for the critical size nuclei to form and to grow to a point where the concentration of molybdate reactive silica is measurably reduced.

If silicic acid concentrations are sufficiently high, such that a very short induction period exists, a greater fraction of Type I silica results. If the concentration of silica is low, so that a longer induction period applies, a greater proportion of Type II tertiary aggregate silica precipitates.

The principal differences in structure of precipitated silicas which have been made according to the present invention involve the nature of the secondary particles, or particulate system, and the resultant tertiary aggregate structure. Transmission electron microscopy has not resolved a primary particle size difference for the precipitated silicas identified above. Secondary silica particle morphology, and therefore, tertiary aggregate particle structure, as developed from aqueous solution experiments, can be influenced by the stage of polymerization of the silica values at which a coagulating/ precipitating agent is introduced into the process stream.

BRIEF DESCRIPTION OF THE DRAWING

FIG. 24 is a graphical representation of the rate at which monomeric silica values can be removed from geothermal source fluid in the presence of recycled slurried particles of Type I tertiary aggregate amorphous silica.

In FIG. 1, the precipitated silica has a tertiary aggregate structure arising from secondary particles of silica being bound together by substantial amounts of bridging silica. Primary particles can be seen as small rod like entities –1.5 nm in size. The precipitated silica shown in FIG. 2 is consistent with commercial precipitated and pyrogenic silicas made in the presence of hydrogen containing compounds, e.g. Aerosils, made by steam hydrolysis of $SiCl_4$. Each precipitate was prepared by using 200 mg/kg $Ca^{2+}$ as coagulant, with small differences in initial silicic acid concentration, pH and temperature. The secondary particles shown in FIGS. 4 and 5 have spherical geometry and are of variable size, consistent with pyrogenic silicas normally produced under anhydrous conditions. The photomicrographs of FIGS. 6 and 7 reveal a combination of the structural characteristics of Types I and II silicas. The Type I component typically contains large secondary particles and bridging silica together with a smaller size fraction normally contained in pure Type I silica.

DETAILED DESCRIPTION OF THIS INVENTION

A colloidal silica sol generally contains particles of the primary type. However, aggregation of these primary particles, to form secondary particles which are approximately spherical, occurs throughout the entire period of aging and/or when electrostatic dispersive forces are reduced through introduction of a suitable precipitation or coagulation agent. In the dispersed state, the secondary particles also constitute a colloidal silica sol, although this may not remain stable with time; i.e. these secondary particles of precipitated silica may settle The sol so formed for Types I and III silicas consists of secondary particles together with primary particles in various stages of aggregation (see FIGS. 1–3 and 6–7). Aggregation of, and in-fill between, secondary spheroidal particles and accretion of the same is consistent with the low solubility of this region with respect to amorphous silica, due to the negative radius of curvature occurring when any two spheroidal particles approach one another. However, for Type II silica, the development of secondary particles is essentially complete (see FIGS. 4 and 5). These stages of aggregation are consistent with the presence of secondary particulate silica of variable shape and form in the final, substantially tertiary aggregate structure produced from the destabilization and precipitation of the silica in these sols.

At slightly acidic to neutral pH, the silica surface is only partly ionized and as such may continue to hydrogen bond and therefore, aggregate, to form larger secondary particles. At higher pH, e.g. 8 to 9, the primary silica particles, and small aggregates of the primary particles, are more negatively charged. Further aggregation to develop full secondary and tertiary particulate structure requires reduction of these electrostatic repulsive forces by addition of a precipitation agent, such as a cationic agent or a nucleus onto which additional silica will grow.

Figure 8:
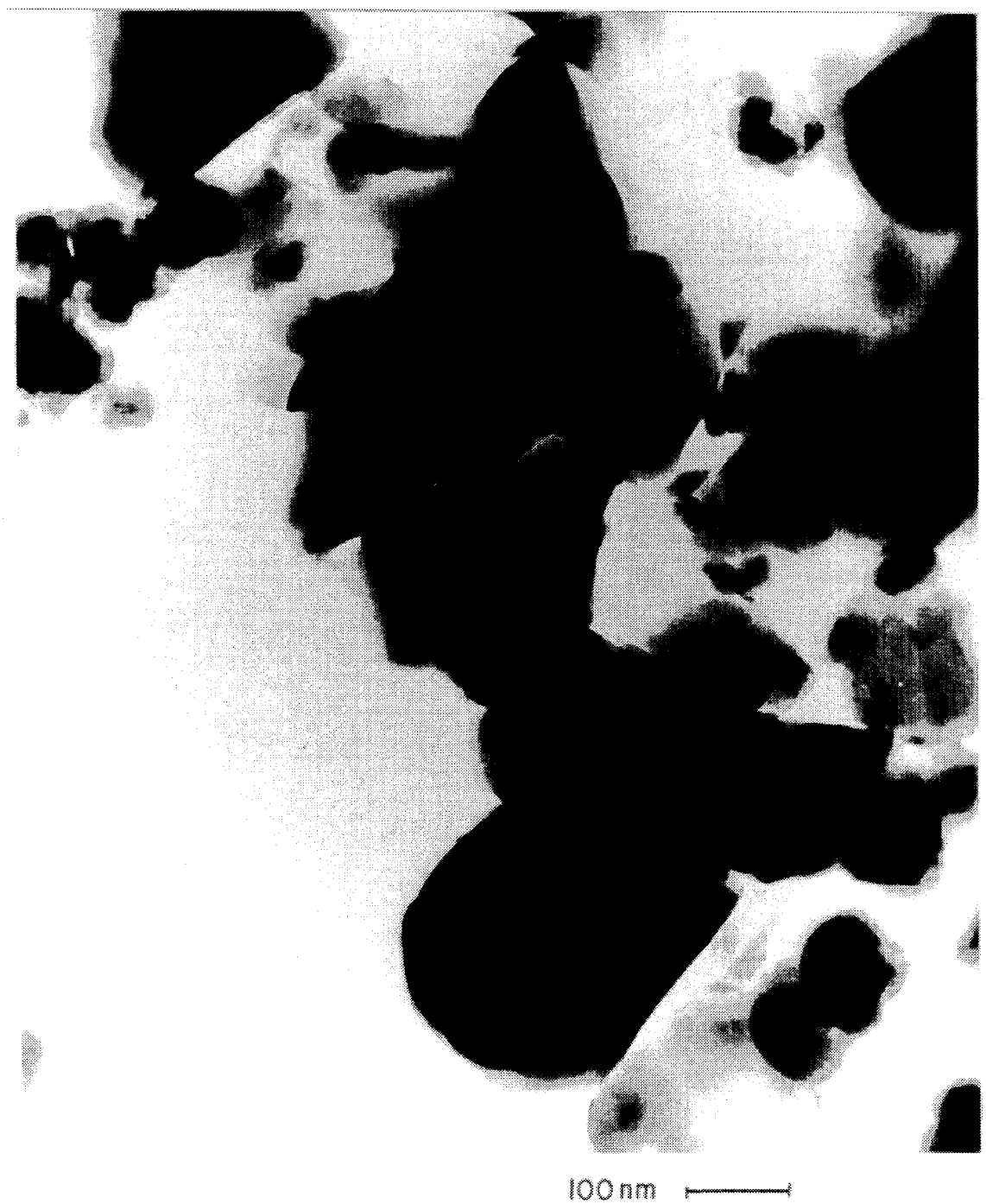
FIG. 8 is a photomicrograph of a natural silica deposit.
Figure 9:
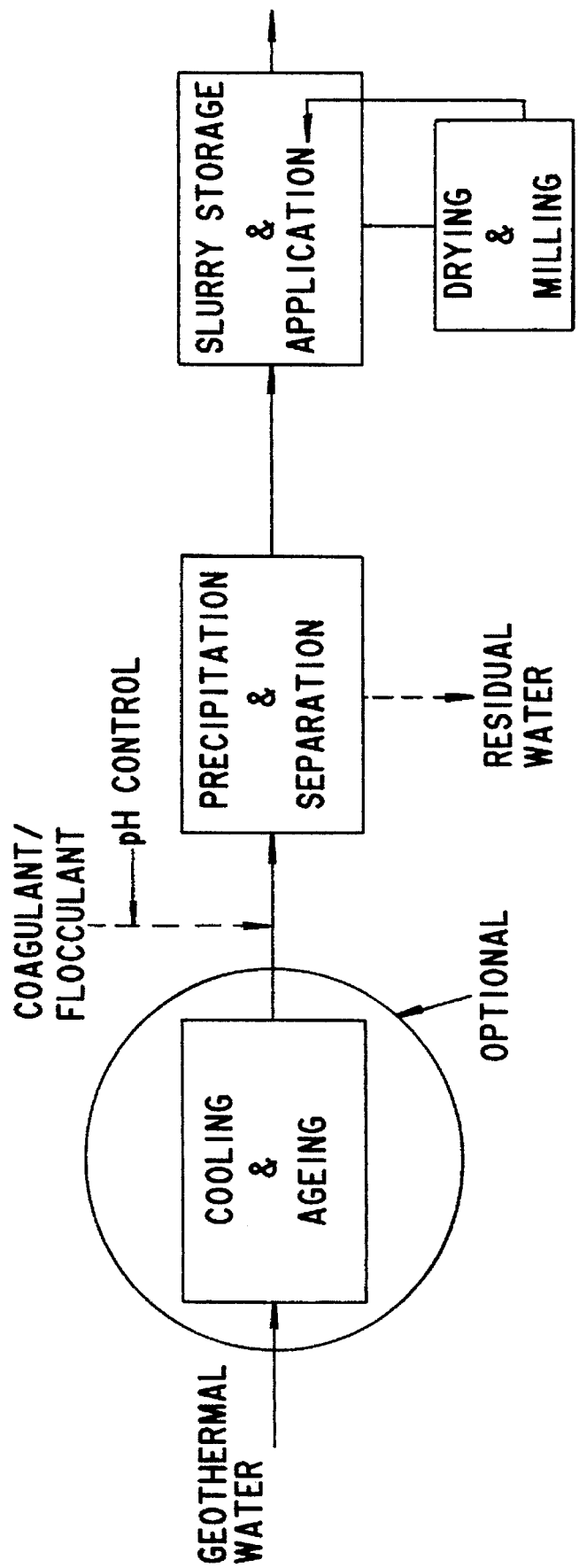
FIG. 9 is a block flow diagram of the process of this invention.

Under most conditions the relatively dilute nature and neutral to alkaline pH of the geothermal waters renders the initial sol stable. However, if precipitation/deposition does occur naturally, it is usually uncontrolled and, depending upon the local environmental conditions, the resulting amorphous silica exhibits a wide range of particle sizes and shapes (see FIG. 8). In addition, geothermal waters contain a wide range of other constituents, present in either cation or anion form. For example, significant concentrations of Na, K, Li, Ca, Mg, Rb, Cs, B, $SO_4$, Cl, As, and Hg can be present. Some constituents such as arsenic, can readily be adsorbed onto the surface of the colloidal silica at a particular pH and under specific precipitation conditions, such as those that do exist naturally. The naturally precipitated silica, therefore, usually contains significant quantities of arsenic adsorbed on its surface, which, together with its wide range in particle size and shape, often renders this naturally precipitated silica unsuitable for many of the commercial applications considered here.

However, under controlled conditions, precipitation can be induced to yield a product which is suitable for many commercial applications, such as, for example, for use in papermaking which will be described herein in greater detail. In this controlled precipitation, primary silica particles are always the fundamental silica unit from which the secondary particles, and then the tertiary aggregates particles, develop.

The secondary and tertiary particle size, surface hydroxyl, that is silanol, group density, chemical purity and optical quality of the silica product can be controlled by the practice of this invention. Such controlling factors include aging time, stage at which coagulant/precipitation agent is added, method of cooling the geothermal water, the cooling rate profile, precipitation temperature, pH and nature and concentration of the precipitation agent used.

Manipulation of these process parameters provides the suite of precipitated silicas classified herein as Types I, II and III. FIGS. 1 to 7 illustrate some of the more structurally different products which have been made by the process of this invention. Detailed procedures of polymerization, particle growth and precipitation are provided in the laboratory and process examples, infra.

It is preferred in the practice of this invention that the source fluid is a naturally occurring geothermal fluid at an elevated temperature. However, it is considered to be within the scope of this invention to utilize an aqueous solution of siliceous values which has been synthetically derived, or a naturally occurring aqueous solution which has been modified to increase or decrease its ion contents and/or make up. It is also preferred that the source fluid contain about 400 to 1,400 mg of dissolved or dispersed siliceous values per kg of solution.

A further object of this invention is fulfilled by the discovery of special uses to which the silicas of this invention may be put. The silicas of this invention can be recovered in slurry, cake, or powder form. They can be used in place of silicas which have been made by conventional processes. However, it has been found that the silicas of this invention have special attributes when used as fillers, impregnants or coatings for paper. In particular, it has been found that paper which has been coated or impregnated with a silica which has been made according to this invention has substantially improved opacity and substantially better ink retention in preselected defined areas as compared to papers which have been impregnated and/or coated with conventional silicas.

Other uses to which the silicas of this invention can be put with advantage include, inter alia, as fillers and opacifiers for rubbers, paints, plastic materials, cements and cementitious compositions such as concrete, and adhesives. These novel silicas also find excellent application as absorbents, particularly in connection with the distribution of agricultural chemicals and other materials which require a substrate or an additive with specific predeterminable surface absorption characteristics.

According to another aspect of this invention, amorphous silica having a tertiary aggregate structure of Type-I, and having a BET surface area of at least 4 $m^2/gm$, can be made by a method which comprises:

providing an aqueous source fluid containing about 400 to 1,400 mg of dissolved siliceous materials per kilogram of fluid and an amount of a precipitation agent for said siliceous materials, selected from the group consisting of at least one cation, at least one cationic polymer, at least one cationic flocculent, at least one non-ionic flocculent, and previously produced particles of tertiary aggregate Type I silica, which is insufficient to cause substantial quantities of the desired siliceous materials to come out of solution in said source fluid;

adjusting the pH of said fluid to about 5 to 9.5 and maintaining such at these pH levels during the following steps;

forming a stable silica sol, by causing said source fluid to become supersaturated with respect to amorphous silica and initiating polymerization of said siliceous materials therein into polymeric material comprising primary particles of polymeric amorphous silica, without causing substantial quantities of said siliceous materials to be precipitated;

rapidly cooling said silica sol to a lower temperature, which is at least about 30° C.;

aging said silica sol, without adding precipitation agent thereto in an amount sufficient to cause substantial precipitation of tertiary aggregate silica particles therefrom, by holding such for a time sufficient to continue the polymerization of said siliceous materials in said sol into polymeric material comprising primary amorphous silica particles which are capable of being converted, by adjusting the concentration of precipitation agent, into tertiary aggregate amorphous silica particles of Type-I structure; and adding to said silica sol a sufficient quantity of at least one of said precipitation agents, in a manner so as not to raise the pH of the system to over about 9.5, to provide a sufficient proportion thereof in relation to said polymeric material to convert said polymeric material into a silica particle having a tertiary aggregate structure of Type-I and to cause rapid precipitation thereof.

Another aspect of this invention involves the formation of amorphous siliceous material having a tertiary aggregate structure of Type-II. This material is made by a method which comprises:

providing an aqueous source fluid containing about 400 to 1,400 mg of dissolved siliceous materials per kilogram of fluid and an amount of a precipitation agent for said siliceous materials, selected from the group consisting of at least one cation, at least one cationic polymer, at least one cationic flocculent, at least one non-ionic flocculent, and an amount of previously produced particles of tertiary aggregate Type II silica which is insufficient to cause substantial quantities of said siliceous materials to come out of solution in said source fluid;

forming a stable silica sol, by causing said source fluid to become supersaturated with respect to amorphous silica, and initiating polymerization of said siliceous materials therein into polymeric material comprising primary particles of polymeric amorphous silica, without causing substantial quantities of said siliceous materials to be precipitated;

adding to said sol, prior to there being any substantial decrease in molybdate active silica concentration therein, a sufficient quantity of at least one precipitation agent to cause the conversion of said polymeric amorphous silica into amorphous silica particles of tertiary aggregate structure of Type-II;

adjusting the pH of said fluid at about 5 to 9.5 and maintaining such at this level for the remainder of this process;

aging said silica sol at said pH, without adding further precipitation agent thereto in an amount sufficient to cause substantial precipitation of tertiary aggregate silica particles therefrom, by holding such for a time sufficient to continue the polymerization of said siliceous materials in said sol into polymeric material comprising primary amorphous silica particles which are capable of being converted, by adjusting the concentration of precipitation agent, into tertiary aggregate amorphous silica particles of Type-II structure; and then, upon the formation of a quantity of amorphous silica tertiary aggregate particles of structure Type-II sufficient to allow the precipitation thereof, adding to said system a sufficient quantity of at least one of said precipitation agents, in a manner so as not to raise the pH of the system to over about 9.5, to provide a sufficient proportion thereof in relation to said polymeric material to convert said polymeric material into silica particles having a tertiary aggregate structure of Type-II, and to cause the rapid precipitation thereof.

Where the desired product is a Type II amorphous silica tertiary aggregate particle, it has been found to be preferable to employ a source fluid which has been artificially generated. This includes a source fluid which has been naturally produced and which has been modified to either increase or decrease the ion make up and concentration therein.

According to still another aspect of this invention, amorphous silica having a tertiary aggregate structure of Type-III is made by a method which comprises:

providing an aqueous source fluid containing about 400 to 1,400 mg of dissolved siliceous materials per kilogram of fluid and an amount of a precipitation agent for said siliceous materials, selected from the group consisting of at least one cation, at least one cationic polymer, at least one cationic flocculent, at least one non-ionic flocculent, and previously made particles of tertiary aggregate Type III amorphous silica, which is insufficient to cause substantial quantities of said siliceous materials to come out of solution in said source fluid;

forming a stable silica sol, by causing said source fluid to become supersaturated with respect to amorphous silica and initiating polymerization of said siliceous materials therein into polymeric material comprising primary particles of polymeric amorphous silica, without causing substantial quantities of said siliceous materials to be precipitated;

adding a sufficient quantity of a precipitation agent, or additional precipitating agent as defined above, to said sol, to cause the conversion of said polymeric amorphous silica into amorphous silica particles of tertiary aggregate structure of Type-III and to cause the precipitation thereof from said sol;

adjusting the pH of said fluid to about 5 to 9.5;

aging said silica sol at said pH, without adding further precipitation agent thereto, by holding such for a time and under conditions sufficient to cause additional polymerization of dissolved siliceous materials in said sol into polymeric material comprising primary amorphous silica particles which are capable of being converted, by adjusting the concentration of precipitation agent, into tertiary aggregate amorphous silica particles of Type-III structure; and then, upon the formation of a quantity of amorphous silica tertiary aggregate particles of Type-III structure sufficient to allow the precipitation thereof, adding to said system further quantities of at least one of said precipitation agents, in a manner so as not to raise the pH of the system to over about 9.5, to provide a sufficient proportion thereof in relation to said polymeric material to convert more of said polymeric material into silica particles having a tertiary aggregate structure of Type-III, and to cause the rapid precipitation thereof.

Preferably the source fluid is a geothermal fluid. Preferably the concentration of silica in the source fluid is about 400 to 1,400 mg/kg expressed as silica. This preferred concentration promotes spontaneous nucleation. This range of concentrations is often present in geothermal water which is being discharged from a power generation operation in which the power source is the geothermal water. Higher silica concentrations do sometimes occur in some geothermal water sources. Processing of these geothermal fluids with such higher silica contents can be carried out in a manner which is substantially similar to that described here. It may be desirable, or even in some cases necessary, to dilute the source fluid or to change its pH in order to be better able to control the onset and rate of polymerization of the dissolved siliceous values to form primary particles. A process stream with lower initial silicic acid concentrations may require lower process temperatures to promote spontaneous nucleation. Preferably the aging of the source fluid is for such time as will cause the initiation of polymerization of the siliceous values within the fluid to form the necessary primary particles which will then be converted to the desired tertiary aggregate particles of this invention.

Where arsenic reduction is required, it has been noted that this can be accomplished by reducing the temperature of the source fluid. Such temperature reduction, however, must not be to an extent sufficient to cause the premature aggregation and precipitation of particulate silica. Within this caveat, it is acceptable to reduce the temperature of the source fluid, either before, during or after the initial step of aging the source fluid. It is also acceptable to reduce the temperature of the stable silica sol, but not so much as will destabilize the sol. This lowering of the temperature will tend to prevent or retard the coprecipitation of the arsenic with the silica in an amount which is detrimental to the quality of the final product. It has been found that if the source fluid, and/or the silica sol, is left at higher temperature for a long time (refer to FIG. 11), more arsenic appears to become associated with the silica in the sol and is adsorbed on to the tertiary aggregate silica particles upon its precipitation from the silica sol. Conversely, when the source fluid temperature is maintained at a lower temperature for the same time, the amount of arsenic which coprecipitates is substantially reduced.

Where the source fluid includes arsenic values and a temperature reduction step is considered to be desirable in order to limit the amount of arsenic adsorbed onto the precipitating silica, it is preferred to lower this temperature of the source fluid prior to the aging thereof. The adsorption of arsenic onto the surface of colloidal silica in the sol is believed to be, at least in part, a kinetic temperature dependent relationship. Lowering the temperature of the source fluid as long as possible before the aging step is initiated appears to be effective in reducing arsenic adsorption, and thus, is effective in reducing ultimate arsenic concentrations in the product amorphous silica particles having substantially a tertiary aggregate structure.

In one aspect, the present invention may broadly be said to consist in a method of obtaining precipitated amorphous silica having substantially a tertiary aggregate structure (whether as an aqueous slurry, as a cake, powder, gel or otherwise) from a geothermal fluid (natural or induced). The temperature of the source fluid is preferably adjusted to, and maintained at or near, about 100° C., and it is rapidly cooled to a lower temperature of at least about 30° C. prior to initiating the aging step (except where Type II amorphous silica is being made). Preferably the aging step is performed at a pH of about 7 to 9.5, however, where the silica concentration in the source fluid is sufficiently high to effect rapid polymerization, lower pH's can be used, e.g. about 5 to 7. Preferably the aging of the source fluid is for such time as is necessary for the polymerization of the siliceous moieties within the fluid to polymerize into primary particles.

Preferably the precipitation step involves the addition to the silica sol of precipitation agents and/or coagulants which will induce precipitation of amorphous silica but will not introduce excessive amounts of undesired contaminants into the system to be co-precipitated with the silica. Most preferably, when the precipitation operation is initiated, the pH of the silica sol is made slightly alkaline, (e.g. preferably a pH of from 7 to 9.5). The addition of a cation or cationic polymer to such an alkaline pH sol is usually sufficient to induce precipitation. A preferred cation is a $Ca^{2+}$. However, $Al^{3+}$ or $Fe^{3+}$ can be used instead of, or in conjunction with, this preferred cation, provided that the use of these latter cations does not degrade the product.

Another option available, in inducing the precipitation of tertiary aggregate silica particles from the substantially stable silica sol, which can be used in conjunction with the use of the coagulants mentioned above, or independent of these, is the use of an organic flocculent. It is most appropriate to use a cationic organic flocculent at higher pH where the silica surface is substantially negatively charged; and a non-ionic organic flocculent when the sol is at or below neutral pH. Under these conditions of lower pH, hydrogen bonding can occur.

In accord with one aspect of this invention, one preferred coagulant composition is a combination of a non-ionic flocculent and a cationic flocculent. In this embodiment, the combination should have relative proportions of about 0 to 5 parts by weight of the non-ionic flocculent, and about 0 to 5 parts by weight of the cationic flocculent per 1,000,000 parts by weight of the source fluid.

One suitable non-ionic material is polyethylene oxide. It has been found to be suitable to use polyethylene oxides of a molecular weight of about 200,000 to 8,000,000. Examples of these materials are available commercially from Union Carbide Corporation under the tradenames FRA and Kemira Netbond (FRA & FRB). One suitable cationic flocculent is a high charge density, low molecular weight polyamine. These materials are represented and exemplified by materials which are generally available and sold commercially by Allied Colloids Magnafloc under the tradename Magnafloc 368.

It is a further aspect of this invention to use previously prepared particles of tertiary aggregate amorphous silica as a heterogeneous precipitation agent. The addition of such previously prepared silica particles to a geothermal water source prior to its becoming supersaturated with silica values promotes the formation of new primary particles and causes them to accrete onto the previously prepared particles of tertiary aggregate silica. The accretion of newly formed primary silica particles takes place during and after the geothermal water becomes supersaturated with respect to amorphous silica. It is completed when the water portion of the geothermal source fluid is separated from the amorphous silica particles which have been grown. The desired siliceous values are thus precipitated from the stable silica sol in a controlled manner as larger particles.

Particularly, it has been found to be expedient to use, as the heterogeneous precipitation agent, a slurry of particles of previously prepared tertiary aggregate silica of the same type as is sought to be made. That is, if the heterogeneous particles are Type I tertiary aggregate amorphous silica particles, the product which results from practicing this aspect of this invention also has this same microstructure. This in itself is somewhat surprising, given that the amorphous precipitation agent, that is the previously prepared particles of amorphous silica, has no particular regularity of structure as would be the case if these particles were crystalline materials.

It is now known, from transmission electron microscope studies, for example those shown in FIGS. 25 to 29, that the new silica growth on the previously produced particles is caused by the addition of new primary particles of amorphous silica onto the previously prepared secondary particles of silica which have been added to the system. The formation of primary particles of pure amorphous silica from a system containing a heterogenous precipitation agent was an unexpected and remarkable result of the experiments which were conducted. Prior to this discovery of these experiments, it was known that spontaneous nucleation resulted in the formation of critical size nuclei which grew to the limiting dimensions of the primary particles as defined herein, that is up to about 1.5 nm. The introduction of particles of heteronucleating agent results in a system wherein two competing forces exist to remove the available siliceous values from the source fluid; that of homogeneous or spontaneous nucleation, and that of heterogeneous nucleation, that is accretion of the new primary particles on the added secondary particles to enlarge them. Prior to these experiments, it was not known, and it could not have been predicted, what form the precipitated silica would take when it was removed from the liquid phase onto the heterogeneous, or any other, preexisting silica surface. Prior knowledge in this technology (see Weres et al. 1980 publication) taught that the kinetics of monomeric silica removal could only be explained by molecular deposition of the silica. Molecular deposition of the silica would only result in a substantially non-porous, dense, vitreous coatings of silica onto the pre-existing surfaces. This coating would not contain a system of primary particles, and the resulting larger particles would have been expected to be more dense and less porous that the original secondary particle heterogenous precipitation agent. Rather, transmission electron microscopy has revealed that the practice of this aspect of the present invention maintains a primary particulate form.

It appears that the new silica growth on the old particles is by the addition of further primary particles of amorphous silica to the secondary particles of silica contained in the added slurry. The rate of silica removal from the geothermal source fluid is substantially greater when a higher amount of receptive silica solid surfaces are present as compared to the rate at which spontaneous nucleation occurs. When geothermal water is simply allowed to stand at constant temperature, pressure, and pH, monomeric silica polymerizes with itself and therefore grows primary particles which are capable of being converted to secondary particles which are further capable of being precipitated. As noted above, after the appropriate amount of primary particles have grown to the appropriate size by aging the geothermal fluid, precipitation thereof can be facilitated by the addition of an appropriate precipitation agent. However, when this same geothermal water, containing siliceous values which are about to polymerize, is allowed to age in the presence of previously formed amorphous silica particles, so that the polymerizing silica now has a receptive surface to grow on, the removal of silica from the liquid phase to the solid phase occurs much more rapidly. The induction period which is characteristic of a polymerization-particle growth-precipitation system is substantially shortened, and a different, and quite valuable, product is produced.

It has been found that it is possible to cause the polymerized siliceous values in the silica sol to accrete on to these previously made tertiary aggregate particles and to continue to grow thereon until the appropriate sized particles are produced, without the presence of other coagulant/precipitation agents at this stage. Once the grown particles are of an acceptable dimension, use can be made of other coagulant/ precipitation agents to effect complete precipitation of the so formed larger tertiary aggregate amorphous silica particles. The particles of amorphous silica made according to this aspect of this invention have substantially reduced contaminant levels, because no additional elements, such as calcium ions, are added in order to cause the growth of the desired particles and the precipitation thereof. Types I, II and III geothermal silicas precipitated according to this aspect of this invention have low arsenic concentrations as illustrated by the analysis shown in Table 9 in connection with Example 4. Of course, it is not possible to eliminate all extraneous materials from the product. There are usually some extraneous ions, both cations and anions, in the source fluid which will coprecipitate with the silica or be occluded thereby. Further, there may be some extraneous ions in with the previously prepared silica particles which are being used as the precipitation agent. However, the amount of extraneous materials can be significantly reduced by practicing this aspect of this invention.

When using a heterogenous precipitation agent, such as a slurry of previously prepared tertiary aggregate silica particles, it is appropriate to recycle a selected portion of particulate silica which has already been made and recovered from a source fluid. Previously prepared silica slurry can be recycled as a continuous stream to one point in the polymerization of the silica values in the source fluid with which it has been mixed, or it can be split so that variable solids ratios exist at different stages of the polymerization of the silica values in the source fluid with which it has been mixed. It is also within the spirit and scope of this invention to make tertiary aggregate amorphous silica particles, store such, either as a slurry or as dried particles or cake, and then use some of this stored material as a precipitation agent in a later operation. The amount of silica particles (slurry) added, and the point(s) at which it has been added will be selected to alter the range of secondary and tertiary particle size distribution which will result from the process.

The recycled particles can still be associated with the fluid in which they are resident without further recovery or purification thereof. Alternatively, the silica particles can be separated from the liquid and stored, and then reslurried for use at a later time. In any case, it has been found to be preferred in the practice of this aspect of this invention, not to add dry silica particles to the geothermal source fluid, but to always add these heterogeneous precipitation agents as a slurry.

It has been found that a small proportion of the heterogeneous precipitation agent is all that is needed to achieve accretion of primary particles onto pre-existing solid silica surfaces. Suitably about 0.01 to 1.0 weight per cent of silica particles, relative to the weight of the geothermal source fluid being treated, are all that are needed. It is within the scope of this invention to use such heterogeneous precipitation agents alone or in combination with one or more other precipitation/coagulation aids as aforesaid.

It has been found, quite unexpectedly, that the amorphous silica product made according to this aspect of this invention is somewhat different from the tertiary aggregate particles of amorphous silica which have been made using a coagulation/precipitation agent as aforesaid. It would have been expected that the accreted silica products made according to this aspect of this invention would be larger than the particles from which they were made, because of the additional silica which accreted on the original particles. Further, it would have been expected that some of the void volume of the precipitated silica would have been reduced by this growth. It has been found, quite to the contrary, and most unexpectedly, that this larger particle product made by this preferred process has a higher oil absorption capacity, and therefore higher void volume, than the smaller particles of amorphous silica which were used as the precipitation agent.

Still further, it has unexpectedly been found that the new, larger particles made by this aspect of this invention have a higher wet strength but a lower dry strength than the original particles of precipitated silica used at the outset. There is no reason to have suspected that this result would have been achieved. The accreted product particles can be easily ground to a readily dispersible, finely divided white powder.

According to this aspect of this embodiment of this invention, particles of tertiary aggregate amorphous silica of suitable Types I, II or III, are formed by the main embodiment of this invention using a cationic or other precipitation/ coagulation agent, such as calcium ions. In this step, the calcium ions are added at a point where the monomeric and polymeric silica concentration is close to the equilibrium solubility of the amorphous silica. The equilibrium solubility of the amorphous silica in the geothermal water is defined as the stable molybdate active silica concentration obtained when the geothermal water is maintained at constant temperature and pH, and is not otherwise altered. This yields Type I tertiary aggregate particles with a secondary particles size of about 4 to 10 nm.

This tertiary aggregate silica is then admixed with freshly separated geothermal fluid, causing the dissolved and suspended silica, comprising primary particles of the silica in the silica sol of the fresh geothermal water, to accrete on to the tertiary aggregate particles of silica which have been previously made and recycled. By this process, the size of the secondary particles can be grown in a controlled manner to at least about 30 nm.

The amount of the increase in size of the secondary particles has been found to be a function of the ratio of the preformed silica particles to the amount of the silica in the fresh (cooled and aged) geothermal water. In order to maximize the growth on the recycled secondary particles of silica, a ratio of about 0.05 to 0.5 parts by weight of preformed silica particles to silica in the fresh geothermal water should be maintained.

The particles of tertiary aggregate amorphous silica which have been made using a particulate silica precipitation agent can themselves be used to induce further precipitation of the primary particles in fresh geothermal water until the particles have grown to the desired secondary particle dimensions. Thus, the smallest particles are those made using a calcium, or other foreign precipitation agent, at the beginning of the process and these are added continuously to the freshly separated source fluid. Growth then occurs by the accretion of silica rich primary particles on to pre-existing less silica rich tertiary aggregate particles and the overall proportion of foreign matter decreases, and the purity of the recovered silica tertiary aggregate particles increases. Further, the use of such previously prepared particles of tertiary aggregate silica allows the process to be conveniently carried out in a continuous manner with the simple recycle of a portion of the product to an earlier part of the processing sequence.

Recognizing the positive attributes of using previously prepared particles of silica as an aid to the precipitation of tertiary aggregate silica from geothermal fluids containing siliceous values, it is also an important aspect of this invention to use this technique to protect processing equipment from the adverse effects of the build up of scale, by the uncontrolled precipitation of silica, and siliceous salts thereon, as a consequence of the geothermal water being cooled and depressurized. Thus, it is possible to protect, inter alia, steam/water separators, heat exchangers, piping and other processing equipment used in connection with the recovery of energy from geothermal fluids. It is further possible to protect the reinjection well, and the fractures in the formation surrounding it, from unwanted deposition.

It has been found that particles of tertiary aggregate silica, which have previously been made according to the process of this invention, should be added to the geothermal fluid before this fluid passes through the conventional heat recovery equipment. Interestingly, the equilibrium solubility of fixed concentrations of monomeric silica values in geothermal fluid at the same temperature, pressure and pH, are different as a function of the presence in that fluid of silica particles made according to this invention. In the past, as energy was removed from the geothermal fluid, and the siliceous values dissolved therein approached the supersaturation point, the silica randomly precipitated out on any available surface causing fouling of the insides of the piping and equipment. By seeding the geothermal fluid with previously prepared tertiary aggregate particles of amorphous silica, the silica does not seem to randomly precipitate on the equipment surfaces, but rather preferably accretes onto these previously prepared silica particles and causes such particles to grow to a size large enough to precipitate. The silica, however, precipitates as particles rather than as scale, which is a condition which can be handled much more readily than when scale forms on the inside of pipes and the like, and the process must be shut down periodically for clean out of the blocking silica scale. Thus, the walls and other surfaces of the processing equipment are protected in an unexpectedly efficient manner, and the desirable silica values are not lost from the system.

There is a further attribute. Since the tendency to form scale has been eliminated, or at least substantially reduced, by the pre-addition of the particles of tertiary aggregate silica to the geothermal source fluid, it has become possible to allow the geothermal fluid to be flashed at much lower pressures and temperatures without scaling becoming a problem. This allows substantially more energy to be recovered from the geothermal water than was previously possible. Thus, whereas without the practice of this aspect of this invention, it was possible to recover only so much of the energy from the geothermal water as was available upon flashing such to about 165° C., which is a temperature for high enthalpy geothermal resources at which the equilibrium solubility of the dissolved silica in the geothermal water is being closely approached, it is now possible to recover more energy from the fluid by allowing flashing down to a much lower temperature, such as, for example, about 80° C. Thus, with the practice of this aspect of this invention, it is now possible to extract up to about 25% more power from the geothermal source fluid, and the solids which are generated by the practice of this aspect of this invention are extracted from the system on a regular basis as a desired product, rather than an environmentally undesirable waste. The economics of the use of geothermal sources to generate power have thus been substantially improved.

As the source fluid has more energy extracted therefrom, by being flashed to a lower temperature, more of the salt content of this fluid is recoverable therefrom. Thus, when previously prepared particles of tertiary aggregate amorphous silica are added to the geothermal fluid, and energy recovered therefrom so as to reduce the temperature of the geothermal fluid to less than 100° C., more silica values are recovered from the fluid. When the spent geothermal fluid is then reinjected back into the formation from whence it was produced, the reinjected water has substantially less mineral content, and therefore, there is less potential damage to the formation by the reinjection of cooled fluid by the consequent deposition of salts on the walls of the wells and the producing formation. Not only has the energy generating efficiency of the use of geothermal water been increased, and the amount of desirable special particulate silica been increased, but in addition, the environmental impact of the reinjection of the spent geothermal fluid into the source formation, or into the ambient sewer or water system, has been substantially improved.

The heterogeneous precipitation agent can be added to the source fluid before it is aged, or after it has been suitably cooled and aged as aforesaid. It is, however, preferred to add the heterogeneous precipitation agent as early in the process as possible in order to obtain the maximum effect.

Reference is made to FIGS. 16–23 which show several methods of implementing this aspect of this invention. In referring to these figures of the drawing, the same reference characters will be used to denote common elements of the operation.

High pressure, high temperature water 10 is produced from a production well 12 and sent to a conventional high pressure separator where the released steam 16 is used to drive a high pressure turbine 18, with the exhaust steam 20 then being used to drive an intermediate pressure turbine 22. The underflow hot, high pressure water 24 which emerges from the high pressure separator 14 is fed to a secondary flash means 26, from which is produced a steam overhead which is also used to drive the intermediate pressure turbine 22. The underflow 28 from the secondary flash means 26 is the geothermal source fluid to be used in the practice of this invention. This fluid 28 is fed through a silica production facility 30 as has been described above with reference to FIG. 14. The silica produced in this facility is the product 32 of this invention, and the lean water 34 produced in this facility is suitably sewered or reinjected by means of a reinjection well 36 as appropriate. It is considered to be within the scope of this aspect of this invention to feed only a portion of the siliceous water 28 exiting the secondary flash means 26 to the silica recovery portion of this process and to reinject or sewer the rest 46. It is also considered to be within the scope of this aspect of this invention to use only a dual pressure condensing turbine fed with both primary and secondary separated steam, instead of using a primary and a secondary turbine.

Figure 16:
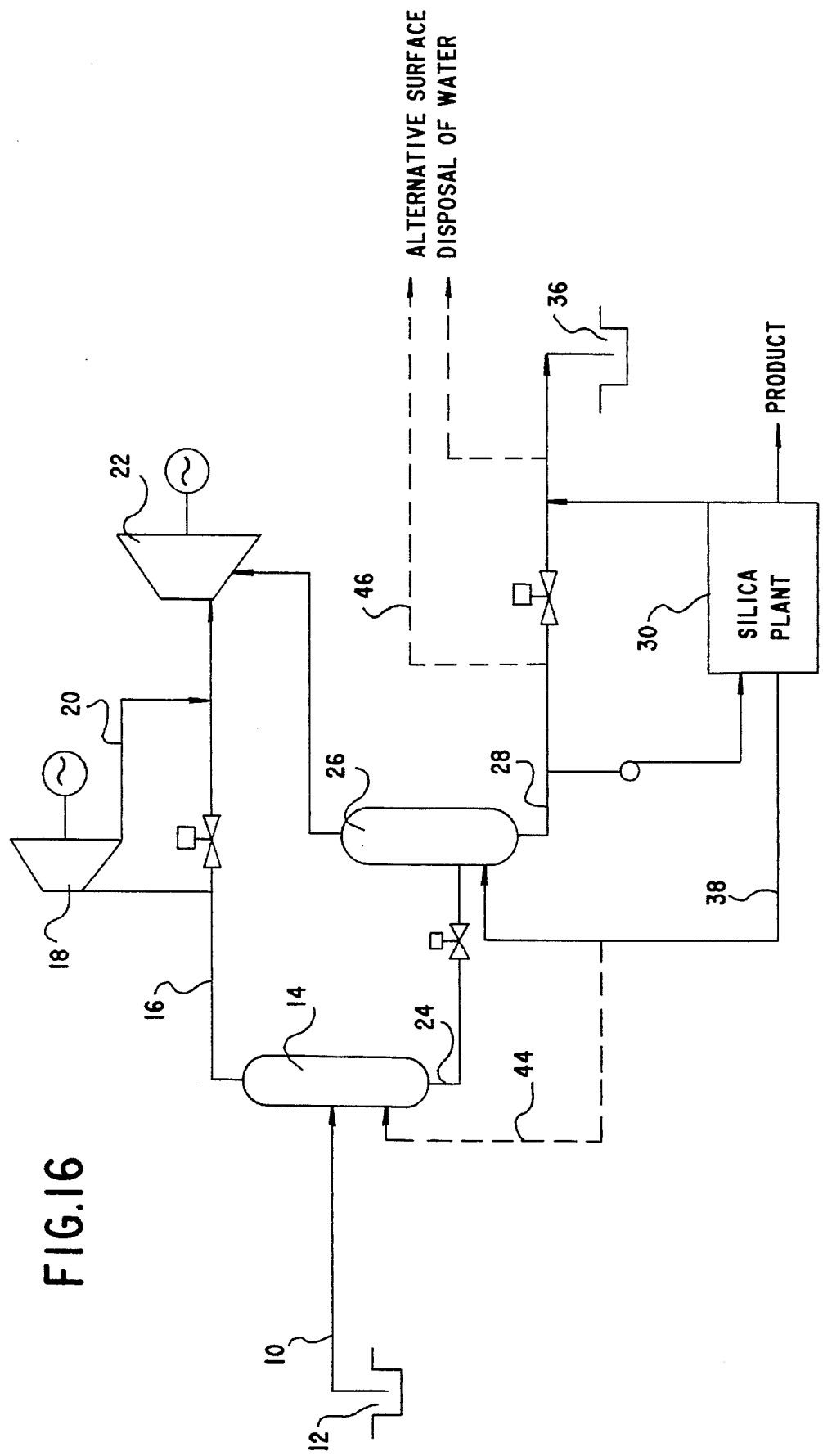
FIGS. 16, 17, 18, 19, 20, 21 and 22 are several schematic block flow diagrams of different process embodiments of this invention.

As illustrated in FIG. 16, according to this aspect of this invention, a portion 38 of the silica bearing slurry produced by the silica production facility 30 is recycled and introduced into the underflow from the high pressure separator 24 before this water is allowed to undergo the secondary flashing operation in the means 26, and/or optionally a portion of flow 38 may be introduced as a flow 44 into input feed side of the high pressure separation flash vessel 14. The silica produced in this facility is the product 32 of this invention, and the lean water 34 produced in this facility is suitably sewered or reinjected by means of a reinjection well 36 as appropriate.

Figure 17:
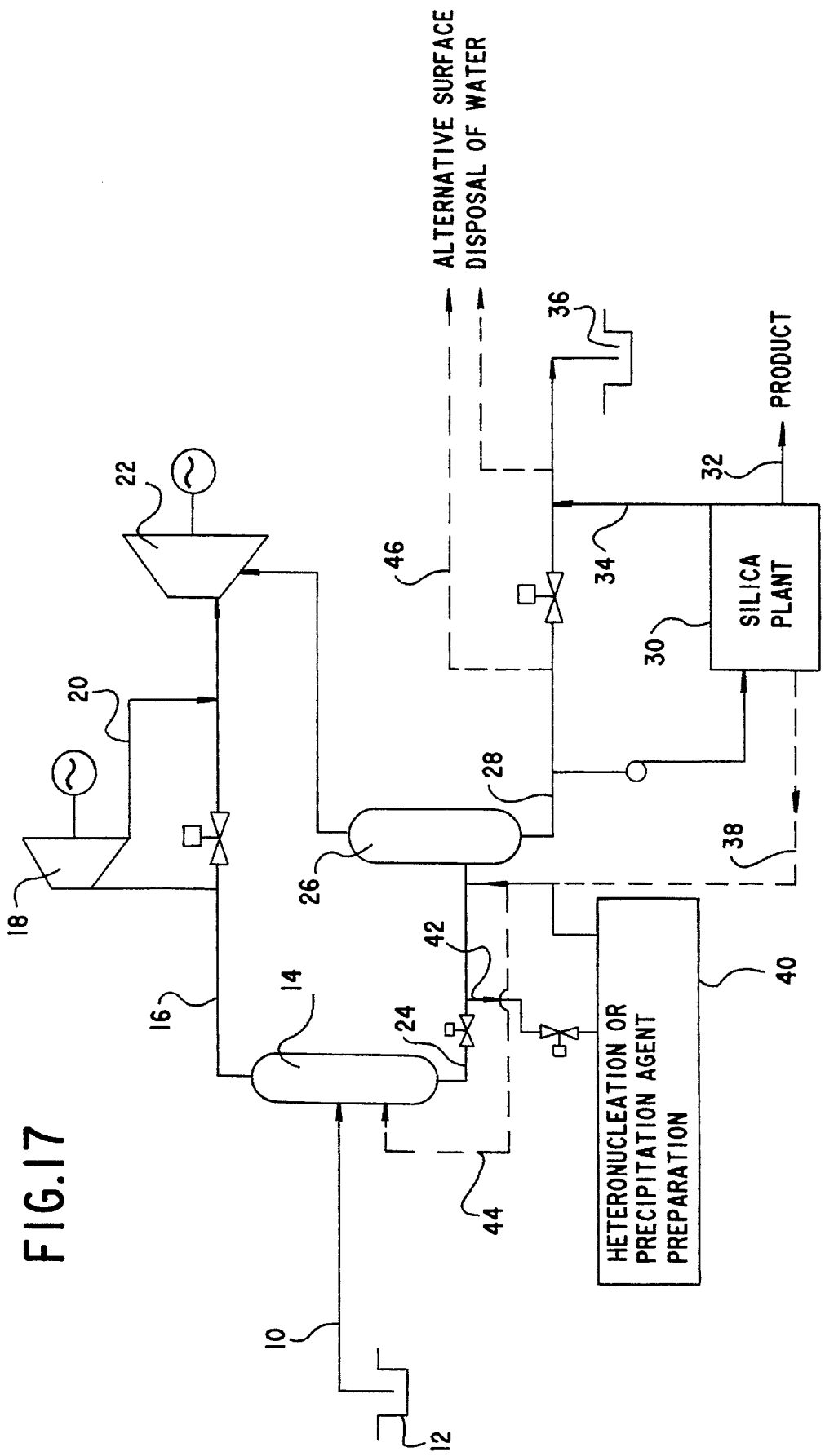

It is also considered to be within the scope of this invention as shown in FIG. 17, to take a slip stream 42 from the underflow 24 of the high pressure separator, to form the desired heterogeneous precipitation agent from the silica values contained therein, and then to reintroduce such precipitation agent into admixture with the remainder of the underflow 24, with or without a portion 38 of the silica bearing slurry produced by the silica production facility 30. In either case, the slurry 38 and 40 containing particulate silica made according to this invention can, if desired, be recycled back to the high pressure separator 14, via line 44, and the removal of the desirable siliceous values initiated at this point in the process.

Figure 18:
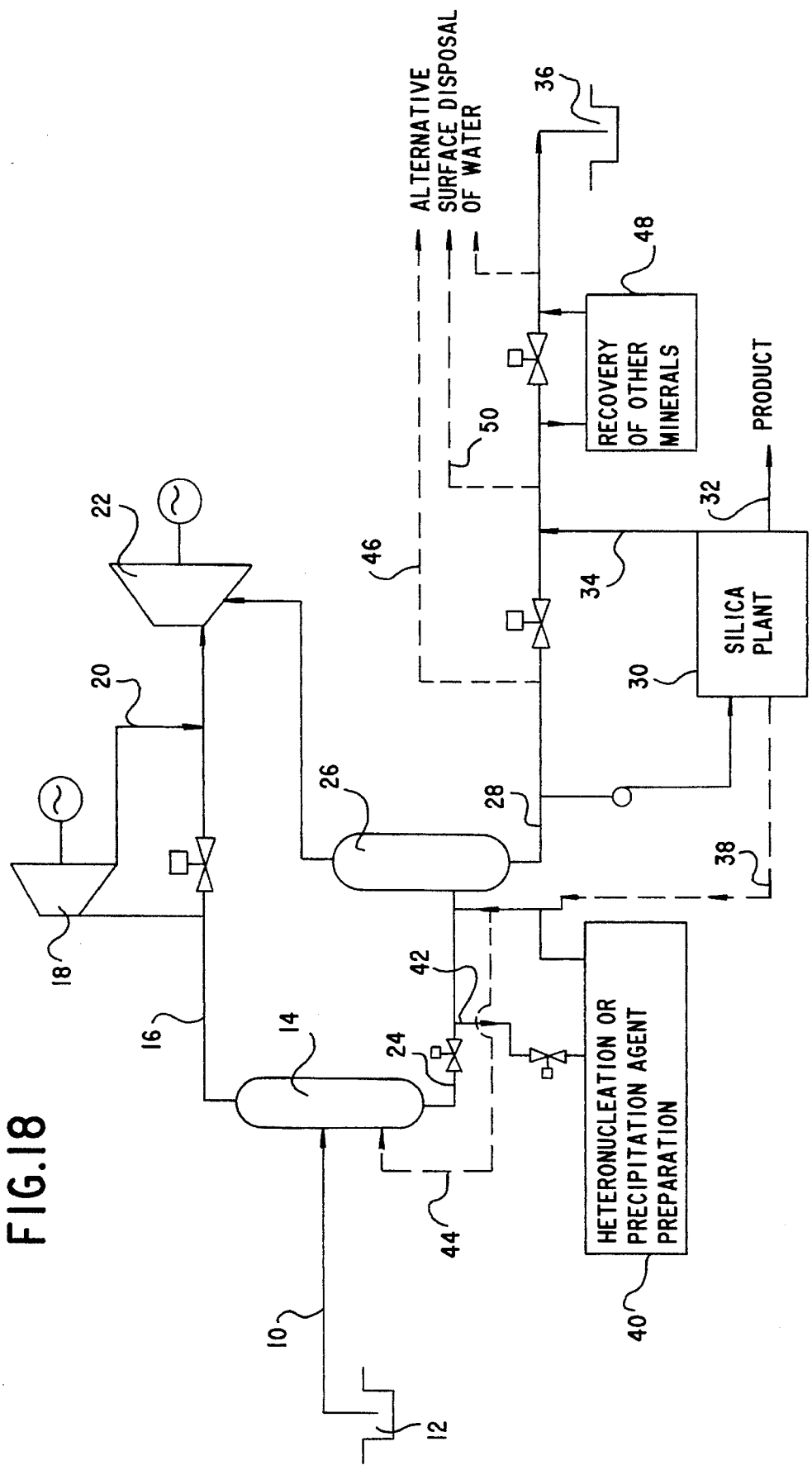

In the process depicted in FIG. 18, the same operation as was described with relation to FIG. 17 is also carried out. The addition in this process is of a separate, downstream process 48 for the recovery of minerals other than silica. It is to be noted that this depicted process allows for the bypass of the additional mineral recovery portion of the operations of this invention, via a line 50, but not the silica removal and recycle operations, and the feeding of the resultant stream to sewer or to reinjection as appropriate.

Figure 19:
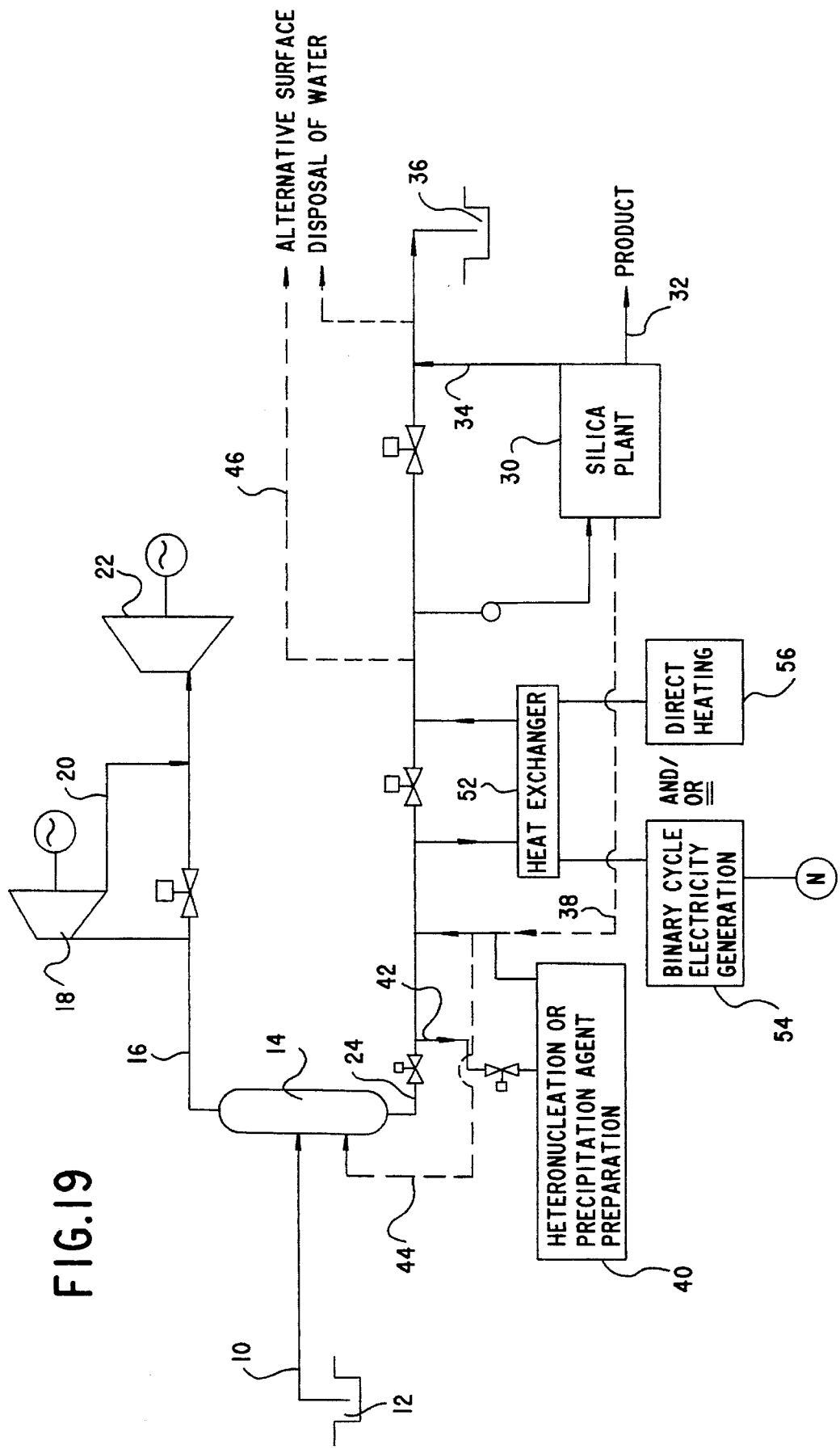

FIG. 19 illustrates the operation of the general process of this invention with the addition of a secondary heat exchanger 52 which may extract heat from all or a portion of the underflow 24 from the high pressure separator. It is to be noted that two conventional means of doing this are a binary cycle electricity generator 54, and/or a direct heat utilization means 56. The use of these pieces of equipment is made possible by the ability of this invention to take much more silica out of the geothermal fluid source and to thereby be able to protect the internals of this equipment from fouling due to uncontrolled silica precipitation. It is to be noted that in this embodiment of this invention, the intermediate pressure turbine 22 is an optional piece of equipment given that only primary separated steam is available. Alternatively a condensing turbine could be used. The binary cycle electricity generator or the direct heating operation, or both will employ the additional energy which is resident in the underflow from the high pressure separator.

Figure 20:
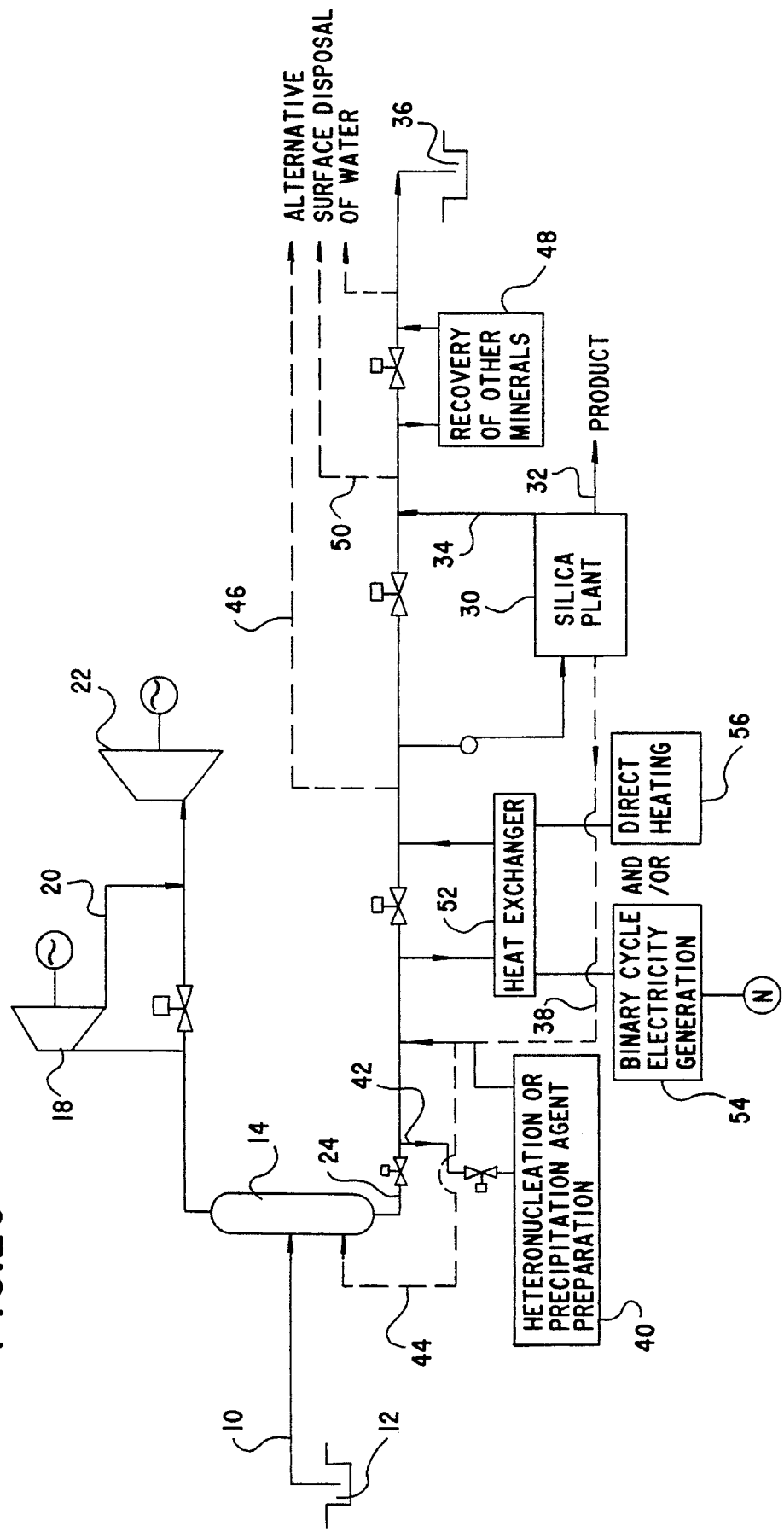

In the process illustrated in FIG. 20, the same operation as was described in connection with FIG. 19 is also carried out. There is in addition, a separate, downstream process 48 for the recovery of minerals other than silica. It is to be noted that this depicted process allows for the bypass of the additional recovery portion of the operations of this invention, via line 50, but not the silica removal and recycle operations, and the feeding of the resultant stream to a sewer or to reinjection, as appropriate.

Figure 21:
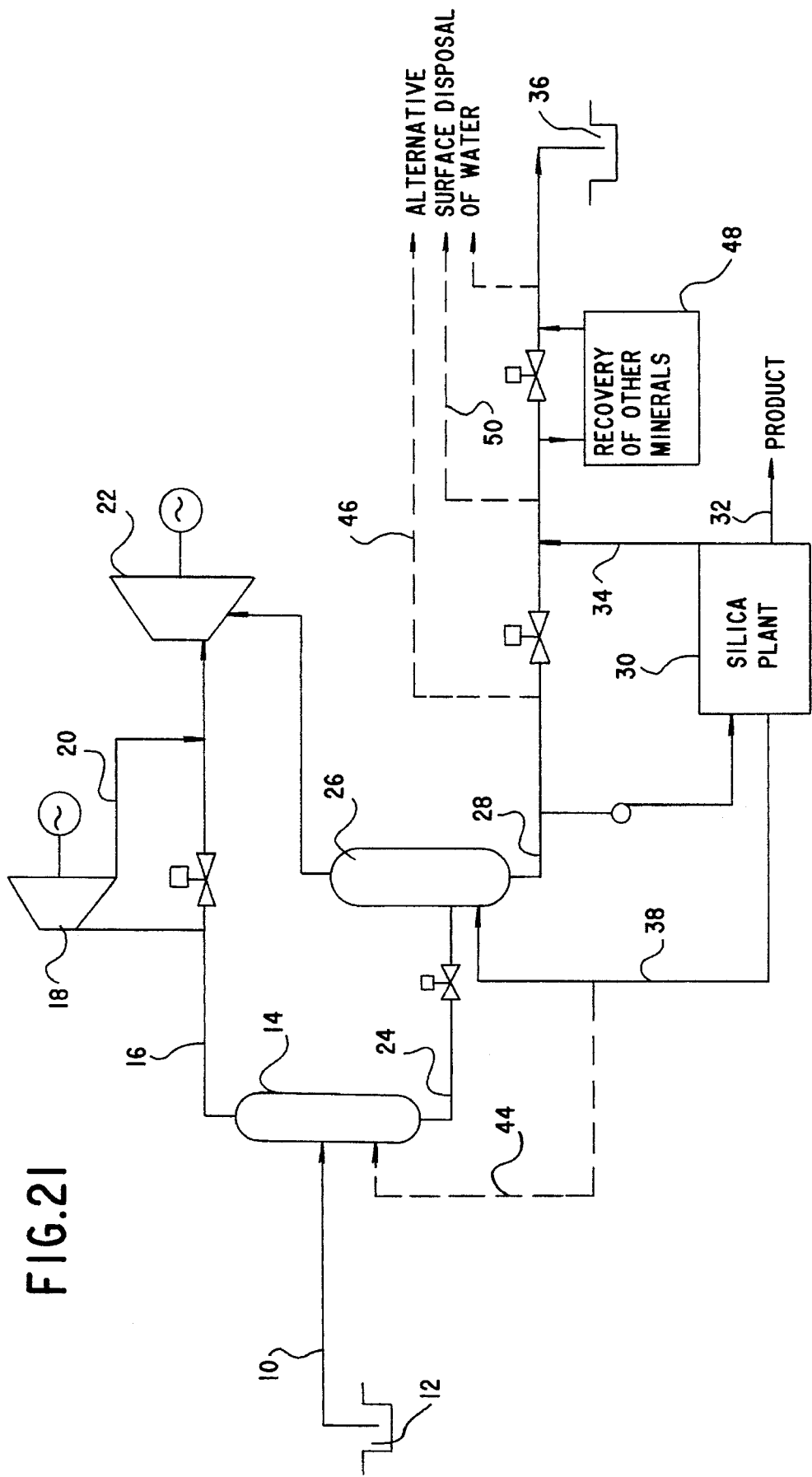
Figure 22:
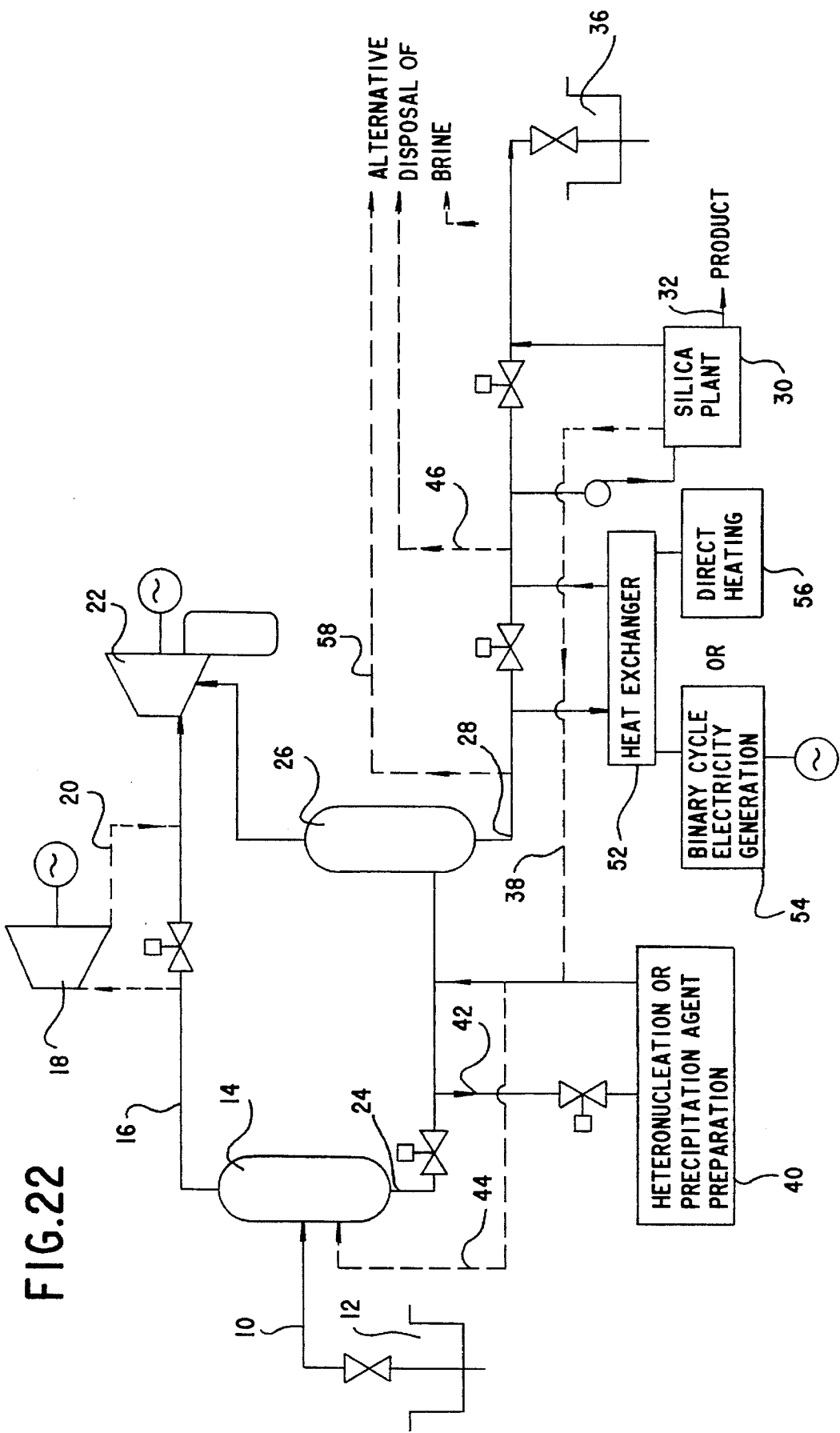

FIG. 21 illustrates a process wherein various attributes of the processes of FIGS. 16 and 18 are combined. FIG. 22 shows a process wherein all of the operations shown in FIGS. 17 and 19 are combined. In addition, an option of sewering or reinjecting a portion of the spent geothermal fluid before recovering any additional heat or any silica therefore has been included at 58.

Figure 23:
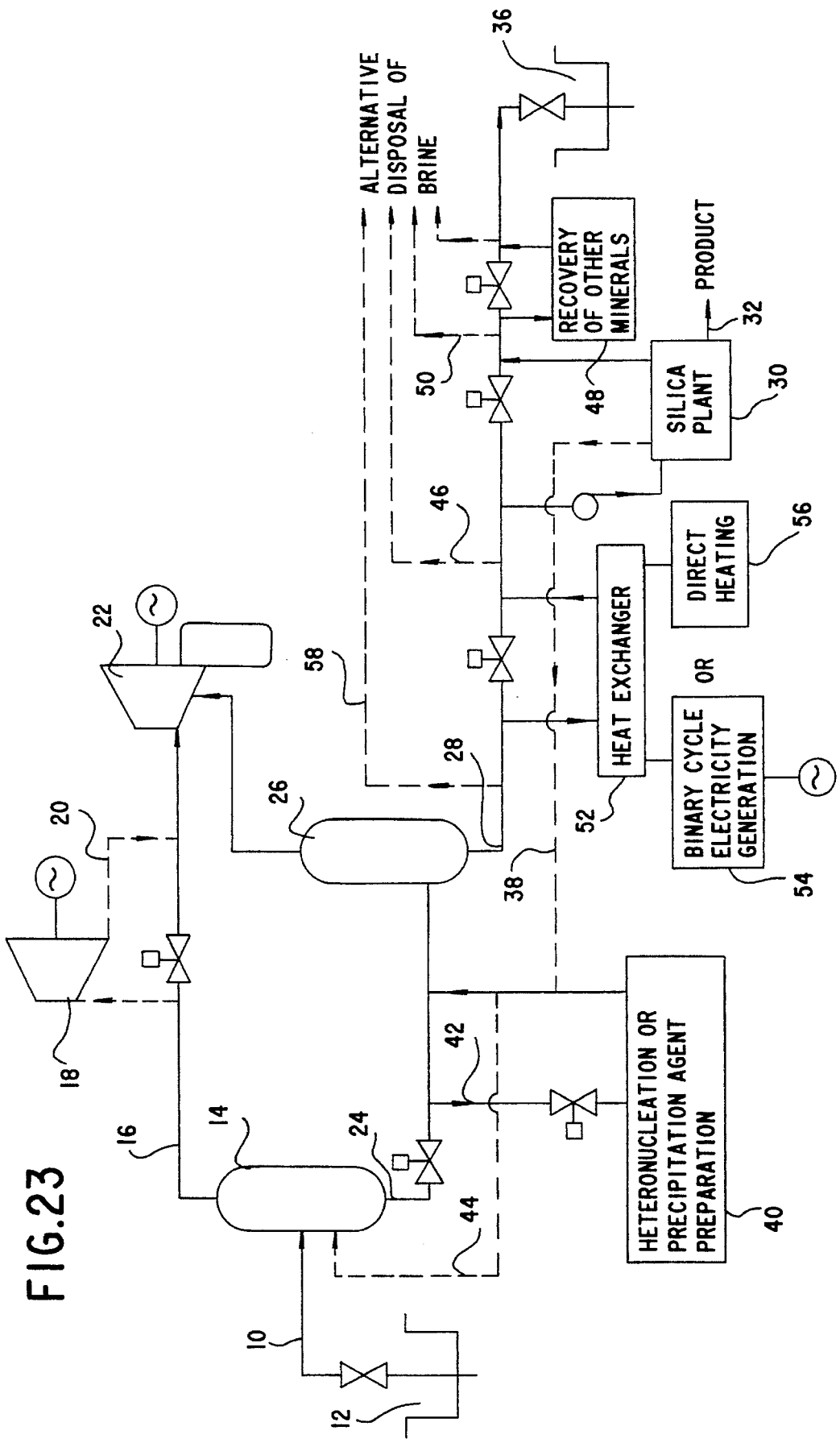
FIG. 23 is a schematic block flow diagram of a process embodiment of this invention.
Figure 25:
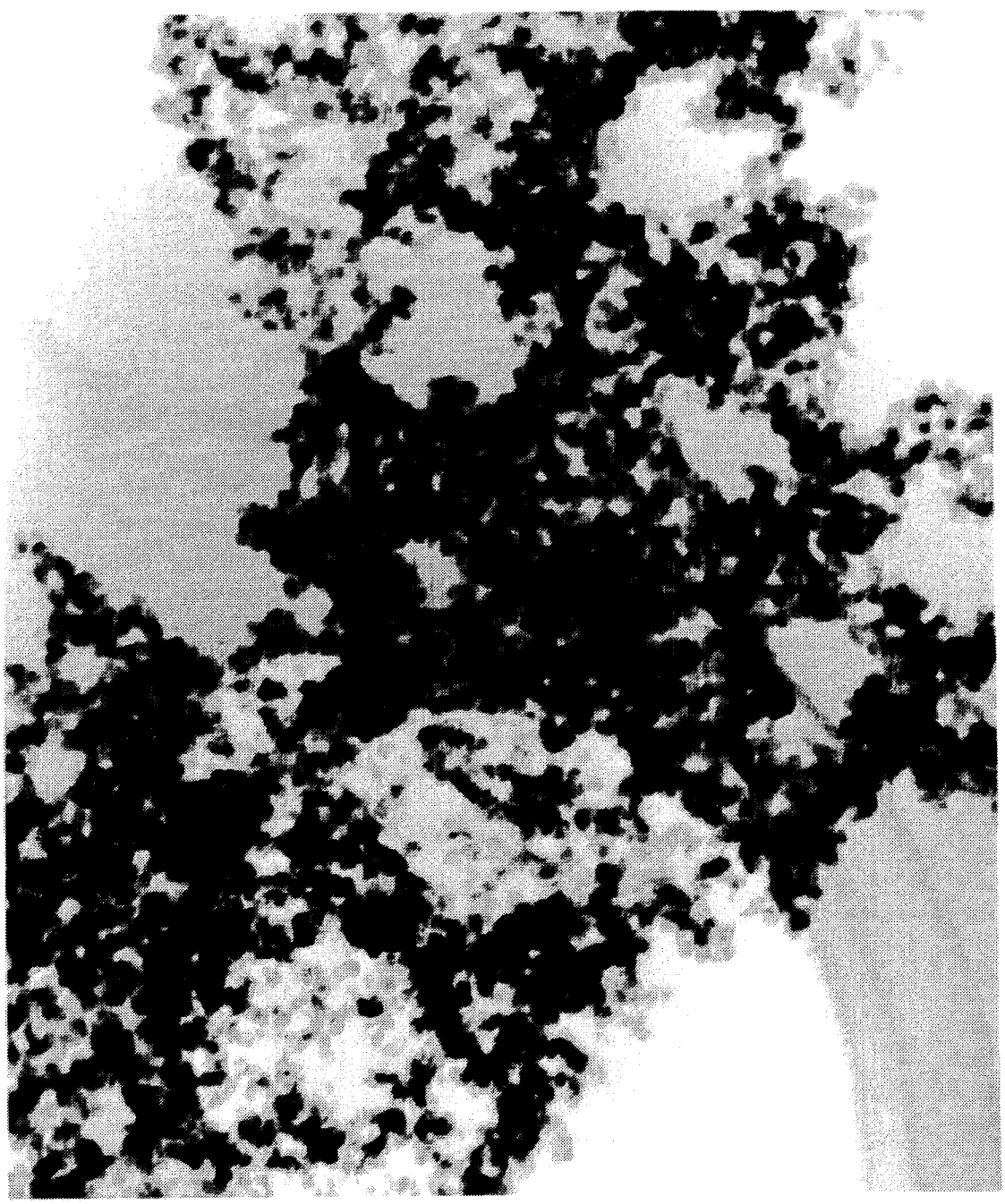
FIGS. 25, 26, 27, 28 and 29 are scanning electron photomicrographs of Type I amorphous silica prepared by an aspect of this invention which includes recycle of previously prepared amorphous silica particles.
Figure 26:
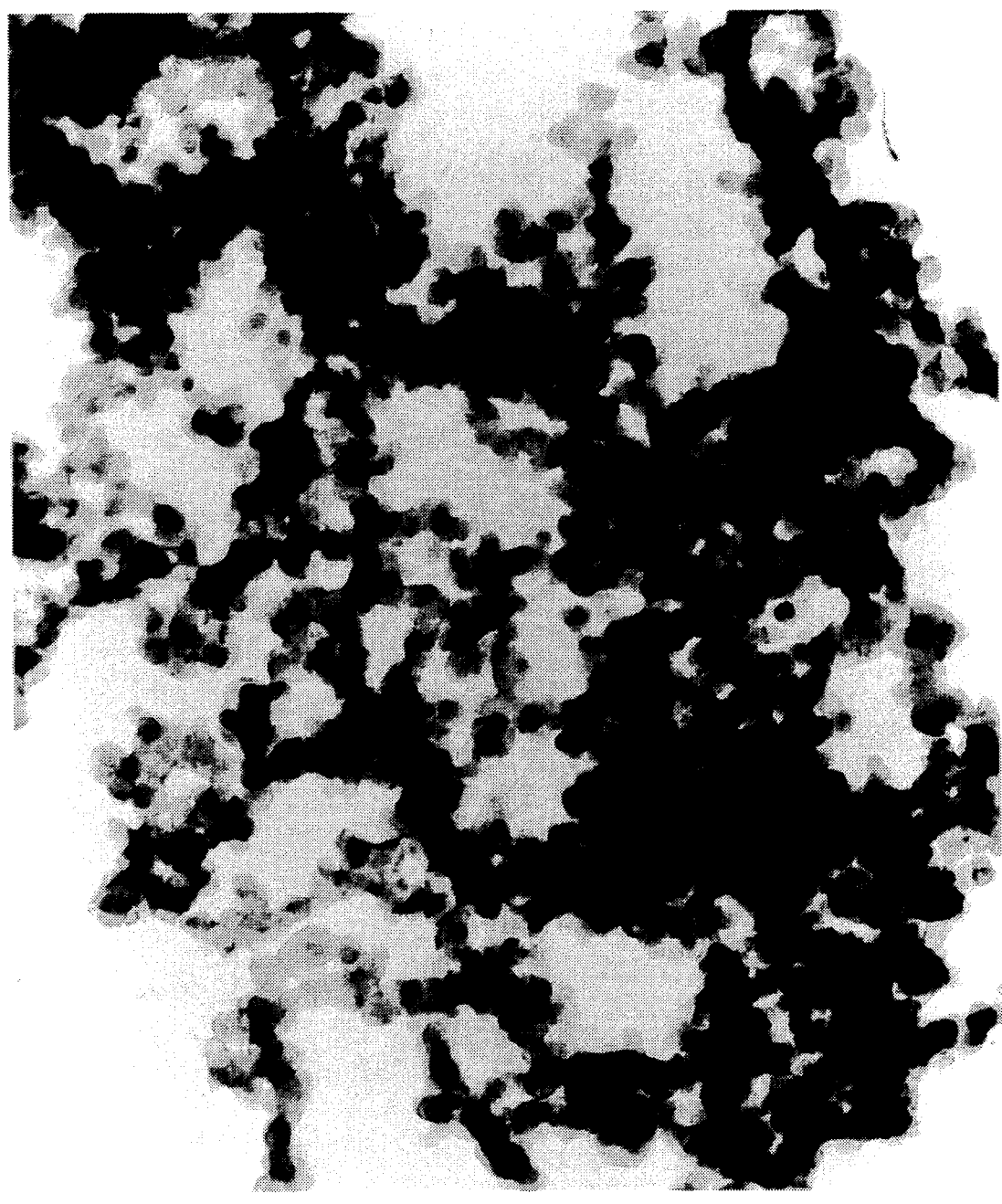
Figure 27:
Figure 28:
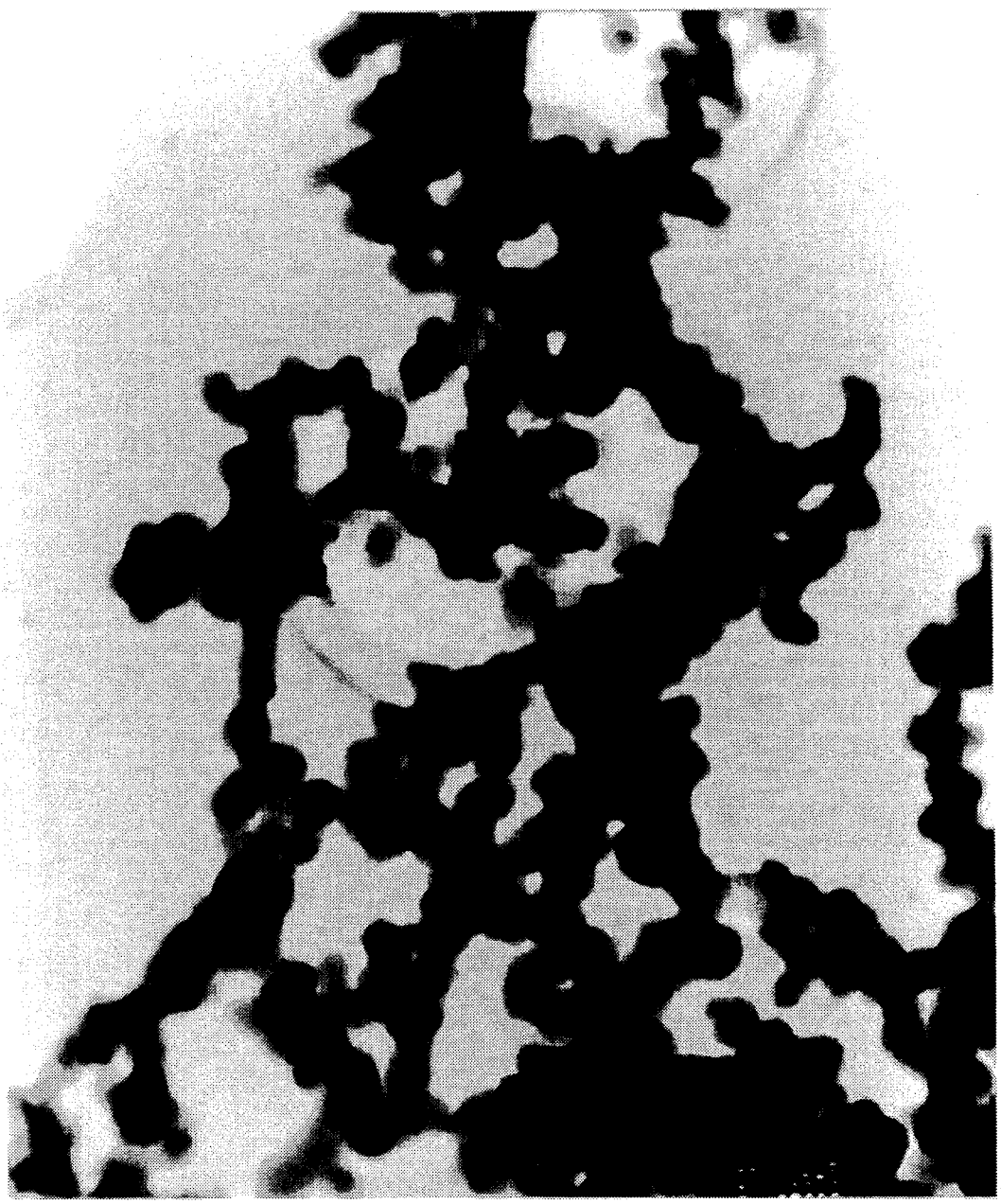
Figure 29:

In the process depicted in FIG. 23, the same operation as was described with relation to FIG. 22 is also carried out. The addition in this aspect of the process of this invention is of a separate downstream process 48 for the recovery of minerals other than silica. It is to be noted that this depicted process allows for the bypass of the additional mineral recovery portion of the operations of this invention, via line 50, but not the silica removal and recycle operations, and the feeding of the resultant stream to a sewer or to reinjection as appropriate.

Figure 31:
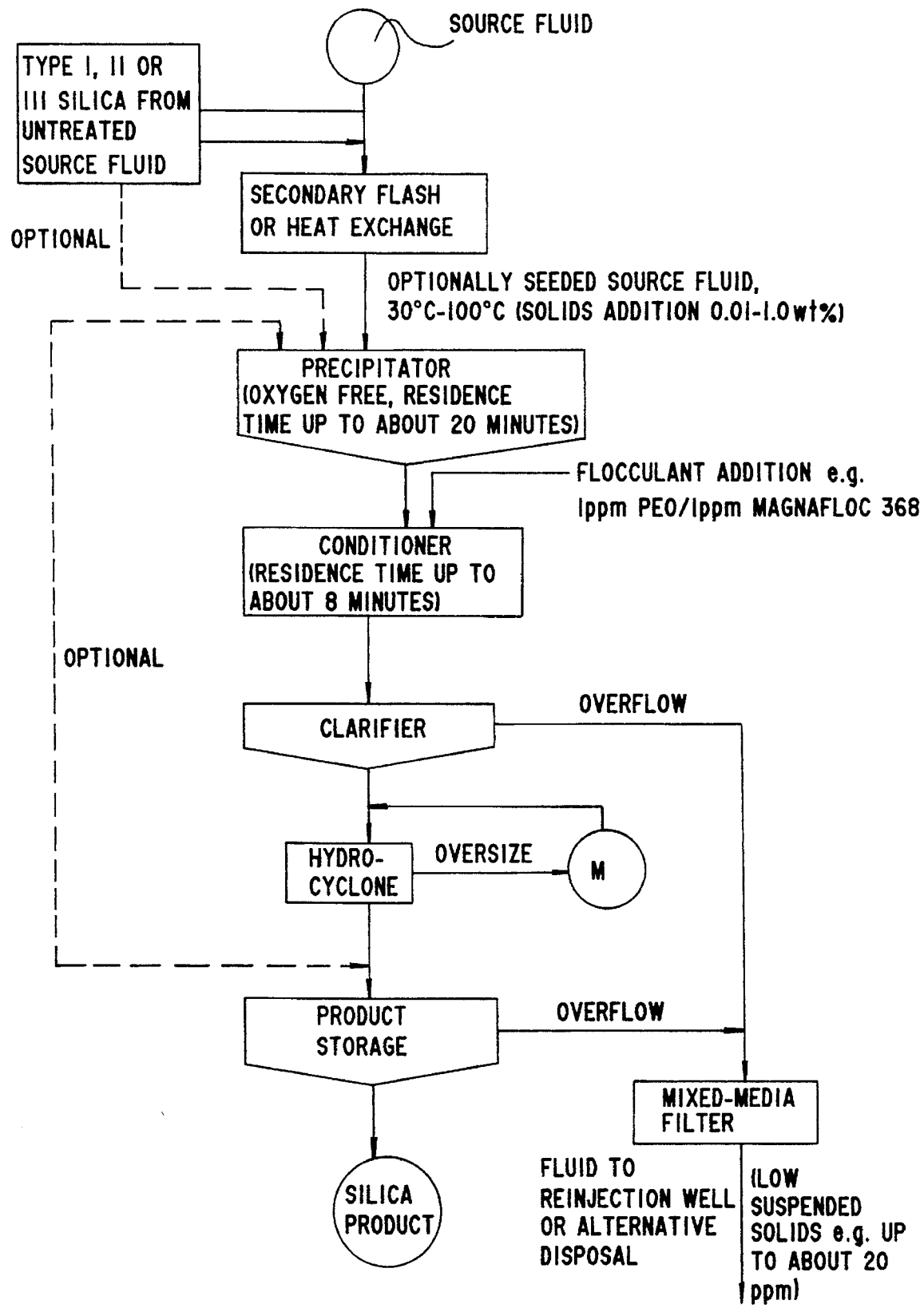
FIG. 31 is a schematic diagram of a continuous process for carrying out this invention with recycle of a portion of the amorphous silica product.

A full schematic diagram of how a continuous process employing silica slurry recycle is operated is shown in FIG. 31. This is illustrated by process example 5 which used a process as indicted in FIG. 31 to manufacture a high oil absorption silica similar in properties to that shown in Table 9 for the silica made according to example 4.

Preferably the harvesting of the precipitated tertiary aggregate silica particles is performed using any known separation or purification process. These include: water washing, or other cleaning steps for the particulate product derived from the practice of this invention, or it may simply involve the conventional isolation and recovery of an aqueous slurry of the particles of amorphous silica. The nature of the cleaning and other work up procedures is dependent on the ultimate use which will be made of the products of this invention.

PROCESS VARIABLES

Cooling

It is important to pre-cool the geothermal water feed to the process of this invention if its temperature is substantially in excess of about 100° C. Cooling of the geothermal fluid source is optional if the source water is at or near 100° C. The use of cooling depends on the desired yield, the arsenic concentration in the geothermal source fluid, the allowable arsenic concentration in the product, and the nature of the precipitated tertiary aggregate amorphous silica product to be produced. If the source water is at saturation pressure and temperature above atmospheric, then it is appropriate to cool such prior to aging.

Typically, any kind of conventional cooling operation can be used, such as, for example: a flash cooler, indirect heat exchanger, cooling tower, or cooling pond. The cooling step is a method used to decrease the polymerization induction time by increasing initial silicic acid concentrations relative to the solubility of amorphous silica at a given temperature. As noted above, pre-cooling of the source fluid also reduces the potential contamination of the precipitated silica with arsenic. In many cases, this reduction will bring the arsenic concentrations in the product silica to acceptable commercial levels.

If this cooling prior to aging step is not included in the manufacture of Type I precipitated silica, then geothermal water, which was initially at about 100° C., may yield a silica product with arsenic concentrations as high as 500–600 mg/kg. If, according to this aspect of this invention, this water is rapidly cooled to about 30° C. prior to the aging step, then the arsenic concentration in the particulate silica product may be reduced to less than about 20 mg/kg. The arsenic concentration in the Type I, II and III silicas can be further reduced if necessary by use of the desired type of silica as the heterogeneous nucleation or precipitation agent.

Arsenic Adsorption

The most important factors affecting arsenic speciation in geothermal solution with respect to this process are: the initial activity of the total sulphur species and its effect on oxidation potential, the pH and the temperature of the geothermal water, and flash conditions. The hydrogen arsenite ion ($H_2AsO_3^-$) and thioarsenite ion ($As_2S_4^{-2}$) are considered to be the predominant arsenic species in geothermal water at atmospheric temperature and pressure conditions, and unmodified pH. Experimental evidence indicates that, when arsenic adsorption onto the silica surface does occur, then the As(III) species is less readily adsorbed as compared to the As(V) species.

Figure 10:
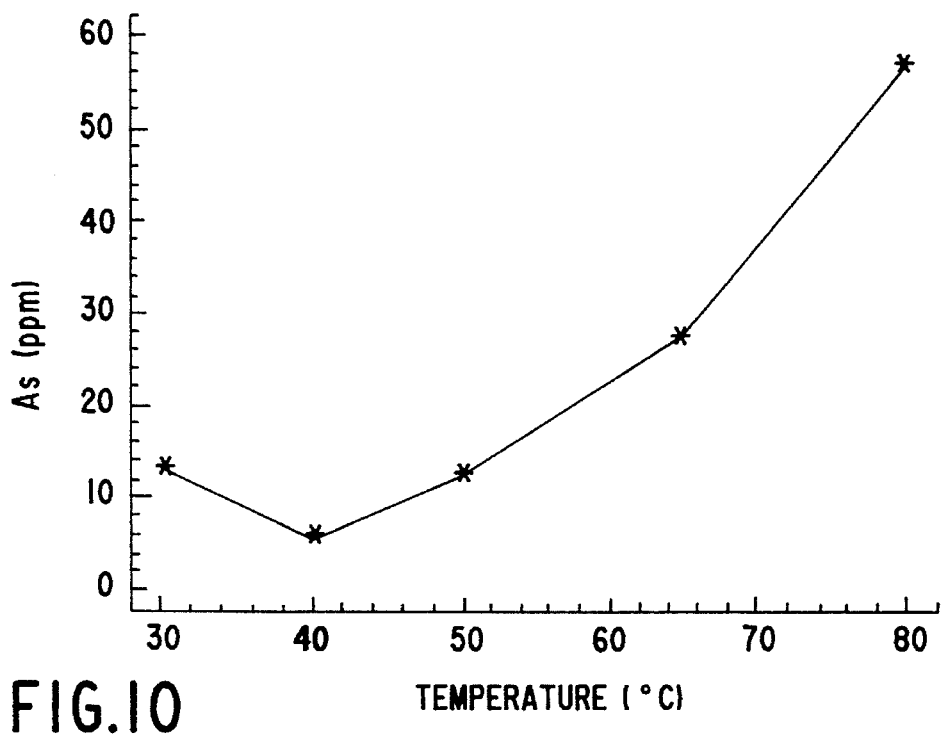
FIG. 10 is a graph of the relationship between arsenic adsorption on precipitated silica and the aging temperature at a constant aging time.
Figure 11:
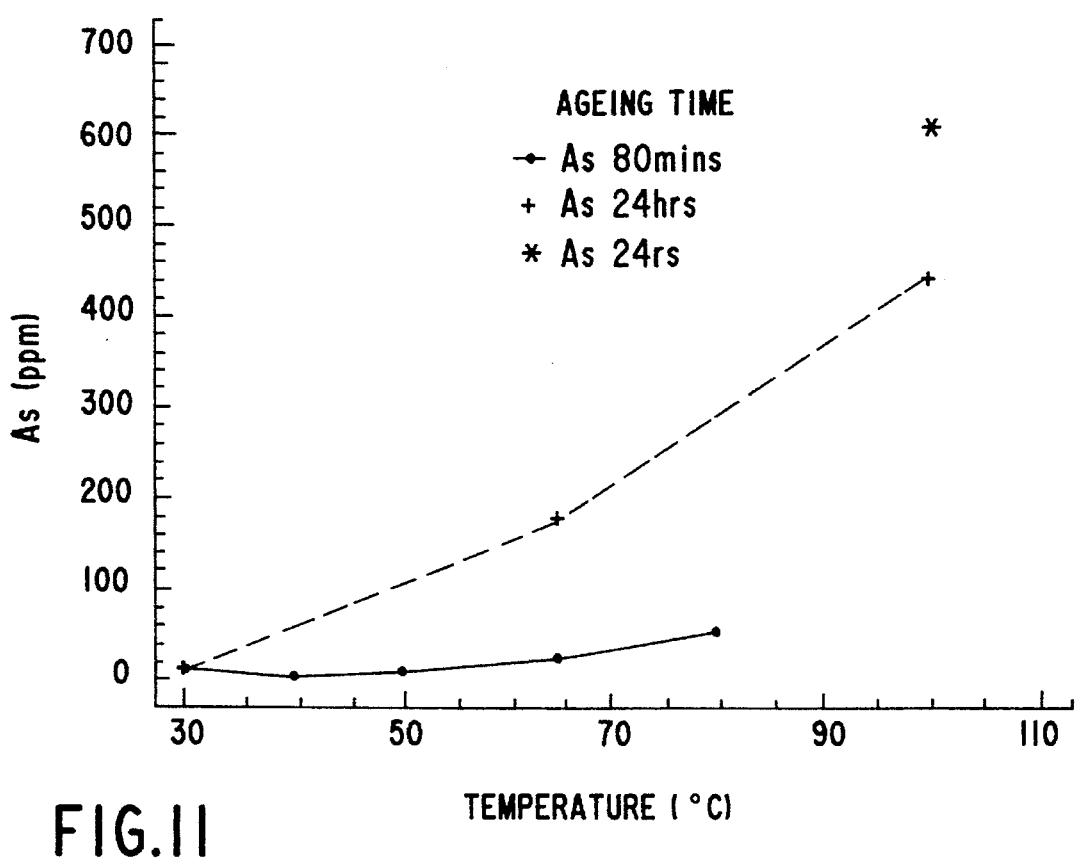
FIG. 11 is a graph of the relationship between arsenic adsorption on precipitated silica and the aging temperature at different aging times.

Arsenic adsorption on the surface of silica species occurs largely during the initial polymerization period when the primary particles are being formed. The extent of oxidation of As(III) to As(V) species, e.g. from $H_2AsO_3^-$ to $HAsO_4^{-2}$ (from the hydrogen arsenite ion to the hydrogen arsenate ion) is determinative of the extent of the adsorption. This oxidation reaction is temperature dependent, and the nature of the arsenic species is kinetically controlled through this oxidation step. Therefore, the arsenic species which predominates during the initial silica polymerization is a function of the temperature of the geothermal fluid. This is illustrated in FIGS. 10 and 11.

A significant difference in the amount of arsenic adsorbed onto the precipitated tertiary aggregate silica surface exists for precipitates which result from sols grown, respectively:

i) at high temperature for a short time, or low temperature for long times, as compared to those grown; and ii) at high temperature for a long time.

Figure 12:
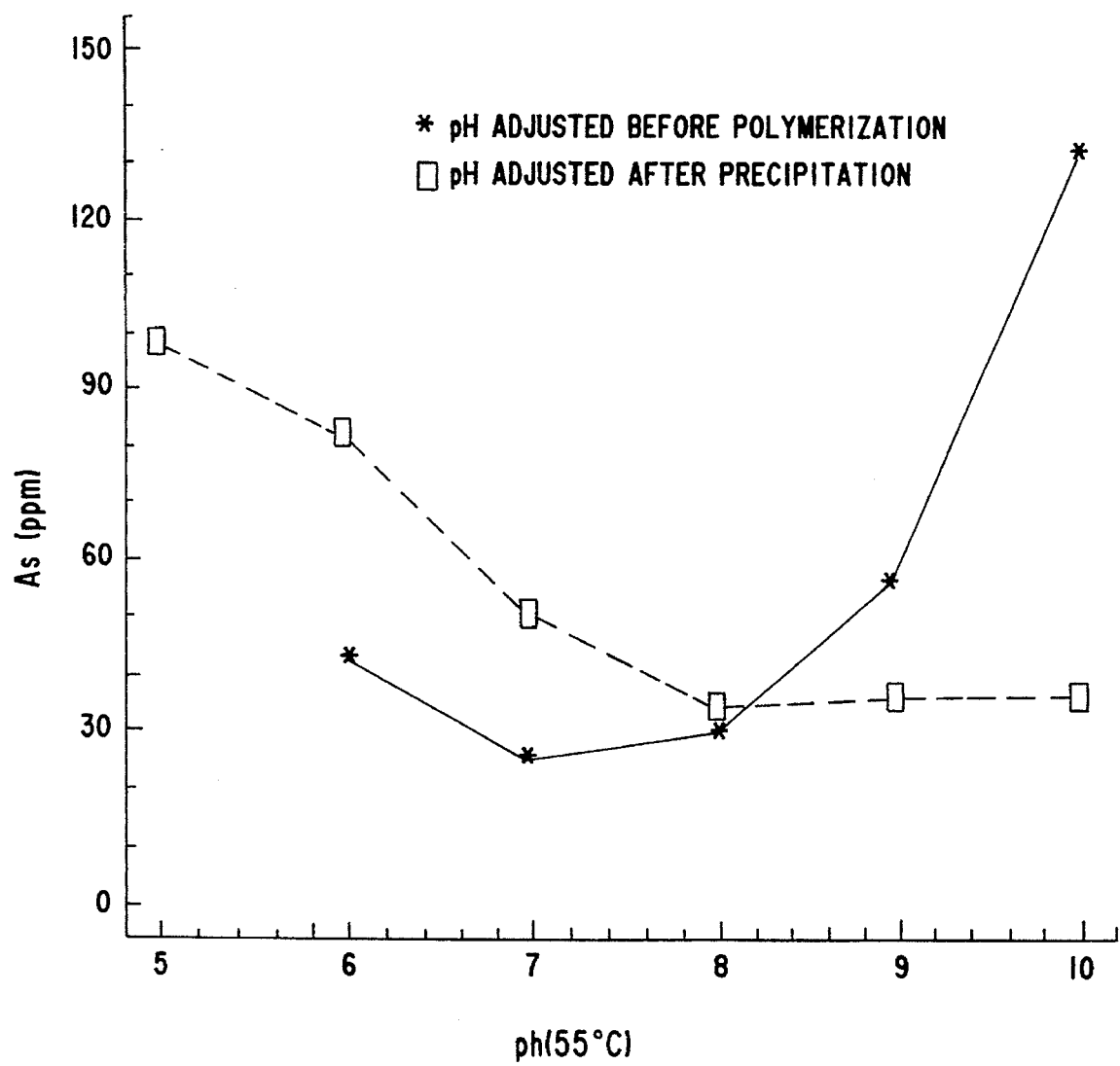
FIG. 12 is a graph of the relationship between arsenic adsorption on precipitated silica and the pH of the system during aging.

To a lesser extent, the pH of the silica solution during polymerization, or of the mother liquor after precipitation, has an influence over arsenic adsorption. FIG. 12 shows arsenic concentrations for precipitates produced from the same source fluid with pH adjusted to different levels before and after precipitation. Most geothermal source fluids are produced with a pH in the range 5–10 and more commonly 6–9.

The allowable arsenic concentration of the final product is application dependent, and may require pH control to minimize arsenic adsorption. Precipitated silicas prepared according to this invention, which are destined for use as paper filler, are best produced at a solution pH of about 7–9.

Figure 13:
FIG. 13 is a photomicrograph of an arsenic sulphide sol.

An amorphous arsenic sulphide ($As_2S_3$) sol is established if the pH is adjusted to substantially below 7, depending upon the concentration of $H_2S$ which is present upon this pH adjustment. This situation may arise by the hydrolysis of the $Al^{3+}$ ion, when this ion is used to effect coagulation. The arsenic sulphide sol may, on occasions, be co-precipitated (refer FIG. 13) to an extent which compromises the otherwise high optical specifications of the precipitated silica.

Water pH

The pH of the geothermal water may be adjusted to 7–9.5, if it is initially more acidic than this, prior to, with, and/or after cooling and aging, in order to achieve sol destabilization at reduced coagulant concentrations. The colloidal silica sol is least stable at about pH 9. There is no need to adjust pH should this naturally be slightly above pH 9, if rapid polymerization (short induction period) is acceptable. The need for pH adjustment will generally vary, depending upon the particular source of geothermal water and whether or not induction time needs adjustment.

Aging

It has been found to be appropriate to age the geothermal water to promote polymerization of the silica values therein if Type I silica is to be produced. Limited aging is employed in the situation where Types II and III precipitated amorphous silicas are to be produced. When seeking to produce Types II and III tertiary aggregate amorphous silica, aging should be carried out in the presence of an amount of coagulant which is in excess of the critical coagulant concentration. This aging should be carried out for substantially shorter time periods than that employed for the production of Type I precipitated silica. Aging, where it is used to increase the extent of polymerization, increases yield.

Precipitation

Precipitation is induced by the addition of coagulant or coagulant/flocculent combination, or by the effective presence of previously prepared particles of the silicas of this invention. The concentration of coagulant used must be sufficient to exceed the critical coagulant concentration for a specified set of conditions in order to effect rapid coagulation and precipitation of silica.

Cations, polycations, or charged colloidal particles can be used to achieve coagulation of the primary and secondary silica particulates. Not only do +these function by reducing the electrostatic repulsive interaction of negatively charged silica particle surfaces, but they can also interact through proton exchange with hydroxyls of the silanol surface.

For example, $Ca^{2+}$ ion may be obtained from a soluble calcium containing salt(s), and serves not only to reduce the negative surface charge but also can exchange for a single silanol proton, thus, imparting a net positive charge to the silica surface, which provides an active site for inter-particle bridging, that is interaction of this positive surface portion with an as yet unconverted conventional negatively charged silanol group. These simple cations are, therefore, surface adsorbed and remain part of the precipitated silica, albeit in small concentration relative to the bulk solution, and may be substantially removed by mild acid washing.

If calcium ions are used as the sole coagulant, then the concentration of the free calcium ion in solution after coagulation, should remain preferably between about 50 and 1,000 mg of calcium ion per kg of solution. The concentration used depends on the type of precipitated silica to be produced and secondary particulate size required.

Where previously prepared particles of silica are used as the coagulation/precipitation agent, the mechanism seems to be one of templated growth of the silica in the sol onto the surface of these previously prepared, seeding, particles. In this use, the acceptable concentrations of the previously prepared silica particles is about 0.1 to 10 grams per kilogram of solution, preferably, about 0.5 to 5 g/kg. These previously prepared silica particles should be used in particle sizes of about 5 to 100 nm, preferably up to about 30 nm.

In one aspect of this invention, it is appropriate to recycle the particles of silica in slurry form. One method of carrying this out is to recover as much particulate silica, from conducting the process of this invention, as possible. Since it will be clear that it is not practical to recover all of the silica particles from the aqueous slurry product of this invention, it is considered to be within the scope of this invention to take as much solid product out of the aqueous slurry and to recycle what is left.

A further refinement of this procedure is to separate and recover as much solid particulate product as desired, dewater the remaining dilute slurry, and then recycle the now more concentrated (dewatered) slurry to aid in the growth and precipitation of the desirable particulate product. In this embodiment of this invention, it is appropriate to recycle a slurry having a particulate silica concentration of about 1 to 40 weight per cent, preferably about 1.5 to 10 weight per cent.

An attribute of the use of previously prepared silica particles having microstructures of Types I, II or III, as set forth above as all or part of the precipitation agent is the fact that the use of such materials allow internal portions of operating equipment, such as pipes, heat exchange tubes, etc, to be protected from the indiscriminate deposition of random morphology silica thereon. In contrast to the prior art operations where silica seeding has been used to try to protect the inside surfaces of equipment used in power generation from geothermal fluid, when previously made particles of Types I, II or III silica are used, the result is the generation of additional particles of this same microstructure. Thus, in addition to the simple protection of equipment surfaces against fouling, a valuable product is also formed.

Separation

Precipitated silica can be conveniently removed either by filtration, as slurry from a thickener and/or a clarifier, or by a dissolved air flotation system. Alternatively, it may be dried, which generally requires further milling or grinding, to yield a solid product with an appropriate tertiary aggregate particle structure and size range required for particular commercial usage. Other conventional solid-liquid separation unit operations are also suitable.

If the geothermal resource is located close to a paper mill, it is within the scope of this invention to pipe the slurry product or a portion thereof, to the mill for incorporation directly into the papermaking process. In this last regard, it is appropriate to use the slurry in the concentration at which it is produced. It is also appropriate to adjust the concentration of the slurry by either raising or lowering it as needed for the use intended.

PRECIPITATED SILICA PROCESS DESCRIPTION AND OPERATING GUIDELINES

PROCESS DESCRIPTION

Introduction

Figure 14A:
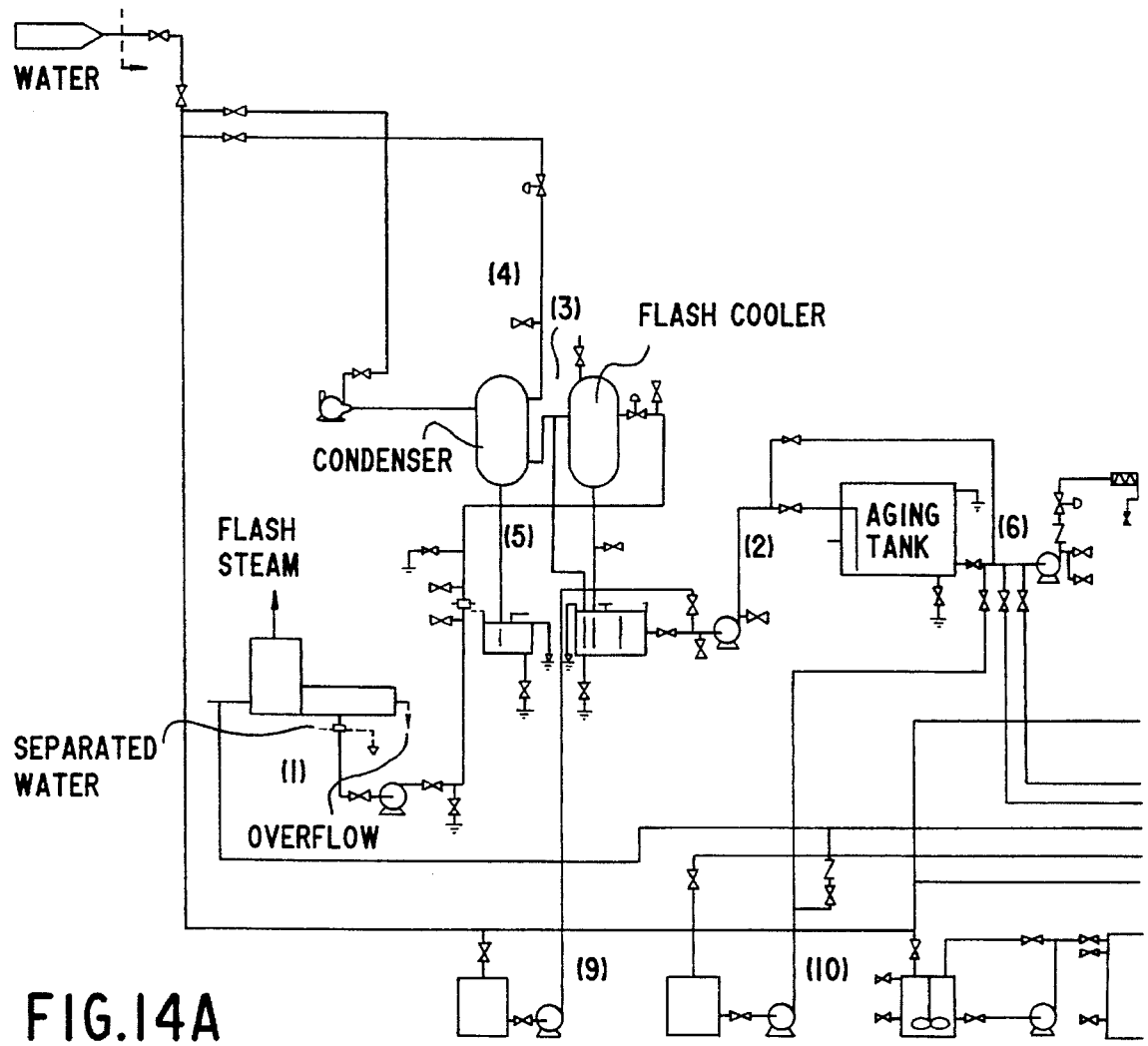
FIG. 14 is a schematic diagram of one aspect of the process of this invention as well as a mass balance for one example of the practice of this invention in a process/ apparatus as depicted.
Figure 14B:
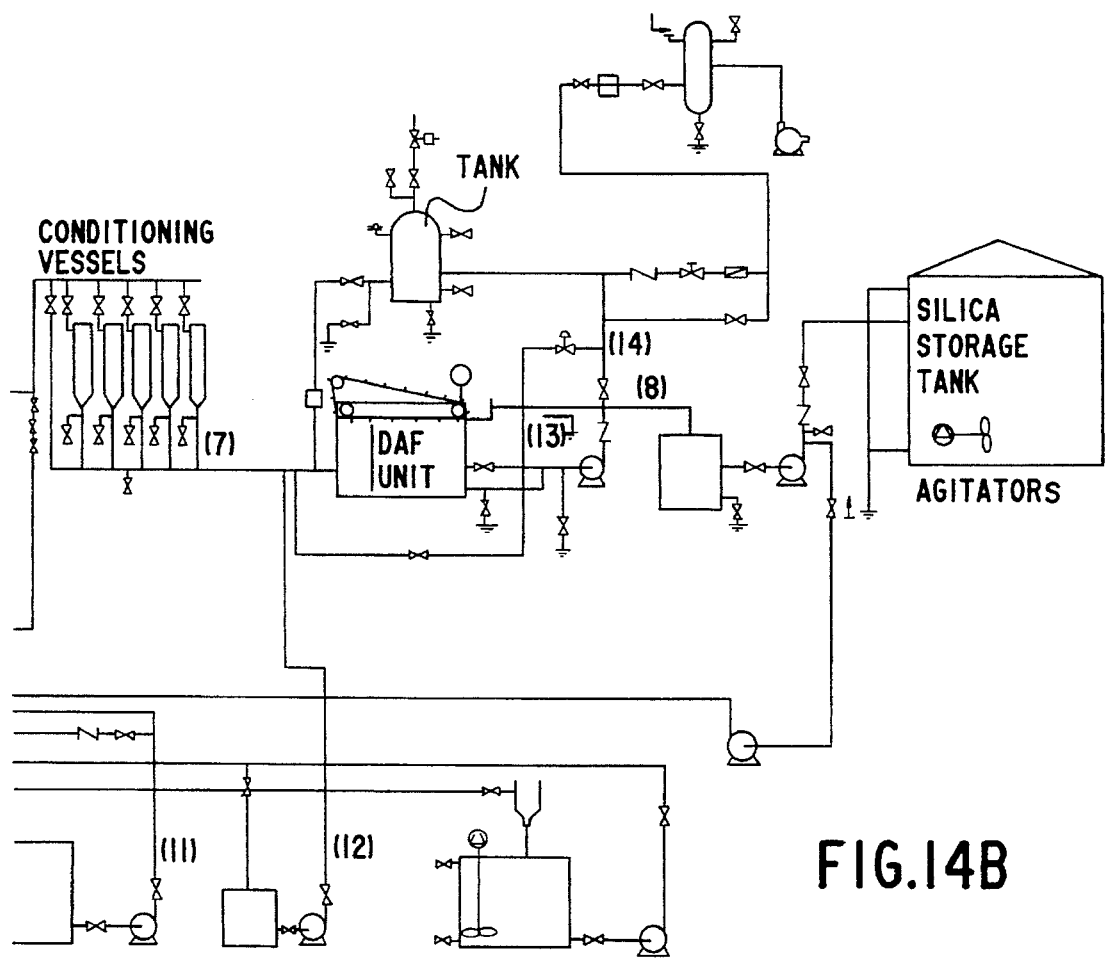

The following account describes the essential engineering features of a plant to process separated water from production wells in a geothermal field with the objective to recover amorphous silica which has been recovered from the water. As discussed elsewhere, this process also can be used with an alternative fluid source, which is sufficiently rich in dissolved silica to form primary silica particles. FIG. 14 provides a schematic plan of the process, with a mass balance for process Example 1 below. No reference to control equipment is made in this Figure.

In this case, the plant is described for a feedstock flow rate of 10 kg/s at 100° C. or slightly below. However, the plant can be scaled up to meet larger separated water flows for commercial purposes. Precipitated silicas obtained from this process have been characterized and are described in some detail as part of the laboratory examples hereof.

Concentration and Cooling

Feed water can be taken from a variety of sources. The main requirement is that fluid silica concentrations are sufficiently high to effect spontaneous nucleation upon cooling or to react with a heterogeneous nucleation agent (when introduced) upon cooling. However, for the purpose of describing the operation of a process plant, and to illustrate the nature of the precipitated silicas produced under different conditions, the following water sources are considered:

i) water obtained from a geothermal source, or a fraction of the water separated therefrom, at atmospheric pressure; and ii) water separated at higher than atmospheric pressure. Water separated at atmospheric pressure is usually pumped to a flash vessel, whereas water which is at higher pressure can flow to the flash vessel through pressure differential means. In the flash vessel, the feed water is allowed to flash off. This increases silica concentrations in the fluid, and increases pH slightly because acidic gases which were dissolved in the source fluid also flash off and are removed. The temperature of the fluid is reduced due to this flash of the feed water. Reduced fluid temperatures due to this flash also increase the degree of supersaturation of the remaining fluid with respect to amorphous silica which is still dissolved therein. Although this has nothing to do with the process of this invention, in order to complete the process description, the flashed steam can be conventionally condensed, under vacuum, by cooling water in a separate condenser vessel. The liquid from both the condenser and flash vessels exits at the bottom of the vessels suitably via open barometric legs. The condenser effluent contains geothermal steam condensate and cooling water which can be sent to waste.

Flash cooling relative to alternative methods results in:

i) rapid cooling, which reduces arsenic adsorption upon coagulation; and ii) increased supersaturation and yields upon precipitation.

Precipitation

The feed water from the flash cooling vessel can either enter a covered tank, by gravity feed, or be pumped directly to the conditioners. The primary purpose of the tank is to age fluid when precipitated silica of Type I is required. When the aging tank is employed, this also acts as a seal for the barometric leg.

The tank is baffled to provide even aging of the fluid. Fluid residence time is adjustable from 0 to 2 hrs. by use of a bypass line or by adjustment of a level control system provided for the tank. Immediate or staged coagulation as discussed elsewhere herein can be used to produce silicas of Types II and III. From the aging tank or bypass, the feed water is pumped through a static mixer to the conditioning vessels.

Addition of primary coagulant and/or flocculent is possible from stock tanks as shown in FIG. 14. For example, calcium chloride can be introduced by way of a dosing pump with coagulant addition upstream of a centrifugal pump to ensure that rapid mixing takes place in the pump. Mixing can be made uniform through the use of a static mixer. Rapid mixing is preferable to maintain substantially consistent secondary particulate size, and is assisted by way of partial recycle of the aged feedstock stream, the precipitated silica slurry stream and/or clarified underflow from the separation plant. Conditioning vessels allow floc growth prior to their separation and allow floc conditioning with a mean fluid residence time in the range of about 0 (complete bypass) to 10 mins.

Separation and product recovery

Separation of the product and recovery thereof from the aqueous slurry is carried out in a conventional manner. The aqueous slurry of product silica particles is transferred, preferably by gravity flow if possible, to the Dissolved Air Flotation (DAF) tank. Pressurized air saturated recycled liquid is injected into the feed water flow, just upstream of the DAF tank. Release of air from this water is achieved through pressure drop. The air is released as micron sized bubbles which attach to the silica flocs and effect flotation. The float is removed from the surface by a sweeper arm and pumped to the slurry storage tank.

The air-liquid saturation plant is conveniently sized for 50% recycle and it can use either recycled DAF tank effluent or in some cases non-separated feed water. The maximum air-liquid saturation operation pressure is 10 bar (g) which corresponds to a maximum attainable air to solids ratio at full flow of approximately 0.08.

The effluent from the DAF tank (underflow) is sufficiently low in colloidal silica to be disposed of in a manner similar to that employed for other geothermal water. Disposal can be by reinjection or other conventional disposal such as into the ambient water system. The use of an appropriate filter may be necessary to ensure the level of colloidal silica is low enough to meet particular reinjection requirements. With the practice of this invention, the water has been rendered more environmentally acceptable by virtue of heat, gas and silica removal.

Product Storage

Product produced by the process of this invention, that is particulate silica, is conveniently stored in a covered tank fitted with a submerged agitator. Slurry solids content should be maintained below about 30 kg/m$^3$ in the case of Type I silica. Above this, viscosity rises exponentially and eventually the slurry reaches its gel point. However, adjustment of the solids content of the product is done in a conventional manner to any conventional concentration as required by the use to which this product will be put. Type I slurries wherein the secondary particle dimensions are between 4 and 10 nm exhibit thixotropic properties and can impart these to the medium to which they are to be applied. However, for Types II and III silicas, this thixotropic property is far less evident and slurry solids content of up to about 400 kg/m$^3$ can readily be achieved.

Alternatively, the slurry can be dried and ground with the use of standard equipment and methods. The degree of fineness of the product is a matter of conformance with the product use requirements. Conventional means are used to provide this dried product in the required degree of comminution.

Principal Items of Process Equipment
Plant Feed System

Source fluid is drained from the weir box of a conventional silencer into an adjacent pump pit. From the pump pit the fluid is pumped, suitably through an above ground steel pipe, to the flash vessel or by-pass. The pump can suitably be a vertical centrifugal unit, or any other conventional pumping means, which is suitably installed in the pit at sufficient depth to provide the net positive suction head required to pump fluid at its vapor pressure.

Provision can also be made to supply the plant directly from the separated water outlet of the separators. This requires the design and installation of pipe work suitable for carrying pressurized, elevated temperature water. No other revisions to conventional plant design are necessary.

Flash Cooler/Condenser

Pressure operating range—0.01–0.25 bar abs

Feed water inlet temperature—100° C.

Feed water outlet temperature—45° to 100° C.

Feed water flow rate—10 kg/s (max)

The flash vessel suitably has a tangential feed water inlet. The condenser is conventional and may be of the counter current tray type with a vapor inlet at the bottom of the condensing section.

Cooling water and condensed vapor, from the flash cooler/condenser, drain from the condenser vessel through a barometric leg to a small seal tank. The water then overflows to drain.

Flashed geothermal fluid drains in a similar manner from the flash vessel to a seal tank from which the fluid is pumped to the aging tank. The aging tank can also be bypassed by opening the bypass piping. Both vessels are elevated and the liquid discharges from the bottom via open unvalved barometric legs which protect the vessels from flooding. The vessel vacuums are maintained by using a conventional vacuum pump.

Aging Tank

Volume—65 m$^3$

The aging tank is suitably baffled to ensure that it provides for even aging time of up to about 2 hours. Fluid level in the tank is conventionally controlled such as, for example, by the use of an automatic level control system.

Conditioning Tanks

Volume —0.85 m$^3$

Vessel Flow Capacity—10 kg/s

In one example of this operation, five conditioning vessels have been provided to allow variation of residence time. The inflow is suitably by gravity into the top of the vessel or by pump, if desired. The vessels are suitably baffled to minimize turbulence. The liquid flows vertically downwards to a conical bottom and discharges immediately into the DAF tank to avoid floc accumulation. The liquid level is controlled by the liquid level in the DAF tank.

Dissolved air Flotation (DAF) Tank

Flow Capacity—10 kg/s

Product Concentration —<30 kg/m$^3$

Float Area —5 kg/hr/m$^2$

Volume—9.3 m$^3$

Recycle Pressure—<10 bar g

The tank has inlet nozzles, a flow baffle, a mechanical float skimmer, an air saturator vessel, recycle pump, piping and a surfactant injection system.

The air saturator vessel and recycle pump are capable of providing a recycle rate of 50% of full flow. At 7 bar (g) an air-solids ratio of at least 0.06 can be achieved. Either DAF tank effluent, or in some cases conditioned feed water, is used for the air saturator feed. The air space is maintained in the saturator and the liquid level control is via a level sensing device and a control loop to a by-pass valve around the recycle pump.

The DAF nozzles introduce recycled fluid directly behind the flow of fluid from the conditioning vessels. Inlet velocities are low to ensure that flocs are not damaged by excessive turbulence. DAF vessel operation is optimized by adjustment of baffle plate angle, beach length, paddle speed, recycle rate and air saturation pressure to maximize product recovery.

Chemical Dosing

Conventional chemical mixing and dosing equipment is provided to facilitate the preparation, storage and dosing of chemicals, including calcium chloride and other primary coagulants, cationic flocculent, surfactants, pH adjustment agents (either NaOH or Hcl) and previously prepared particulate silica, where such is being used as the precipitation agent. Chemicals can be either prepared from dry powder or bulk liquid deliveries can be made.

It is preferable for dosing pumps to be capable of accurate dosing rates from 0–100% capacity rate. These pumps are conventional.

Pump capacities are as follows:

Slurry—5 kg/s

Coagulant—0.05 kg/s

Surfactant—0.05 kg/s

Flocculent—0.05 kg/s pH correction—0.05 kg/s

EXAMPLES OF THE PREPARATION OF SILICAS ACCORDING TO THIS INVENTION

The following examples are given to illustrate the instant process for the recovery of tertiary aggregate particles of amorphous silica from geothermal fluid sources. These examples illustrate different process operating conditions, and the use of different equipment for carrying out the instant invented process to produce several precipitated silica products. The geothermal water which was used in these examples was derived from the combined flow of production wells KA21 and KA27 situated within the Kawerau Geothermal resource in New Zealand. The results which have been achieved by this invention and are illustrated by these examples have also been achieved with geothermal water from other resources including: other wells in the Kawerau resource (KA19, 28 and 35), Wairakei main drain and separated water (FP#2), Ohaaki BR20 in New Zealand; and Pal14D and W102 in the Philippines.

In these examples, parts and percentages are by weight unless expressly stated to be on some other basis. The following examples of the process of this invention are based on atmospheric discharge from the separators (initially at a temperature of 172° C.) which has undergone two processes. Part of the total flow from the separators passed through a binary cycle turbine and was redischarged to the main silencer at 110° C. The remainder flowed directly to the main silencer. A small increase in yield resulted from precipitation as the result of bypassing the binary cycle turbine.

Process Example 1—Production of Type I Silica
(refer to FIG. 14)

Separated water with a flow rate of 10 kg/s and a silica concentration of 837 mg/kg, was flash cooled from 100° C. to 50° C., by passing such through a flash cooling vessel, to produce a feedstock water flow of 9.12 kg/s having a pH of 9.0 (50° C.) and a silica concentration of 918 mg/kg. This water from the flash cooler was then aged for 80 mins. Fluid flow through the aging tank, determined the residence time in the tank and therefore the aging which was accomplished therein. The residence time in the tank was controlled by adjustment of level of liquid in the tank using conventional automatic level control on the outlet piping.

Calcium chloride coagulant and a flocculent were introduced at a controlled rate at the exit to the aging tanks. Calcium chloride was added in an amount sufficient to produce a final $Ca^{2+}$ concentration of ~200 mg/kg. This addition of calcium chloride caused the pH of the solution to decrease 0.30–0.50 units to ~8.6, which is consistent with limited deprotonation of the silanol surface of the silica. Floc formation proceeded rapidly and ~3 minutes residence time was allowed through the conditional vessels prior to separation of the silica product.

The fluid was mixed in an in-line static mixer before being held in the conditioning tanks to allow floc formation. After formation of the silica floc, up to 200 mg/kg silica remained in solution. On introduction of the product slurry to the DAF tank, a minimum yield of 90% resulted in recovery of ~20 kg/hr (anhydrous $SiO_2$ basis) of silica slurry at concentrations varying from 15 kg/m$^3$ to 30 kg/m$^3$, depending on DAF operating parameters. Product was pumped to storage and agitated slowly to maintain consistent concentrations in the storage vessel and to minimize gelling.

DAF recycle fluid, drawn from the DAF tank underflow, was pumped up to the desired recycle pressure, and air was then introduced to be dissolved in the recycle water. Excess effluent flowed from the DAF underflow to drain at a rate of 8.73 kg/s. This effluent had in solution up to ~200 mg/kg silica, 200 mg/kg $Ca^{2+}$ and traces of flocculent. Up to about 1.71 kg/hr of silica floc was also lost with the DAF effluent.

The physical and chemical characteristics of this precipitated product of this example are reported in laboratory Example 1, below. The properties of precipitates which were produced at 65° C. and 80° C. are also described below, including the properties of precipitates produced by modifying process variables. Yield may be enhanced by the use of slurry recycle as will be described and exemplified in some detail below.

Process Example 2—Production of Type II Silica

Separated water at ~100° C., with a flow rate of 10 kg/s, an initial pH ~9.0, and a silica concentration of 837 mg/kg, was pre-treated with calcium chloride such that the mixed solution had a $Ca^{2+}$ concentration of up to 200 mg/kg. The exact concentration of the calcium ion was varied to achieve complete downstream precipitation with or without assistance of the addition of further cationic flocculent in an amount of up to 5 mg/kg.

Admixture of primary coagulant in this case was achieved by dosing the separated water stream prior to atmospheric or sub-atmospheric flashing. For atmospheric flashing, silencer feed water was taken from the silencer outlet to the weir box and the point of dosage of the calcium chloride was at the suction side of the hot feed pump.

When the separated feed water source was from the primary separators at its saturation temperature, typically 172° C., then dosage was at the flash cooler, just downstream of the pressure control valve. The feed water was allowed to flash to 100° C. through the flash cooler in this case. The silencer feed water was pumped through the flash cooler but no condensation took place, resulting in a feed to the process of 10 kg/s at a temperature of 95° C. to 98° C. and a silica concentration of 837 mg/kg.

After floc development in the conditioning vessels, the fluid was introduced into the DAF clarification stage where a minimum silica yield of 90% resulted in the recovery of 10.8 kg/hr (dry weight basis). Effluent from the clarifier discharged to drain at a rate of 9.6 kg/s having dissolved solids concentrations up to ~500 mg/kg silica, 200 mg/kg $Ca^{2+}$ and 5 mg/kg flocculent. Suspended solids in the effluent had a concentration of ~35 mg/kg.

Yield was further enhanced by recycle of precipitated slurry back to the point of coagulant addition. Yield from a production run was maximized by application of shear to the recycle slurry by passing such through an in-line shear mixer. This provided a particle size distribution which maximized the silica particle population, per unit weight, recycled to enhance heterogeneous nucleation.

The physical and chemical properties of precipitates from these treatments are discussed below.

Process Example 3—Production of Type III Silica

Separated water, at a flow rate of 10 kg/s and a silica concentration of 837 mg/kg, was flash cooled from 100° C. to 80° C., by passing such through a flash cooling device, to produce feedstock water with an initial pH of 8.78 (80° C.), at a flow rate of 9.64 kg/s and a silica concentration of 864 mg/kg.

The feed water was treated with calcium chloride, such that final solution concentration was up to 200 mg/kg with respect to $Ca^{2+}$ and was pumped directly to the conditioners The exact concentration was adjusted to achieve progressive precipitation upon subsequent aging and cooling. Fluid residence time in the system was short such that coagulant was present prior to and during the active polymerization phase.

Primary coagulant concentrations can be lowered if lower yields are permissible but are usually adjusted, together with the proportion of cationic flocculent, to cause complete precipitation. Typically, flocculent concentrations are maintained below 5 mg/kg. Residence time in the conditioning vessels was set such that effective precipitation was achieved and the flocculated fluid was then introduced to the unit. Yield may be enhanced with the use of slurry recycle as described in Example 2 above.

On introduction to the tank, a minimum yield of 90% was achieved, which resulted in the recovery of silica at a rate of 18.3 kg/hr at a concentration of 15 kg/m$^3$ to 30 kg/m$^3$ (dry weight basis). Slurries at higher silica concentrations could be obtained for both Type II and III silicas, e.g. ~40 wt %, if desired.

Effluent from the unit discharged to drain at a rate of 9.25 kg/s, having dissolved solids concentrations of up to ~400 mg/kg silica, 200 mg/kg $Ca^{2+}$ and 5 mg/kg cationic flocculent. Silica floc at a concentration up to 70 mg/kg was also present in the effluent stream. Dosing of the fluid with surfactant or for pH adjustment was not required.

Process Example 4—Production of Type I Tertiary Aggregate Silica With Recycle of Previously Produced Particles A slurry of Type I silica particles, having a secondary particle size of about 6–8 nm, which had been produced by a process as illustrated in Process Example 1 above, was placed in a 5 liter beaker, and enough freshly separated geothermal water was admixed with the slurry so that the weight ratio of precipitated silica in the slurry to separated geothermal water was 0.005, or a 0.5 weight percent solids composition. The mixture was then stirred at 1,000 RPM for 30 minutes at a constant temperature of about 90° C. The pH of the mixture remained at 8.5 (90° C.).

The mixture produced particulate silica, a portion of which was recovered for characterization, including examination by transmission electron microscopy. It was found that the precipitated particle product was also Type I tertiary aggregate amorphous silica, but this material had a substantially larger secondary particle size than did the particles of silica which were initially recycled to the system.

This procedure was repeated twenty (20) times, using a portion (such that the dry equivalent weight ratio of the precipitated silica slurry to the weight of the separated geothermal water was maintained constant at 0.005) of the slurry produced in the preceding batch as the recycle to the next batch. FIG. 24 hereof shows the rate at which monomeric silica is removed from freshly separated geothermal water by coagulation by the process of this invention in the presence of previously prepared particles of Type I silica having a secondary particle size of about 6–8 nm. For comparison purposes, this figure also shows the rate at which monomeric silica in the same geothermal source fluid is removed therefrom by natural precipitation at constant temperature and pH by using only naturally occurring polymerization which results from spontaneous or homogeneous nucleation. In this regard, reference is made to the data points indicated for POLY #1 and POLY #2 in this FIG. 24 and the curves drawn therethrough to show what happens in the absence of heterogeneous nucleating agents. It will be apparent that these curves show that the decline in the concentration of the monomeric silica in the geothermal fluid which occurs naturally is quite slow because it is controlled by the amount of particulate silica which is produced by natural, or homogeneous nucleation.

In contrast, the rate of-particle formation and of the disappearance of monomeric silica from the geothermal fluid is significantly higher when there are preformed particles of tertiary aggregate silica admixed with the geothermal source fluid, even in such a small amount as 0.5 weight percent. In the curves shown in FIG. 24, the first measurement of the monomeric silica content of the water was at four (4) minutes into the run. The monomeric silica concentrations for the heteronucleated system in run #1 were about 160 ppm less than in the geothermal fluid which had no slurry recycled to it.

Figure 30:
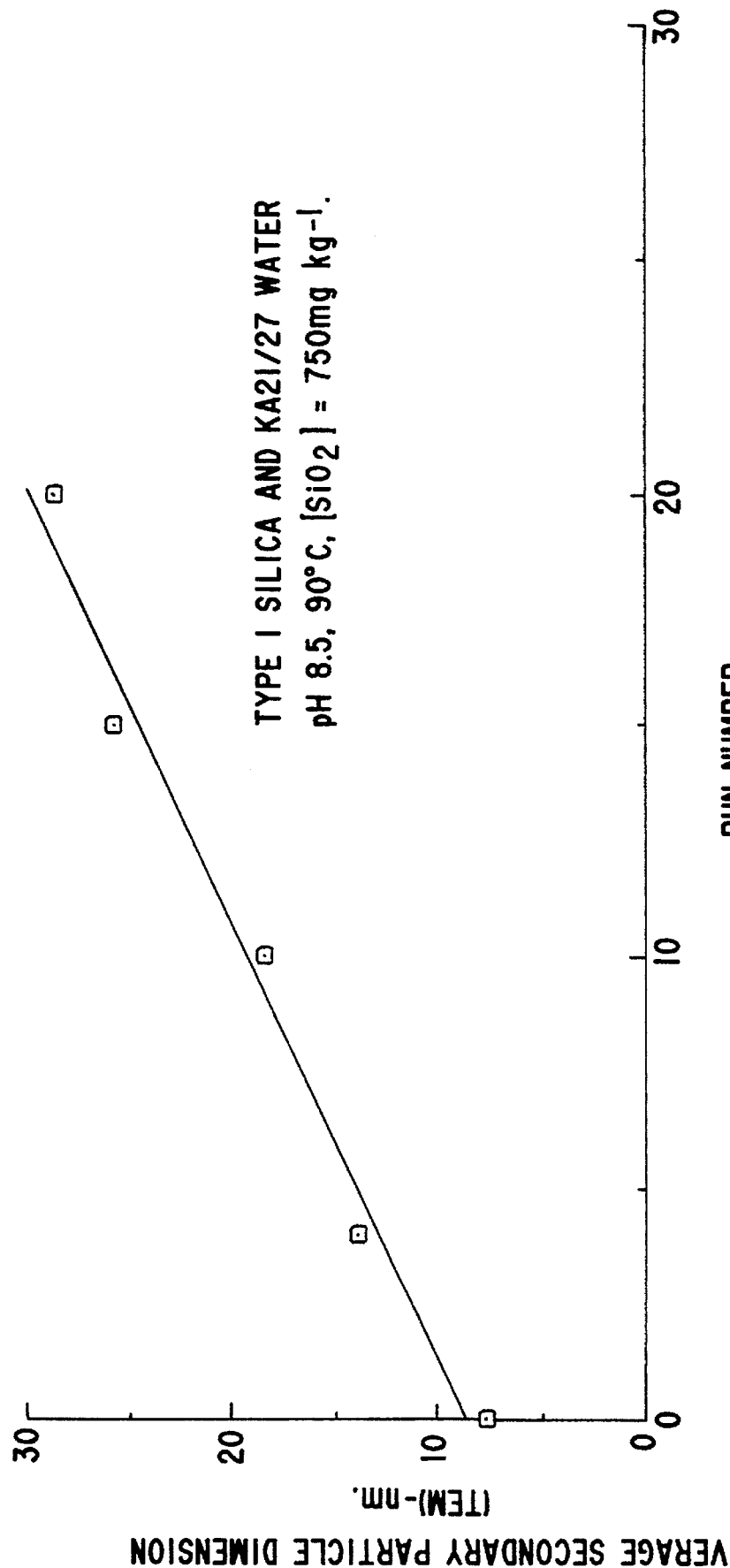
FIG. 30 is a graph showing the relationship between the size of secondary particles of silica produced using recycle of previously prepared amorphous silica particles as a function of the number of sequential recycle runs carried out.

After 30 minutes of contact and aging, a portion of the silica particle slurry of run #1 was used in the same manner to be admixed with the same amount of the same freshly separated geothermal source fluid. This same procedure was repeated twenty (20) times. The analysis of the first ten (10) times is indicated in FIG. 24. The slurry of the previous run was used in the next subsequent run. In the second run, the concentration of monomeric silica in the source fluid declined about 300 ppm after four (4) minutes of contact. The particulate silica recovered from some of these runs was examined by transmission electron microscopy (see FIGS. 25–29) and found to be substantially the same as the particles which had been recycled, except that the secondary particle size of these particles was substantially larger. The growth of the secondary particles was measured at runs 5, 10, 15, and 20, and is described by the graph shown in FIG. 30.

Process Example 5—Production of Type I Tertiary Aggregate Silica with Continuous Recycle of Previously Produced Particles The process of this example was operated according the flow schematic procedure set forth in FIG. 31. This process included continuous operation with continuous recycle of a slurry of particles of Type I amorphous silica. Separated water of pH of 8.67 to 8.71, measured at 80° C., at a flow rate of 4.5 kg/s and a silica concentration of 742 mg/kg was flash cooled to 80° C. To the water which was flash cooled was added 0.14 kg/s of Type I silica in a slurry form at a 2 weight percent concentration, and this mixture was held in a precipitation vessel for up to 5 minutes. The secondary particles of this slurry had a dimension of about 6 to 10 nm. After the holding time, an amount of Magnafloc and polyethylene oxide (molecular weight of about 6,000,000) were added such as to produce an equivalent solution concentration of each of these materials, respectively, of 1 ppm. Final flocculation and settling was achieved in the clarifier depicted in FIG. 14. Recovery of the silica and recycle was continued until the secondary particle dimensions had increased to a mean of 13 nm. The chemical characteristics of this precipitate after washing were very similar to that reported for the precipitate produced in process example 4, which are shown in Table 9.

Chemical and physical characteristics of these precipitated silicas are discussed below. The important physical and chemical parameters which characterize the suite of precipitated silicas made according to this invention are hereafter illustrated.

Physical and Chemical Characterization of Precipitates Laboratory Examples, Including Examples of the Products of Process Physical and chemical characteristics are discussed for several examples of silica products made in the laboratory, and in a pilot plant on a continuous scale, according to this invention, to illustrate:

i) the properties of precipitated silicas produced under process conditions outlined in the process examples hereof; and ii) the influence of process variables on the chemical composition, and also on the physical and structural characteristics of the products of this invention.

Type I Silica

The following examples illustrate the structural and compositional differences which are obtained for precipitated silicas, where the source fluid is aged prior to the addition of coagulant to a cumulative level which is at least equal to the critical coagulant concentration for that particular aqueous fluid under those conditions, and preferably exceeds it.

Aging After Rapid Cooling

Separated geothermal water, with a silica concentration of 850 mg/kg, was rapidly cooled under laboratory conditions by passing such through a flash cooler in conjunction with a heat exchanger to lower its temperature to 45°–55° C. Solution pH was maintained within the range 7–9. This water was then allowed to age from about 2 to 24 hrs., at which time coagulation was induced by the addition of $CaCl_2 \cdot 2H_2O$ in an amount such that the solution concentration was initially 200 mg/kg in $Ca^{2+}$, as described for the other examples discussed here.

Characterization

A milky white precipitate occurred immediately upon addition of coagulant. The time for visible floc formation to become apparent was several minutes, e.g. 2–4.

Figure 1:
FIG. 1 is a photomicrograph showing an enlarged view of Type I silica.
Figure 2:
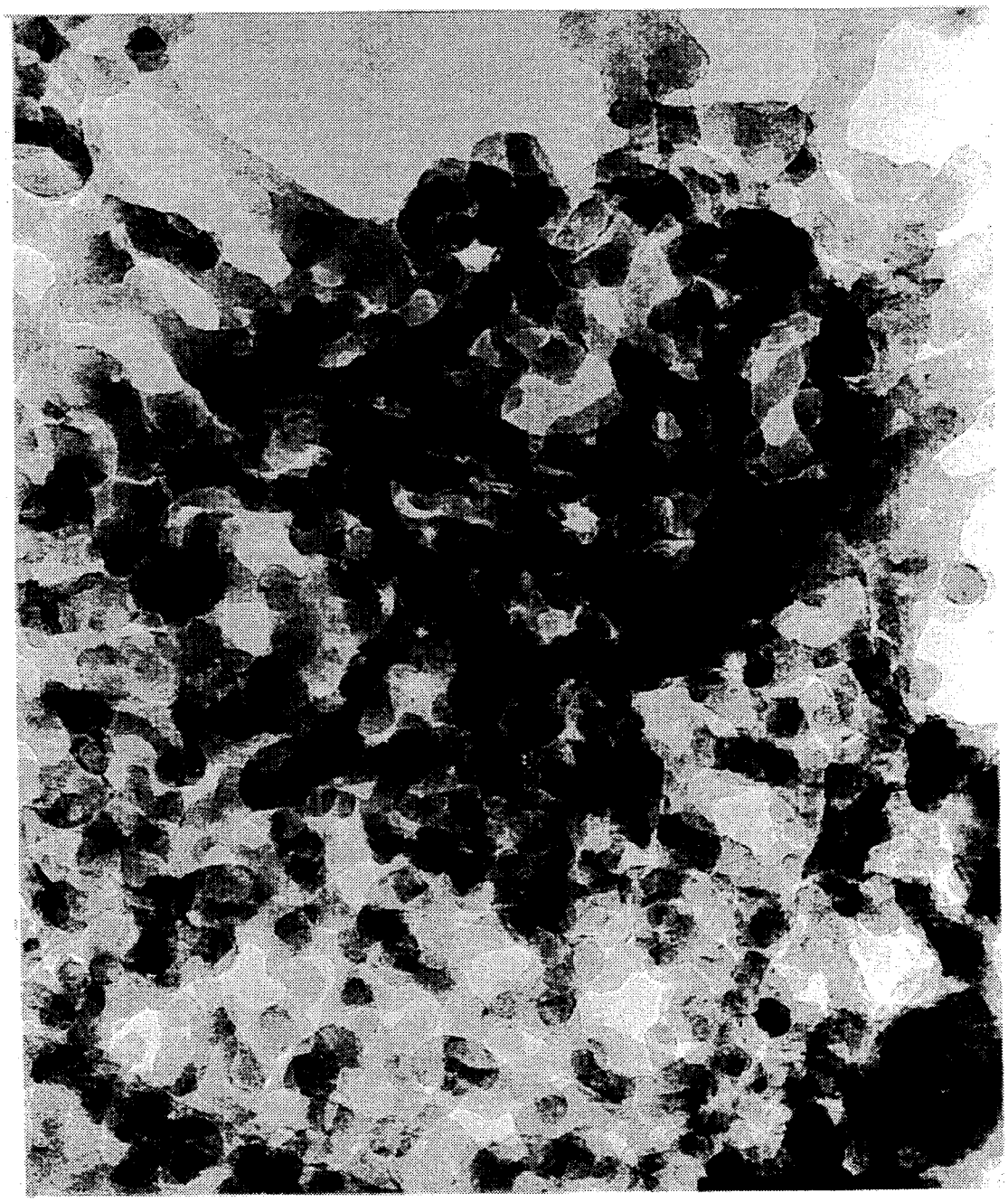
FIG. 2 and 3 are photomicrographs of Type I precipitated silica possessing tertiary aggregate and secondary particulate structure.

FIGS. 1 and 2 show TEM micrographs for precipitated silica produced from fluid which had been flash cooled to 50° C. and then precipitated using a total coagulant concentration of 200 mg/kg of $Ca^{2+}$. The secondary particulate size averaged ~12 nm. Tertiary aggregate structure was well developed and clearly illustrates the existence of secondary particulate and bridging silica described earlier for Type I silica.

The untreated slurry floc size averaged 90 μm and when dried and milled this particle size decreased to an average of ~7–8 μm. The dry powder had a high oil absorption capacity in the range of about 150–200 g/100 g.

The anhydrous chemical compositions of several precipitates produced at 50° C. and higher temperatures are shown in Table 2. The most striking feature of the chemical composition of this product is the very low arsenic [As] concentrations achieved. The arsenic content and other selected chemical compositions for the product, treated as follows, are given in Table 2.

i) a—precipitate produced at 50° C. 4–7 wt % physisorbed water, and 10 wt % chemisorbed water;

ii) b—precipitate produced at 65° C., 3–4 wt % physisorbed water, and 11–12 wt % chemisorbed water; and iii) c—precipitate produced at 80° C., 2 wt % physisorbed water, and 17 wt % chemisorbed water.

TABLE 2

| CHEMICAL COMPOSITION (Anhydrous Basis) | | | | | |
|---|---|---|---|---|---|
| $SiO_2$ (wt %) | CaO (wt %) | $Fe_2O_3$ (wt %) | $Al_2O_3$ (wt %) | S (wt %) | As (mg/kg) |
| 90.50 a | 7.56 | 0.02 | 0.28 | 0.018 | 12.6 |
| 95.97 a | 3.56 | 0.03 | 0.43 | 0.015 | 8.6 |
| 81.36 b | 12.68 | — | — | 0.025 | 27.5 |
| 74.81 c | 22.64 | 0.01 | 0.33 | 0.047 | 56.9 | a - 50° C. treatment*
b - 65° C. treatment*
c - 80° C. treatment*
*SEE TEXT ABOVE Measured BET ($N_2$) surface areas for the 50, 65 and 80° C. precipitates listed in Table 2 above were 168, 179 and 118 $m_2/g$ respectively.

Long Aging at Low Temperature.

Precipitation

Separated geothermal water, with a silica concentration of ~850 mg/kg, was cooled from 100° C. to 35° C. over a period of 18 hrs. This cooling was achieved by allowing the geothermal fluid to stand. It simulated what can be expected from natural pond cooling. The pH remained unmodified since the pH of the natural solution was maintained between pH 7–9. Coagulation was initiated by addition of a $CaCl_2 \cdot 2H_2O$ stock solution, at a concentration of ~100,000 mg/kg, to achieve a final $Ca^{+2}$ concentration of 300–400 mg/kg. Introduction of the coagulant was performed according to conditions outlined in the treatment described above.

Characterization

A milky white precipitate occurred immediately upon addition of the coagulant. However, floc formation was not visible for several minutes, e.g. 2–5. Initial floc size was significantly smaller than under hotter conditions and only slowly increased. The final floc size remained smaller than that formed under hotter conditions up to the time at which natural gravitational settling was to have been completed.

At a coagulant concentration of 300–400 mg/kg $Ca^{2+}$, primary, secondary and tertiary particle size and structure were similar to that described for products made by the treatment under hotter conditions. Yield can be enhanced with an increase in the $Ca^{2+}$ concentration used, or alternatively a combination of coagulant and flocculent can be employed. Further increases in the yield can be achieved by employing a suitable coagulant or flocculent together with seeds of previously prepared tertiary aggregate amorphous silica particles.

The secondary particulate size for a 300 mg/kg $Ca^{2+}$ treatment was ~15 nm. The use of 600 mg/kg $Ca^{2+}$ as coagulant at slightly lower temperatures, decreased the mean secondary particle size to 12 nm. This contributes to an increased surface area of the silica particles from 120 $m^2/g$ to ~150 $m^2/g$. The overall structural characteristics of the product were similar to those described for the product made using a 200 mg/kg $Ca^{2+}$ treatment, but under hotter conditions (see FIG. 2). The anhydrous chemical composition is shown in Table 3.

This product contained significantly less calcium and more silica than that coagulated under hotter conditions, as described above. Arsenic adsorption was also low under these conditions. The extent of arsenic adsorption is largely governed by the temperature at which aging occurs, provided that the pH of the feedstock solution was comparable. As for all unwashed products described here, contamination by colorants, such as iron is negligible.

TABLE 3

| | | CHEMICAL COMPOSITION | | | |
|---|---|---|---|---|---|
| $SiO_2$ (wt %) | CaO (wt %) | $Fe_2O_3$ (wt %) | $Al_2O_3$ (wt %) | S (wt %) | As (mg/kg) |
| 96.85 | 2.59 | 0.028 | 0.519 | 0.019 | 21.2 |

The water component comprises:
i) 4 wt % physisorbed
ii) 7 wt % chemisorbed

Yield under these conditions was determined to be 450 mg/kg on a pure, anhydrous $SiO_2$ basis.

Acid washing of this product decreased the CaO component to 0.31 wt %, while increasing the silica content to 99.19 wt %. However, upon acid washing, a significant amount of arsenic sulphide has been observed to form and this can reduce product whiteness.

Short Aging at High Temperature.
Precipitation

Figure 15:
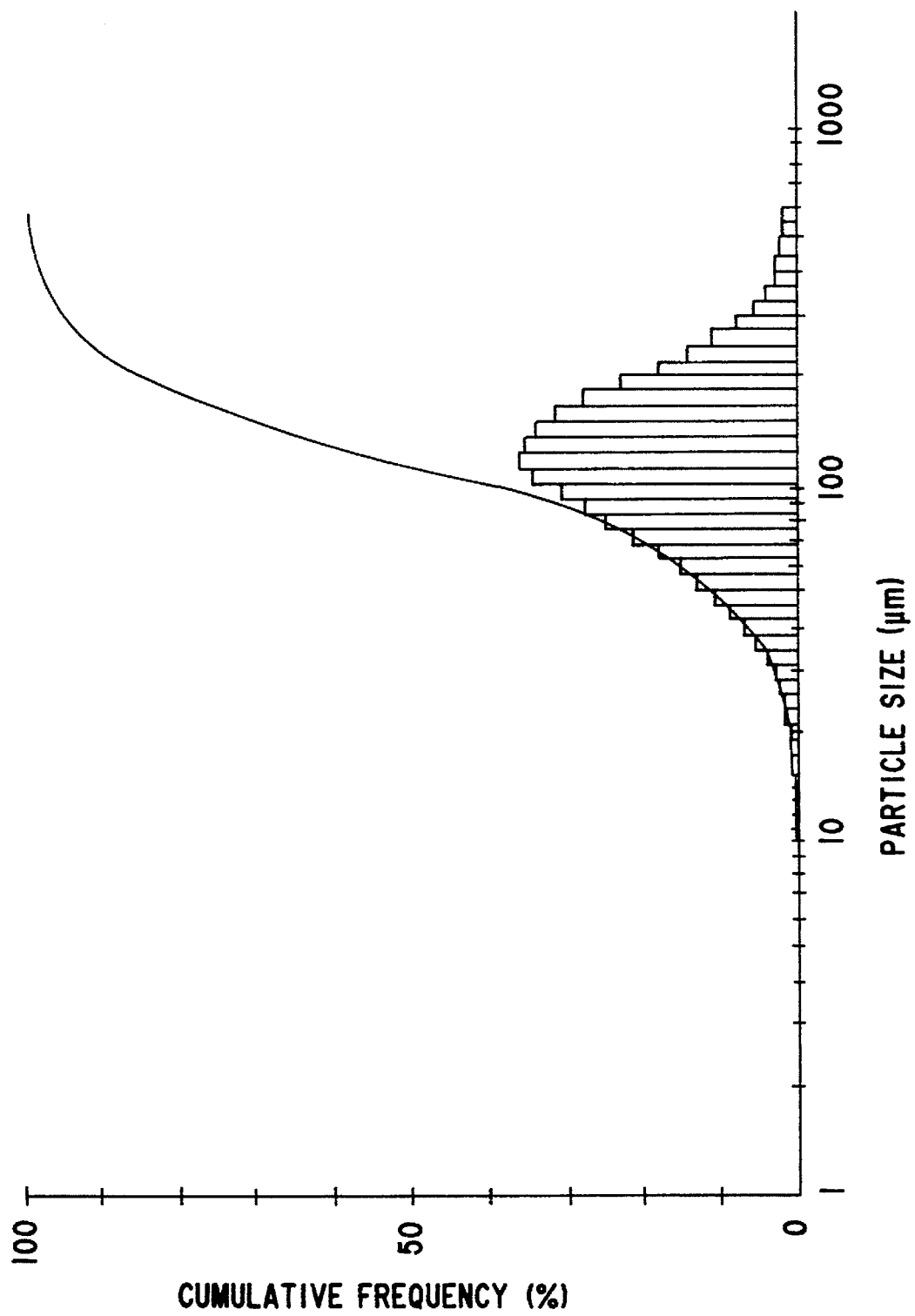
FIG. 15 is a graph showing the particle size distribution of an untreated flocced amorphous silica made according to one aspect of this invention.

Separated geothermal water with a silica concentration of ~850 mg/kg, was cooled from 100° C. to 80° C. after 20 minutes aging. Induced coagulation of the silica sol thus formed was effected by addition of a $CaCl_2.H_2O$ stock solution, at a concentration of ~100,000 mg/kg, to achieve a final solution concentration of 200 mg/kg $Ca^{2+}$. Rapid and thorough mixing of the $CaCl_2$ solution with the geothermal fluid is necessary to avoid localized high concentrations of coagulant, which affects secondary particle size.
Characterization A milky white precipitate forms immediately upon $Ca^{2+}$ addition and, within a minute, floc formation is clearly visible. The stable, untreated floc (tertiary aggregate) size expressed in terms of volume distribution is shown in FIG. 15. The size of the floc in the slurry can be influenced by surfactant addition, conditioning time and shear. It is preferable that the floc size have a particle size volume distribution with a mean at ~8 μm, and ≦90% of the particle population having a size of less than about 20 μm. This specification is expressed in terms of the dispersed, dry powder.

Figure 3:
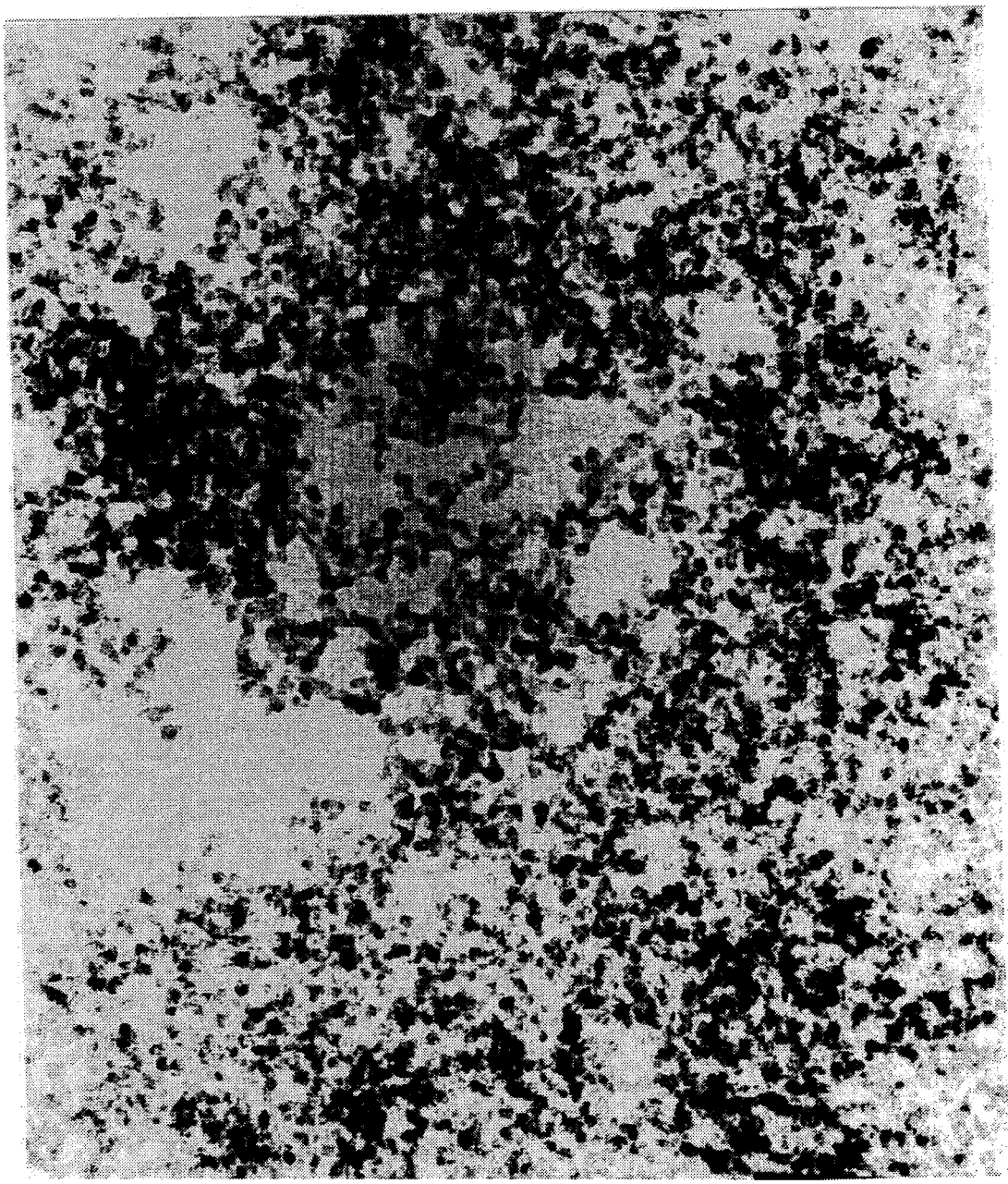

A Transmission Electron Micrograph shown in FIG. 3 indicates that the mean secondary particle size can be as high as ~12 nm where this is distinguishable. The primary or ultimate particle size, as illustrated by the textural grain which is apparent in FIG. 1, is ~1.5 nm (15Å). The overall structural make-up comprises spheroidal secondary particles linked via a complex mass of primary particles, which constitute the bridging silica which contributes to an intricate three dimensional silica aggregate. Apart from the particles being more elongated than the spheroidal primary particles and generally not exceeding the cross-sectional diameter of these primary particle spheroids, as shown in FIGS. 1–3, the bridging silica generally lacks definitive geometry.

The anhydrous chemical compositions of several representative precipitates produced using these precipitation conditions are illustrated by the ranges reported in Table 4.

TABLE 4

| | | CHEMICAL COMPOSITION | | | |
|---|---|---|---|---|---|
| RUN | $SiO_2$ (wt %) | CaO (wt %) | $Fe_2O_3$ (wt %) | $Al_2O_3$ (wt %) | S (wt %) | As (g/kg) |
| 1. | 74.14 | 21.88 | 0.030 | 0.360 | 0.070 | 91.5 |
| 2. | 89.94 | 9.20 | 0.025 | 0.778 | 0.055 | 74.0 |

Water composition was determined as follows:
i) physisorbed; 2–5 wt % for 1 and 2 respectively
ii) chemisorbed; 13–17 wt % for 1 and 2 respectively The determination of yield for several precipitates produced under these conditions shows that ~475 mg/kg of $SiO_2$ is extractable; this assessment is based on pure anhydrous silica.

Decantation acid washing of the precipitated silica (Table 4, RUN No. 1), using 0.1 N HCl, resulted in a product having the composition given in Table 5, infra. The significant decrease in calcium concentration, represented as CaO, indicates the surface adsorbed nature of the coagulant and dissolution of traces of calcium carbonate.

TABLE 5

| | | CHEMICAL COMPOSITION | | | |
|---|---|---|---|---|---|
| RUN | $SiO_2$ (wt %) | CaO (wt %) | $Fe_2O_3$ (wt %) | $Al_2O_3$ (wt %) | S (wt %) | As (mg/kg) |
| 1. | 96.91 | 2.47 | 0.017 | 0.581 | 0.019 | 33.1 |

The unwashed precipitated silica has a surface area, which was determined by $N_2$ adsorption (BET), of 140 $m^2/g$. Should an increase in surface area be desired, a decantation acid wash can be performed. For example, pH adjustment of the brine in contact with slurry to ~5 increases the surface area to 260 $m^2/g$.

The unwashed and acid washed products have high oil absorptive characteristics. The unwashed precipitated silica has an oil absorption value of ~110 to 200 g/100 g. The acid washed product slightly exceeds this range with oil absorption values in the range of about 130 to 230 g/100 g.

Type II Silica
Precipitation

Separated geothermal water at 100° C. with a silica concentration of ~850 mg/kg and an initial pH of 8.90, was pretreated with a known amount of 100,000 mg/kg $CaCl_2$ stock solution, to achieve a final solution concentration of ~200 mg/kg $Ca^{+2}$. The solution pH decreased ~0.3 units upon the addition of the $CaCl_2$.

On a laboratory scale, continuous and thorough mixing of the $CaCl_2$ coagulant was achieved by timed, drip feed addition at the mini-silencer water outlet. Solution temperature had decreased to 70° C. at the time of slurry separation.
Characterization The solution initially turned milky white upon the addition of the coagulant, and the precipitate was established upon standing for several minutes. Gentle continuous stirring was employed to allow contact of the developed floc with finer colloidal silica until precipitation was substantially complete; up to 10 mins.

Figure 4:
FIGS. 4 and 5 are photomicrographs of Type II precipitated silica possessing tertiary aggregate structure with secondary particles more clearly evident and bridging silica present to a lesser extent compared to Type I, above.
Figure 5:
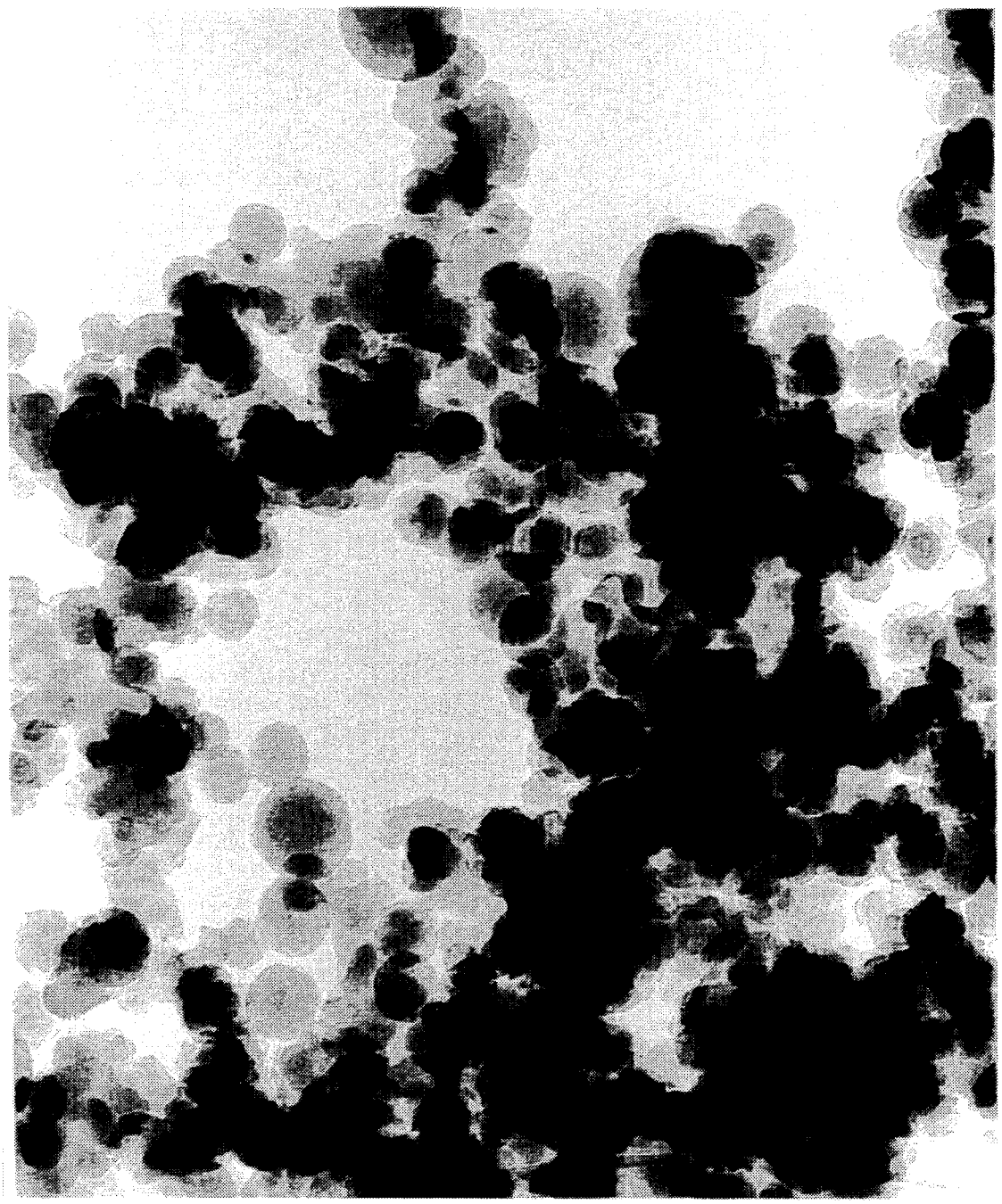

FIGS. 4 and 5 illustrate the structural characteristics of this silica which has been fully described elsewhere herein. The anhydrous chemical composition of this silica is shown in the following Table 6:

TABLE 6

| CHEMICAL COMPOSITION | | | | | |
|---|---|---|---|---|---|
| $SiO_2$ (wt %) | CaO (wt %) | $Fe_2O_3$ (wt %) | $Al_2O_3$ (wt %) | S (wt %) | As (mg/kg) |
| 80.9 | 15.6 | 0.42 | 1.19 | 0.14 | 62.9 |

Water composition was determined as follows:
  i) physisorbed 1.7 wt %
  ii) chemisorbed 14.6 wt %

This yield, without slurry recycle, of silica with a modified particle size, was 350 mg/kg (on a pure, anhydrous basis), which is significantly lower than that obtained for Type I silica. Oil absorption capacities of this silica, at 100 g/100 g, were significantly below that for Type I silicas.

The slurry consistencies with this silica can reach ~40 wt % upon settling, in sharp contrast to Type I silica. The Type II silica has very little tendency to gel, i.e. it is essentially non-thixotropic.

Type III Silica
Precipitation

Separated geothermal water at 100° C., having a silica concentration ~850 mg/kg, was pre-treated with $CaCl_2$ solution such that the final solution $Ca^{2+}$ concentration was 100 mg/kg during the polymerization phase. After polymerization, the sol was then allowed to age for 20 mins. with intermittent stirring. Precipitation followed.

Characterization

Precipitation was progressive. First the solution turned milky and then it became more turbid with time. Then, floc formation proceeded, but precipitation was not complete even after aging. Complete precipitation was finally effected with the addition of 2–3 mg/kg of high charge density cationic flocculent.

Figure 6:
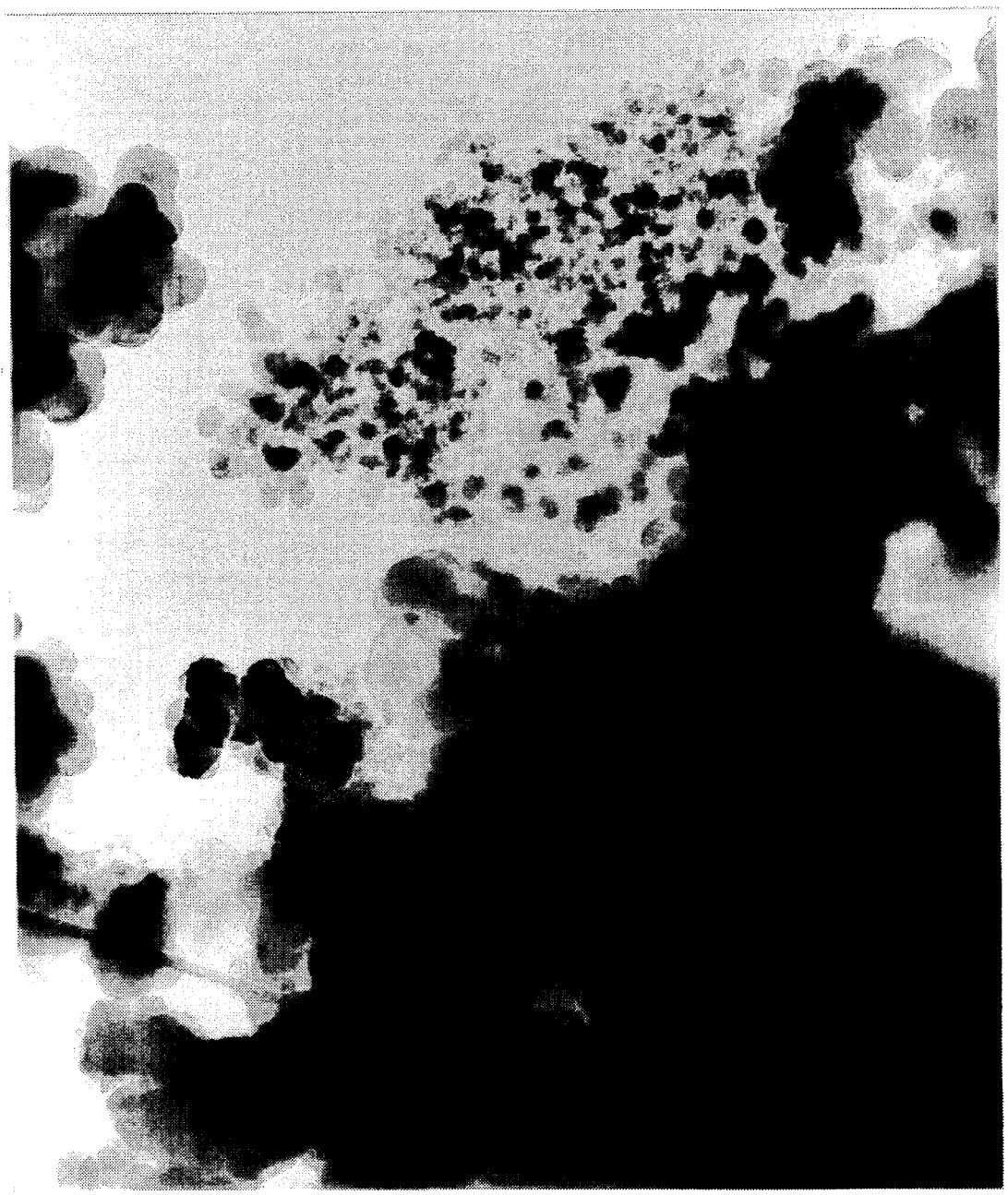
FIGS. 6 and 7 are photomicrographs of Type III precipitated silica.
Figure 7:

FIGS. 6 and 7 illustrate the diversity of structure obtained with this method of preparation. Up to 450 mg/kg Type III tertiary aggregate $SiO_2$ (on a pure, anhydrous basis) was extractable.

The anhydrous chemical composition of this recovered silica is shown in Table 7.

TABLE 7

| CHEMICAL COMPOSITION | | | | | |
|---|---|---|---|---|---|
| $SiO_2$ (wt %) | CaO (wt %) | $Fe_2O_3$ (wt %) | $Al_2O_2$ (wt %) | S (wt %) | As (mg/kg) |
| 82.3 | 15.6 | 0.02 | 0.40 | 0.02 | 16.7 |

OTHER COAGULANTS

Chemical compositions for representative tertiary aggregate silica products precipitated according to this invention with the aid of $Al^{3+}$ and $Mg^{2+}$ salts are provided in Table 8. These were precipitated under conditions which are substantially the same as those which have been described for precipitating Type I silica. Precipitates have also been prepared according to procedures which have been described for the production of Types II and III silicas using the above coagulants. These products had characteristics which were similar to those reported for precipitation by the use of $Ca^{2+}$ treatments.

If aluminum ions are present in, or introduced into, the geothermal water, then they may sometimes become substituted for silicon in the silica unit and hence be incorporated in the overall particle structure. This substitution is generally minor at lower coagulation temperatures but can be significant at higher temperatures.

As discussed elsewhere herein, arsenic adsorption is favored with longer aging at higher temperatures and also at lower pH during the coagulation step. Final pH, after addition of 40 mg/kg of $Al^{3+}$ to a composition, was ~6.3.

TABLE 8

| CHEMICAL COMPOSITION | | | | | |
|---|---|---|---|---|---|
| $SiO_2$ (wt %) | CaO (wt %) | $Fe_2O_3$ (wt %) | $Al_2O_3$ (wt %) | MgO (wt %) | As (mg/kg) |
| 90.8 - 1a | 0.13 | 0.01 | 0.34 | 6.86 | 4.44 |
| 92.8 - 1b | 5.23 | 0.01 | 0.32 | 0.12 | 26.6 |
| 79.5 - 2a | 0.51 | 0.02 | 16.1 | 0.00 | 222 |
| 92.2 - 2b | 5.35 | 0.01 | 0.33 | 0.13 | 126 |

1a - 200 mg/kg $Mg^{2+}$ treatment/aged 2 hrs/slow cooling
1b - 200 mg/kg $Mg^{2+}$ treatment/rapid cool/aged
2a - 40 mg/kg $Al^{3+}$ treatment; as for 1a
2b - 40 mg/kg $Al^{3+}$ treatment; as for 2a It is significant that the magnesium treatments produced precipitated silica with high measured surface area; for sample 1a and 1b in Table 8, these were 274 and 302 $m^2/g$ respectively.

Type I Silicas Produced With Recycle of Previously Prepared Particles Of Type I Silica
Characterization The starting silica particles used in Process Example 4 above had a secondary particle size of about 6.5 to 10.5 nm. The average pore diameter of these starting particles was about 7 nm, as determined by interpretation of absorption-desorption isotherms using nitrogen as the adsorbed species. Table 9 below shows the chemical and the physical properties of Type I particulate silicas made according to Process Examples 1, 4 and 5 according to this invention.

Most importantly, FIGS. 25–29 (which are transmission electron micrographs, all of the same magnification) show the progressive growth of the Type I silica particles when repeatedly exposed to freshly separated geothermal water. It should be apparent from these micrographs that the silica which has been removed from solution possesses the same fundamental structure, being that of the primary particle and that of the overall Type I structure, as the growth occurred.

The surface area and the oil absorption analyses for the initial starting Type I silica and this same silica after runs 10, 15 and 20 are shown below in Table 10. A significant increase in oil absorption capacity occurred as the secondary particle dimensions increased above 15 nm, and the oil absorption capacity appeared to reach a maximum from 20 to 30 nm.

TABLE 9

Physical and Chemical Properties of Geothermal Silicas

Physical Properties

| SILICA | Secondary Part. Size (nm) | Tertiary Part. Size (% < 1 μm) | BET Surface Area (m²/g) | Oil Absorption (g/100 g) | Dry Strength (hand grind) |
|---|---|---|---|---|---|
| Type I (Example 1) | 6–8 | 0 | 120 | 130 | brittle |
| Type I (Process Example 4) | 29 | 75 | 55 | 209 | very soft friable |

| SILICA | $SiO_2$ (%) | $Al_2O_3$ (%) | $Fe_2O_3$ (.%) | CaO (%) | $Na_2O$ (%) | $K_2O$ (%) | As (ppm) | LOI (%) |
|---|---|---|---|---|---|---|---|---|
| Chemical Properties (unwashed) | | | | | | | | |
| Type I (Example 1) | 76.93 | 0.33 | 0.02 | 7.23 | 1.14 | 0.28 | 38.6 | 13.94 |
| Type I (Process Example 4) | 86.22 | 0.68 | 0.06 | 3.95 | 0.44 | 0.26 | 7.4 | 8.66 |
| Chemical Properties (washed) | | | | | | | | |
| Type I (Process Example 4) | 92.90 | 0.28 | 0.03 | 0.33 | 0.11 | 0.14 | <5.0 | 5.67 |

TABLE 10

PHYSICAL PROPERTIES OF RECYCLED Type I SILICAS

| RUN NUMBER | TEM SECONDARY PARTICLE SIZE (MEAN) nm | BET SURFACE AREA m²/g | OIL ABSORPTION CAPACITY SPATULA RUB-OUT METHOD g/100 g |
|---|---|---|---|
| INITIAL SILICA | 8.4 | 149 | 126 |
| RUN # 10 | 18.4 | 84 | 173 |
| RUN # 15 | 25.8 | 56 | 223 |
| RUN # 20 | 28.7 | 49 | 209 |

PRODUCT APPLICATIONS

The precipitated amorphous silicas identified herein can be obtained directly in high purity. Product with greater than 99 wt % $SiO_2$, on an anhydrous basis, can be achieved with relative ease. This product can be further upgraded by using simple washing techniques, if necessary, as the remainder comprises mostly surface adsorbed calcium, or other materials such as, for example, coagulation and precipitation agents which had been involved in the inter-particle bridging and growth process and which can be readily removed to a substantial extent.

The optical properties, when measured on a pure silica product, can have the following L*, a, and b* values (CIE scale, illuminant D65, and 10° viewing angle from normal observer).

L*;—97.8 a*;—0.0 b*;—1.3

Type I silica of secondary particle dimensions less than 10 nm has thixotropic qualities which makes it suitable for use in applications where thickening or reinforcement by an additive is required. When applied for this use, the Type I particulate silica of this invention can be mixed with the material which it is intended to thicken in a conventional manner and in conventional proportions which are related to the amount of thickening which is desired. It has been found that the thickening ability of the Type I silica of this invention is substantially better than that of other conventionally produced silicas when used in the same proportions.

The relatively high surface area of Types I and III silicas, made according to this invention, their complex structural characteristics, and their high pore volumes, make these silicas suitable for many applications where the absorptive capacity of additives is important. For example, durable rubber products are made with the use of a conventional filler which is required to have an open reticulated structure. Such fillers are required to have surface areas of about 60 m²/g and oil absorption capacities of about 180 g/100 g. These required characteristics can be easily met with several Type I silicas produced by the processes of this invention, some of which will be characterized, infra.

Silicas which are normally made synthetically under anhydrous conditions and using very high energy processes are similar to the Type II silicas of this invention. These silicas do not have the same thixotropic qualities as the Type I silica tertiary aggregate particles hereof. Type II silicas are easily dispersed in most solid and liquid systems. They are widely useful as extenders in systems which conventionally employ expensive high grade opacifying fillers or coatings, e.g. $TiO_2$.

APPLICATION TO PAPER

In yet a further aspect, the present invention consists of paper filled with, and/or coated with precipitated amorphous silica derived from a process of the present invention. In filling paper with the silica particles of this invention, it is appropriate to add the silica to the pulp prior to conversion of the pulp into the paper by the conventional wire draining processes or the like. In some cases, it might be appropriate to add the silica during the pulp mixing operation which precedes paper formation. In the alternative, it is possible to add the silica at the very end of the pulp mixing portion of the paper making process. The silica for this use may be put up in either a slurry or a powder form. If the silica is in the slurry form, the amount of water in the silica slurry should be taken into account when calculating the amount of slurry needed to achieve a target silica ash content in the paper.

It is within the scope of this invention to apply the silica of this invention as a coating onto an already formed paper sheet. In this embodiment of this invention, it is appropriate to provide the silica as a slurry, and then to use conventional coating techniques to apply the silica slurry to the surface of the paper. Such techniques include spraying, applying with a doctor blade, and the like. It would be appropriate to apply the silica coating by dipping the paper in the slurry, whilst taking precautions to insure that contact of the paper with the water in the slurry does not disrupt the paper.

As a filler, the amount of silica should be controlled, relative to the paper weight, to be about 0.5 to 20 weight percent, preferably about 1 to 5 weight percent. In these proportions, it has been found that the opacity of the paper is substantially improved as compared to the opacity of the same paper which has been filled with the same amount of conventionally derived silica. Further, when used as a filler in these proportions, it has been found that the ultimate paper product has substantially improved ink retention, that is the ability to hold ink in the place where it has been printed without it either running away from the printed areas or bleeding through the paper to the other side thereof.

As a coating, the silica should be applied in such proportions that the coated weight of silica in the product is about 3 to 30 $g/m^2$. The coating weight is preferably about 15 to 20 $g/m^2$. When the silicas of this invention are coated onto the previously formed paper according to this aspect of this invention, the product has substantially improved whiteness as compared to the same paper coated with the same proportion of conventional silica. It also has substantially improved ink receptivity and ink location retention.

It appears that the silicas of this invention have a unique micro-structure which is well suited to receiving, absorbing, and holding the ink particles on its surface. This causes the ink to remain on the surface of and in the location on that surface where it is printed. Of course this is a very desirable attribute of the silicas of this invention.

A precipitated silica slurry made according to the process of this invention can be used directly in the paper-making process, where it is incorporated into the paper sheet to improve print and optical qualities. Alternatively, if the product is recovered from the processes of this invention as a solid, it may be re-slurried and then used similarly.

Precipitated silicas of all types described herein have been tested in paper handsheets. The addition of the particulate silicas has been in both slurry and powder forms. The print quality of handsheets has been evaluated for all silicas produced as described in the examples hereof and compared to these same properties for commercially available high grade fillers.

Handsheets were manufactured using a typical newsprint pulp having a strict grammage tolerance of 48±0.5 $g/m^2$ (air dry weight–AD). These were then soft calendared to a caliper of 75 ±3 μm to obtain a representative sheet for comparison with industry standard newsprint.

Several examples of Type I silicas, made according to this invention, were added to the paper. These filled papers were tested and shown to have improved both unprinted and printed optical properties of a greater magnitude than that achievable with conventional filler materials. Type I silica products have relatively high pore volumes and surface areas of about 60 to >300 $m^2/g$ (dried material). The tertiary network structure of the particles is present in both the slurry and powdered forms. The measured oil absorption capacities of the dried powder are up to about 280 g/100 g. These qualities are very important to the effective function of the precipitated silica in paper.

Types II and III silicas also improved print quality, but to a lesser extent. This lower level of performance of these species is believed to be due to the fact that these species of silicas made according to this invention have a less highly developed pore structure. Apparently, this causes the oil absorption capacities of these products in the sheet to be somewhat lower than is achieved by using Type I silica.

In those examples where Type I tertiary aggregate amorphous silica was used in combination with paper, print-through decreased by as much as 0.03 units at a filler content (measured as ash) in the range 1–6 wt %. Opacity was increased by as much as 1–3 percentage points at ~2 and 4 wt % addition respectively. Both wire and felt sides of the paper were similarly improved at the two (2) inking levels tested.

The following examples show the addition to paper of the silica derived from geothermal fluid sources according to this invention. The silica particles of this invention were added to virgin newsprint fiber and the mixture converted into paper in the conventional commercial manner. The properties of the printed and the unprinted newsprint were examined and compared to similar papers prepared with no fillers or other fillers as will be apparent. In these examples, parts and percentages are by weight unless expressly stated to be on some other basis.

Example 6

Ten (10) tons of dry equivalent Type I silica was extracted from geothermal water discharged from wells KA21 and KA27 at the Kawerau geothermal resource from a process similar to that set forth in Example 1 above. This silica was contained in a 5 weight per cent slurry, and then transported to storage chests proximate to a paper making machine. The mean size of the secondary particles of this silica was about 12 nm. This silica had a BET surface area of 53 $m^2/g$, an oil absorption capacity of 130 g/100 g, and a reflectance of 95.2% at 550 nm (D65/10° from normal observer).

The slurry of silica was pumped into the paper machine headbox overflow to the machine chest such that it returned to the headbox and then directly to the paper machine via the primary and the secondary fan pumps. The flow rate of the silica slurry was adjusted such that the target concentration of 1.5 weight percent silica in air dry paper was achieved.

Table 11, below reports the significant physical properties of the newsprint sheet produced from this run in the paper making machine. It will be clear from the data in the table that separate trials were conducted during which the same newsprint was filled with: geothermal silica made according to this invention; calcined clay; and no filler at all. The wood supply, bleaching program and pulp components supplied to the machine at the time of the trials were the same. It was possible to examine the unprinted and the printed properties of the filled and unfilled sheets produced from the same machine.

The paper was tested for unprinted properties according to methods specified by TAPPI (1987). Printed properties, such as "print through" were assessed in the laboratory using an IGT laboratory press and commercially on letterpress and offset presses. The initial commercial press room trials were conducted separately for the samples filled with the geothermal silica and the calcined clay, respectively.

TABLE 11

NEW IMPROVEMENT WITH ADDITION OF GEOTHERMAL SILICA

| Property of 48.8 g/m² Standard Newsprint | Geothermal Silica (1.8 wt %) | Calcined Clay (1.7 wt %) |
|---|---|---|
| Brightness (points) | +1.7 | +1.4 |
| Opacity (points) | +1.7 | +1.1 |
| L* (points) | +0.9 | +0.8 |
| Porosity | +15% | 0% |
| Top Side Roughness | −10% | 0% |
| Burst Strength | −10% | −9% |
| Tensile Strength | −6% | 0% |
| Coefficient of Friction | +41% | NOT MEASURED |
| Print Through Reduction Offset Press | 25–30% 1.5 wt % silica | 20% 1.7 wt % clay |
| Print Through Reduction Letterpress Press | 15–20% 1.5 wt % silica | 10% 1.7 % clay |

Both filled samples were run simultaneously with the unfilled paper on the same press such that a direct comparison could be made with respect to the unfilled sheet before and after the same newsprint edition to remove any possibility that the unfilled sheet in the above comparison had contributed to the differences in the performance of the two fillers. The results of these tests are shown in Table 12, below.

TABLE 12

COMMERCIAL PRINTING OF GEOTHERMAL SILICA FILLED NEWSPRINT

| | Print-through | % Reduction |
|---|---|---|
| Offset Press | | |
| Unfilled 48.8 g/m² | 0.056 | — |
| Geothermal Silica 1.5 wt %; 48.8 g/m² | 0.040 | 28.6 |
| Calcined Clay 1.7 wt %; 48.8 g/m² | 0.044 | 19.6 |
| Letterpress Press | | |
| Unfilled | 0.070 | — |
| Geothermal Silica 1.5 wt %; 48.8 g/m² | 0.061 | +13 |
| Calcined Clay 1.7 wt %; 48.8 g/m² | 0.075 | −7 |

It should be noted that the increase in opacity and brightness of 1.7 points at 1.8% geothermal silica in the paper was far above expectations in comparison with the performance of the calcined clay, which is a material which is specially manufactured to effect improvements in the opacity and brightness of newsprint, at low ash levels. The commercial print through measurements indicated that twice as much calcined clay would have been required in this particular tested sample of newsprint to achieve the same print quality.

Commercial synthetic silicas and silicates are already used as fillers in the paper industry. The principal reason for using silicas as fillers is to improve the oil absorption capacity of the filled paper sheet such that the print does not show through so much from one side to the reverse side. The expectations of the paper maker, with respect to the improvement in opacity as compared to that achievable with commercial silicas, was low. When commercially available silicas are added to newsprint stock at a loading of about 1.5 to 3.0 weight percent, the opacity increases are quite small as compared to the same unfilled paper. In fact, in 1985, Bown (Fillers For Uncoated Groundwood Papers; Proc. 2nd Uncoated Groundwood Papers Conference, N.Y.) documented these changes in opacity as being insignificant.

In contrast to this report of insignificant increases in opacity brought about by the use of commercially available silica fillers, as shown in Table 11, for 48.8 g/m² standard newsprint, the increase in opacity brought about by using the special silicas of this invention as fillers was not only significant, it was even slightly better that the opacity increase which was achievable by the use of the specially designed calcined clays which are the standard in the industry. Further, these data also show that the reduction in print through was significant, and was significantly better than with the conventional calcined clay.

Example 7

In the above Example 6, the mean particle dimension of the secondary particles of the Type I silica was about 12 nm, which is somewhat smaller than the particle sizes of the commercial, synthetically manufactured silicas which have been used in the newsprint industry. These commercial silicas have been analyzed by TEM as having particle sizes of about 15 to 25 nm. In order to determine if this mean size difference was responsible for the unusual properties of the silicas of this invention, a Type I silica was manufactured according to this invention which had secondary particles with a mean size of about 26 nm (see FIG. 28). The oil absorption capacity of this silica was 223 g/100 g (determined by the spatula rub out method using boiled linseed oil). The particle size analysis, by laser using a Malvern Mastersizer, showed that 75% of the particles had a dimension of less than 1 µm.

When this silica is used in the making of paper in the same manner as in Example 6, the opacity of the resultant filled paper increases 1 point per weight percent of Type I silica retained in the paper. The paper which used this Type I silica was determined to have a print through reduction of about 50% at a retained silica content of 1.5 weight %.

Example 8

Geothermal silica as produced by the process set forth in Example 1 hereinabove, can be added as a component of a coating formulation intended for use as a paper coating. The silica is intended to function as an inert extender for the coating, and also to improve the opacity of the coated paper. In this respect, it is intended that the silica replace the calcium carbonate, clay or calcined clay which are conventionally used for these purposes.

The Type I silica of this example has an average secondary particle size of about 20 nm, an oil absorption of about 150 g/100 g, and a reflectance of greater than 95% at 550 nm (D65/10° from normal observer). It is added to the coating composition in a proportion of about 15% of the coating weight. The coating provides significantly greater opacifying effect than any of the clay or calcium carbonate which are conventionally used for this purpose in such coating formulations. The TAPPI opacity will be improved up to about 3 points, and the TAPPI brightness will be improved by up to 5 points relative to the opacity and brightness imparted by conventional clays.

APPLICATION TO RUBBER

Silicas have been used as reinforcing agents in vulcanized rubbers for many years. The added silica achieves some improvement in the tensile strength, the tear strength, and the elongation prior to break, of rubbers, relative to these same properties in rubbers which have been filled with other materials, such as for example, carbon blacks.

Example 9

Type I silica made according to this invention and having the properties set forth in the following Table 13, was added to natural rubber in a proportion of about 60 parts by weight of silica per 100 parts by weight of rubber.

TABLE 13

Properties of Silica Reinforcing Agent

|  | Surface Area (BET) ($m^2$/g) | Oil* Absorption (g/100 g) | pH 5 wt % aqueous suspension | Tapped Bulk Density (g/$cm^3$) | TEM cross-section dimension (nm) |
|---|---|---|---|---|---|
| Sample 2 | 155 | 212 | 6.3 | 0.27 | 13 |

*boiled linseed oil; spatula rub-out method

By comparison to the tensile strength, (shore) hardness and tear strength of the same rubber filled with the same amount of conventional silica, the rubber filled according to this invention had unexpected improvements in these properties.

APPLICATION TO CEMENT

Example 10

A sample of geothermal silica manufactured according to Example 1 of hereinabove, was added as a dry powder to concrete mixes comprising normal portland cement and aggregate. Three (3) mixes were made up containing, in place of a comparable amount of the cement: 0% silica; 5% silica and 7% silica, respectively. The water:cement+silica ratio was adjusted to 0.5. All of these mixes were tested according to ISO standard procedures.

The pozzolanic activity of the geothermal silica was demonstrated by its ability to enhance the compressive strength of the concrete relative to the compressive strength of standard concretes (without added silica) after 7 and 28 days of aging. By comparison, conventional silicas made according to common commercial practice did not substantially change the compressive strength of concrete containing such as compared to unfilled concrete. The following Table 14 shows the compressive strength of the concretes made according to this invention.

TABLE 14

Silica Filler for Concrete

| Extent of Cement Replacement | % Increase in Compressive Strength Relative to Standard Concrete | |
|---|---|---|
| By Geothermal Silica | 7 Day | 28 Day |
| 5 wt % | 10.0 | 12.0 |
| 7 wt % | 14.5 | 14.0 |

APPLICATION TO PAINT

Example 11

Geothermal silica made according to Example 2 hereinabove was added to a paint formulation in order to act as an inert extender. The silica was of Type II. It had an oil absorption of about 40 g/100 g and a reflectance of about 90% at 550 nm (D65/10° from normal). When added to an otherwise conventional paint formulation in an amount of about 15% by weight, it functioned as an inert extender.

Example 12

Geothermal silica made according to Example 1 hereinabove was added to a paint formulation in order to act as an inert extender as well as a flattening agent. The silica was of Type I and had a secondary particle size of about 20 nm. It had an oil absorption of about 150 g/100 g and a reflectance of about 95% at 550 nm (D65/10° from normal). When added to an otherwise conventional paint formulation in an amount of about 10% by weight, it functioned both as an inert extender and an opacifier in the paint. The opacifying effect was surprisingly significantly better than that which could be achieved with calcined or uncalcined clay, which are known materials for use in this service.

Example 13

Geothermal silica made according to this invention was added to a paint formulation in order to act as an inert extender as well as a flattening agent. The silica was of Type I and had a secondary particle size of about 18 nm. It had an oil absorption of about 150 g/100 g and a reflectance of about 95% at 550 nm (D65/10° from normal). When added to an otherwise conventional paint formulation in an amount of about 10% by weight, it functioned both as an inert extender and an opacifier in the paint. The opacifying effect was surprisingly significantly better than that which could be achieved with calcined or uncalcined clay, which are known materials for use in this service.

What is claimed is:

1. A process of producing particles of amorphous silica having a tertiary aggregate structure selected from at least one member of the group consisting of Type-I, Type-II and Type-III, which comprises:

providing a source fluid containing siliceous materials and an amount of an indigent precipitation agent for said siliceous materials which is insufficient to cause substantial quantities of said siliceous materials to independently come out of solution in said source fluid at that time and under temperature and pressure conditions prevailing in said source fluid;

adding previously produced tertiary aggregate particles of amorphous silica into admixture with said source fluid, of a size and in an amount such that dissolved siliceous materials in said source fluid accrete to said previously produced particles and cause at least some of said previously produced particles to grow to a larger effective particle sizes, but of substantially the same structure;

maintaining the pH of said fluid at up to about 9.5 during the following steps;

forming a silica sol, by causing said source fluid to become supersaturated with respect to amorphous silica and initiating polymerization of said siliceous materials therein into polymeric material comprising primary particles of polymeric amorphous silica and accreting at least some of said primary particles of amorphous silica to said added particles of amorphous silica, without causing substantial quantities of said siliceous materials to be independently precipitated from said sol under the prevailing conditions;

aging said silica sol, by holding said silica sol for a time sufficient to continue the polymerization of said siliceous materials in said sol into said polymeric material, without causing substantial quantities of said polymeric material to be independently precipitated under the prevailing conditions;

adding to said silica sol a sufficient quantity of at least one added precipitation agent, different from said amorphous silica tertiary aggregate particles, to provide a sufficient proportion thereof, in relation to the concentration of said polymeric material, to convert said polymeric material into silica particles having a tertiary aggregate structure of said Type-I, Type-II or Type-III, of a size and in an amount sufficient to cause precipitation thereof from said silica sol;

thereby precipitating at least some of said tertiary aggregate amorphous silica particles to form a slurry of said particles; and harvesting at least a portion of said precipitated particles.

2. A process as claimed in claim 1 including the further step of recycling at least a portion of said produced tertiary aggregate amorphous silica particles into admixture with said source fluid, prior to the addition of said added precipitation agent to said sol, in an amount such that siliceous materials in said source fluid accrete to said recycled particles and cause said recycled particles to grow to a larger effective particles size.

3. A process of producing particles of amorphous silica having a tertiary aggregate structure selected from at least one member of the group consisting of Type-I, Type-II and Type-III, which comprises, without recycle of tertiary aggregate amorphous silica particles:

providing a source fluid containing siliceous materials and an amount of an indigent precipitation agent for said siliceous materials, including previously prepared tertiary aggregate particles of amorphous silica of Type-I, Type-II or Type-III, which is insufficient to cause substantial quantities of said siliceous materials to independently come out of solution in said source fluid at that time and under temperature and pressure conditions prevailing in said source fluid;

maintaining the pH of said fluid at up to about 9.5 during the following steps;

forming a supersaturated silica sol, by causing said source fluid to become supersaturated with respect to amorphous silica and initiating polymerization of said siliceous materials therein into polymeric material comprising primary particles of polymeric amorphous silica, without causing substantial quantities of said siliceous materials to be independently precipitated from said sol under the temperature and pressure conditions prevailing in said supersaturated silica sol;

aging said silica sol, by holding said silica sol for a time sufficient to continue the polymerization of said siliceous materials in said sol into said polymeric material, without causing substantial quantities of said polymeric material to be independently precipitated under the temperature and pressure conditions prevailing in said silica sol;

adding to said silica sol a sufficient quantity of at least one added precipitation agent, different from said amorphous silica tertiary aggregate particles, to provide a sufficient proportion of said added and said indigent precipitation agents in relation to the concentration of said polymeric material, to convert said polymeric material into silica particles having a tertiary aggregate structure of said Type-I, Type-II or Type-III, of a size and in an amount sufficient to cause rapid precipitation thereof from said silica sol;

thereby precipitating at least some of said tertiary aggregate amorphous silica particles to form a slurry of said precipitated particles; and harvesting at least a portion of said precipitated particles.

4. A process as claimed in claim 1, wherein said added particles of tertiary aggregate amorphous silica were formed from silica which did not originate in said source fluid.

5. A process as claimed in claim 1 including adding said previously formed tertiary aggregate amorphous silica particles as a slurry.

6. A process as claimed in claim 3 including recycling said precipitated particles as a slurry.

7. A process as claimed in claim 1 including adding said previously produced particles into admixture with said source fluid prior to said source fluid becoming supersaturated with respect to said amorphous silica.

8. A process as claimed in claim 2 including recycling said precipitated particles into admixture with said source fluid prior to said source fluid becoming supersaturated with respect to said amorphous silica.

9. A process as claimed in claim 1 wherein said source fluid is a geothermal source fluid.

10. A process as claimed in claim 2 including recycling said precipitated particles into admixture with said source fluid prior to aging of said source fluid.

11. A process as claimed in claim 2 including recycling said precipitated particles into admixture with said source fluid after aging of said source fluid.

12. A process as claimed in claim 2 including recycling said precipitated particles into admixture with said source fluid prior to said source fluid becoming supersaturated with respect to silica; and adding further quantities of an added precipitation agent, other than said recycled particles of amorphous silica, after said aging step, in an amount sufficient to effect substantially complete precipitation and yield, under the temperature and pressure conditions prevalent after said aging step, of said silica and to produce an aqueous effluent containing a small amount of suspended solids.

13. A process as claimed in claim 12 wherein said added precipitation agent is a combination of a polyethylene oxide and a high charge density polyamine.

14. A process as claimed in claim 13 wherein the proportion of said polyethylene oxide and said polyamine are each an amount of at least about 5 ppm, which is sufficient to cause substantially complete precipitation of said silica particles and yield an aqueous effluent containing a reduced amount of suspended solids as compared to said fluid containing a suspension of said precipitated particles.

15. A process of producing tertiary aggregate amorphous silica as claimed in claim 1 wherein said added precipitation agent comprises at least one member selected from magnesium and aluminum cations, whereby causing said precipitated tertiary aggregate amorphous silica to have a high surface area.

16. A process of producing tertiary aggregate amorphous silica as claimed in claim 14 wherein said added precipitation agent comprises at least one member selected from magnesium and aluminum cations, whereby causing said precipitated tertiary aggregate amorphous silica to have a high surface area.

17. A process of producing tertiary aggregate amorphous silica as claimed in claim 1 including the further step of washing said harvested particles of amorphous silica with sufficient acid to increase the surface area of said harvested particles.

18. A process of producing tertiary aggregate amorphous silica as claimed in claim 2 including the further step of washing said harvested particles of amorphous silica with sufficient acid to increase the surface area of said harvested particles.

19. A process of producing tertiary aggregate amorphous silica as claimed in claim 3 including the further step of washing said harvested particles of amorphous silica with sufficient acid to increase the surface area of said harvested particles.

20. A process of producing tertiary aggregate amorphous silica as claimed in claim 14 including the further step of washing said harvested particles of amorphous silica with sufficient acid to increase the surface area of said harvested particles.

21. A process as claimed in claim 1 wherein said added precipitation agent, other than said previously prepared particles of tertiary aggregate amorphous silica is at least partially associated with the surface of said previously prepared particles of tertiary aggregate amorphous silica at least to an extent sufficient to cause more dissolved silica to be recovered from said source fluid in particulate form than would have been the case when operating said method under the same conditions but in the absence of said previously prepared particles of tertiary aggregate amorphous silica.

22. A process as claimed in claim 2 wherein said added precipitation agent, other than said previously prepared particles of tertiary aggregate amorphous silica, is at least partially associated with the surface of said previously prepared particles of tertiary aggregate amorphous silica at least to an extent sufficient to cause more dissolved silica to be recovered from said source fluid in particulate form than would have been the case when operating said method under the same conditions but in the absence of said previously prepared particles of tertiary aggregate amorphous silica.

23. A process as claimed in claim 14 wherein said added precipitation agent, other than said previously prepared particles of tertiary aggregate amorphous silica, is at least partially associated with the surface of said previously prepared particles of tertiary aggregate amorphous silica at least to an extent sufficient to cause more dissolved silica to be recovered from said source fluid in particulate form than would have been the case when operating said method under the same conditions but in the absence of said previously prepared particles of tertiary aggregate amorphous silica.

* * * * *